US008059218B2

(12) United States Patent
Yoshida

(10) Patent No.: US 8,059,218 B2
(45) Date of Patent: Nov. 15, 2011

(54) DISPLAY DEVICE AND DRIVING METHOD THEREOF

(75) Inventor: Yasunori Yoshida, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 547 days.

(21) Appl. No.: 12/323,337

(22) Filed: Nov. 25, 2008

(65) Prior Publication Data

US 2009/0141202 A1 Jun. 4, 2009

(30) Foreign Application Priority Data

Nov. 29, 2007 (JP) ................................ 2007-308858

(51) Int. Cl.
*G02F 1/133* (2006.01)
*G02F 1/1343* (2006.01)
*G09G 3/36* (2006.01)

(52) U.S. Cl. ................. 349/33; 349/38; 345/87; 345/92

(58) Field of Classification Search .................... 349/33, 349/38; 345/87, 92

See application file for complete search history.

(56) References Cited

U.S. PATENT DOCUMENTS

| | | | | |
|---|---|---|---|---|
| 5,581,273 | A * | 12/1996 | Yoneda et al. | 345/90 |
| 6,756,953 | B1 * | 6/2004 | Tokioka et al. | 345/87 |
| 6,909,413 | B2 | 6/2005 | Nanno | |
| 7,034,789 | B2 | 4/2006 | Takeuchi | |
| 7,079,125 | B2 | 7/2006 | Nakagawa et al. | |
| 7,084,848 | B2 | 8/2006 | Senda | |
| 7,113,159 | B2 | 9/2006 | Sawabe | |
| 7,129,922 | B2 | 10/2006 | Shin | |
| 2002/0047822 | A1 | 4/2002 | Senda | |
| 2002/0196208 | A1 | 12/2002 | Nanno | |
| 2004/0001167 | A1 | 1/2004 | Takeuchi | |
| 2004/0217931 | A1 | 11/2004 | Shin | |
| 2006/0097972 | A1 | 5/2006 | Takeuchi | |
| 2006/0158420 | A1 | 7/2006 | Chang et al. | |
| 2007/0064182 | A1 | 3/2007 | Lin et al. | |
| 2009/0009449 | A1 | 1/2009 | Uchida | |
| 2009/0021658 | A1 | 1/2009 | Takeuchi | |

FOREIGN PATENT DOCUMENTS

| | | |
|---|---|---|
| EP | 1 139 328 | 10/2001 |
| EP | 1 473 693 | 11/2004 |
| JP | 2001-281628 | 10/2001 |
| JP | 2002-333870 | 11/2002 |
| JP | 2003-295160 | 10/2003 |
| JP | 2004-078157 | 3/2004 |
| JP | 2004-191574 | 7/2004 |
| JP | 2004-334171 | 11/2004 |
| JP | 2006-227312 | 8/2006 |
| WO | WO-2007/091365 | 8/2007 |

OTHER PUBLICATIONS

International Search Report dated Jan. 20, 2009 for Application No. PCT/JP2008/071484; 4 pages.

Written Opinion dated Jan. 20, 2009 for Application No. PCT/JP2008/071484; 4 pages.

* cited by examiner

*Primary Examiner* — Michael Caley

(74) *Attorney, Agent, or Firm* — Fish & Richardson P.C.

(57) ABSTRACT

With a display device using a pixel which includes a sub-pixel, the display device with improved viewing angle and quality of moving image display is provided without increase in power consumption by driving of the sub-pixel. A circuit which can change conducting states by a plurality of switches is provided, and charge in a plurality of sub-pixels and a capacitor element is transported mutually, so that desired voltage is applied to the plurality of sub-pixels without applying voltage in plural times from external. Moreover, a period in which each sub-pixel displays black is provided in accordance with transfer of charge.

8 Claims, 20 Drawing Sheets

FIG. 1A
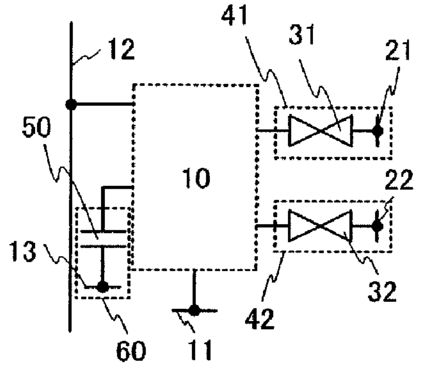
FIG. 1B
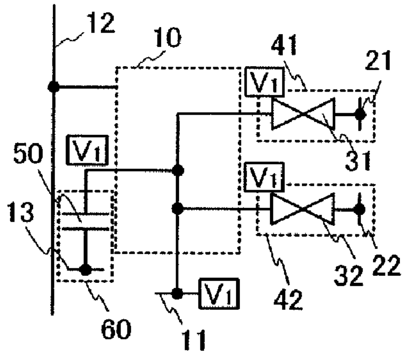
FIG. 1C1
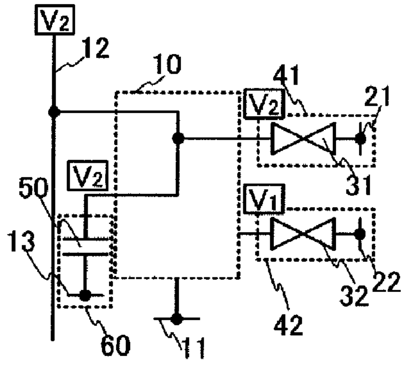
FIG. 1C2
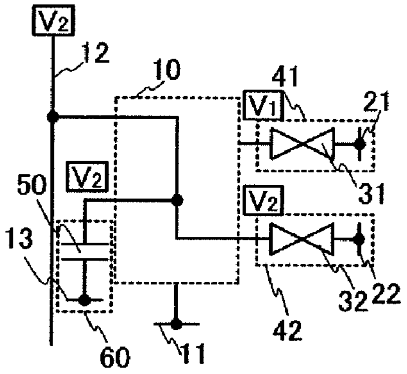
FIG. 1D1
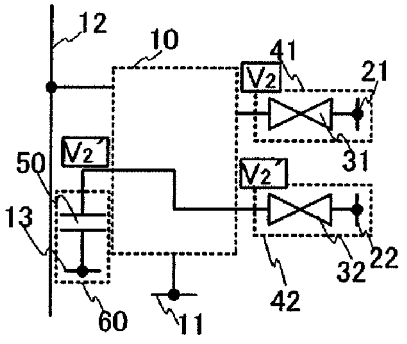
FIG. 1D2
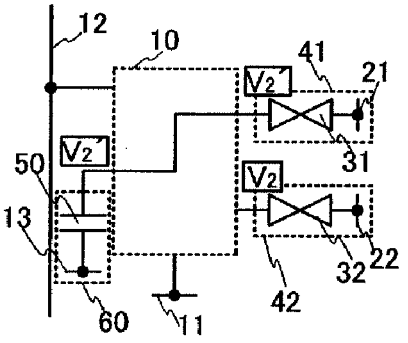
FIG. 1E
Order
FIG. 1B ↗ FIG. 1C1 → FIG. 1D1 ⇢ FIG. D2
FIG. 1B ↘ FIG. 1C2 → FIG. 1D2 ⇢ FIG. 1D1

FIG. 3A
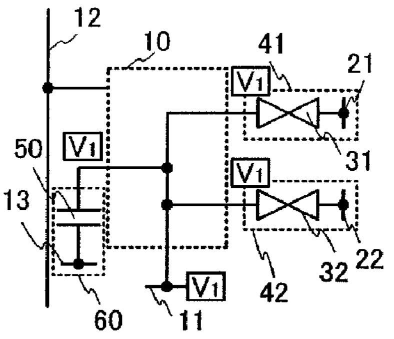
FIG. 3B1
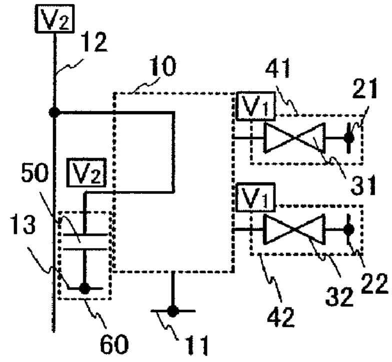
FIG. 3B2
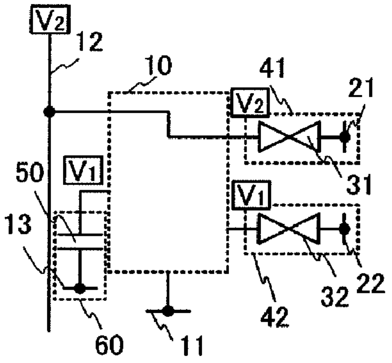
FIG. 3B3
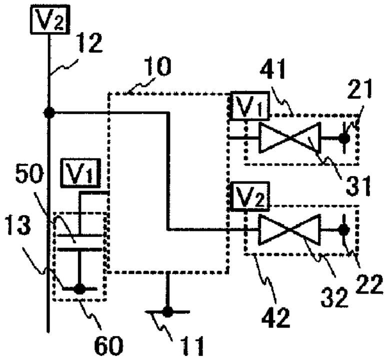
FIG. 3C1
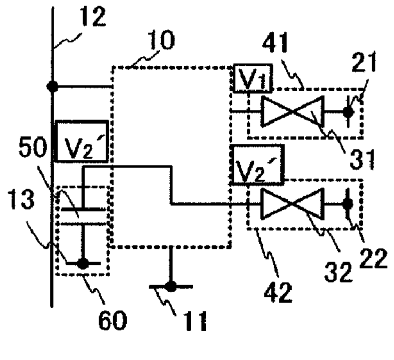
FIG. 3C2
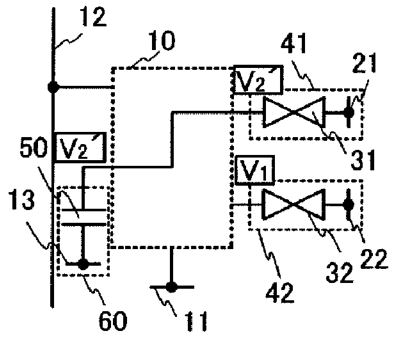
FIG. 3D
Order
FIG. 3A → FIG. 3B1 → FIG. 3C1 → FIG. 3C2
FIG. 3A → FIG. 3B1 → FIG. 3C2 → FIG. 3C1
FIG. 3A → FIG. 3B2 → FIG. 3C2 → FIG. 3C1
FIG. 3A → FIG. 3B3 → FIG. 3C1 → FIG. 3C2

FIG. 5D1
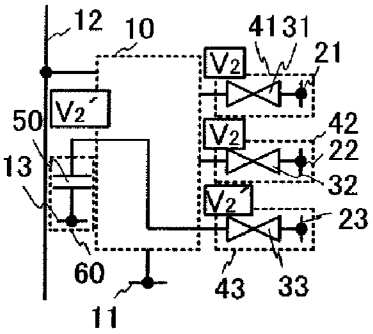
FIG. 5D2
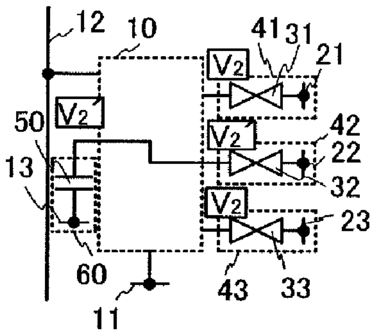
FIG. 5D3
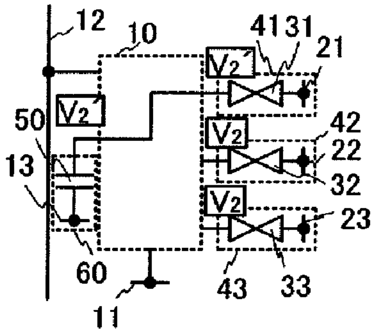
FIG. 5E
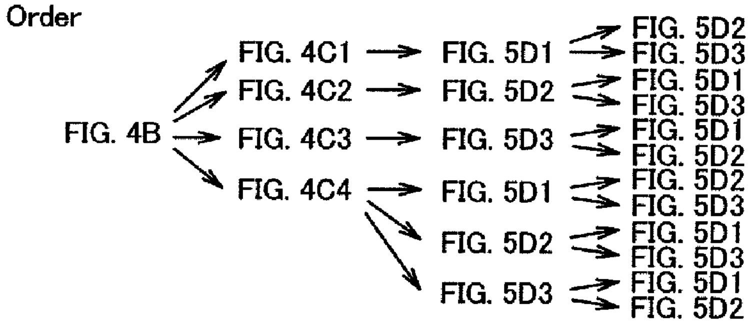

※FIGS 9A-9D: OFF
FIG. 9E: ON

DISPLAY DEVICE AND DRIVING METHOD THEREOF

TECHNICAL FIELD

The present invention relates to a display device and a semiconductor device. The present invention relates to an electronic device having the display device in a display portion.

BACKGROUND ART

A liquid crystal display device has some advantages such as thin, light weight, low power consumption, or the like, compared to a display device using a cathode-ray tube. Further, since a liquid crystal display device can be widely applied to from the small-sized display device having a few inches of diagonal of a display portion to the large-sized display device having more than 100 inches, the liquid crystal display device is widely used as a display device of various electronic devices such as a mobile phone, a still camera, a video camera, a television receiver, and the like.

While the liquid crystal display device has excellent general versatility, there is a problem in that image quality is low compared to other display devices such as CRT and the like. The causes include: decrease of image quality when it is watched from an oblique angle due to large viewing angle dependence of display; low contrast because of leakage of the light from the backlight; low quality of moving image because of slow response speed, or the like.

However, image quality has been improved by development of a new liquid crystal mode in recent years. Instead of twisted nematic (TN) mode which has been conventionally used, the following various liquid crystal modes are developed and are put into practical use: an in-plane-switching (IPS) mode and an fringe field switching (FFS) mode which has excellent viewing angle characteristics, a vertical alignment (VA) mode which have high contrast ratio, an optical compensated birefringence (OCB) mode of which response speed is fast and quality of moving display is high, and the like.

Here, while the VA mode liquid crystal display device is easy to increase contrast ratio, there has been a problem that viewing angle dependence of display is still large. Therefore, multi-domain VA (MVA) mode and patterned VA (PVA) mode are developed by which a pixel is divided into a plurality of domains, and orientation of liquid crystal is changed in each domain so that wider viewing angle is realized. However, even if such a multi-domain method is used, enough viewing angle characteristics are not obtained.

Thus, patent document 1 (Japanese Published Patent Application No. 2003-295160) proposes to divide a pixel into a plurality of sub-pixels, and different signal voltages are applied to each sub-pixel, so that viewing angle dependence of display is averaged to increase viewing angle.

DISCLOSURE OF INVENTION

In the method disclosed in patent document 1, since a pixel is divided into two sub-pixels and different signal voltages are applied to each sub-pixel, signal lines (also referred to as a data line or a source line) for supplying signal voltages to each of the two sub-pixels are needed separately. Moreover, signal line drivers (also referred to as a data driver or a source driver) for driving each signal line are also necessary, so that there is a problem that the manufacturing cost and power consumption increase by increasing circuit scale.

Furthermore, in recent years, the definition of a liquid crystal panel used for a liquid crystal display device has been enhanced, and thus, higher definition comes to be required not only to a large-sized liquid crystal panel for a television receiver but also to small or middle size of a liquid crystal panel for a mobile phone or the like. As disclosed in patent document 1, in the method for improving viewing angle characteristics by supplying signal voltages to each of the plurality of sub-pixels, circuit scale is increased and a high-speed circuit is needed. Thus, there is a problem that the method is disadvantageous in trend toward high definition.

Furthermore, in order to enhance the image quality of the liquid crystal display device, not only the viewing angle but also the image quality of moving image display, contrast ratio, or the like has to be improved. As thus described, improvement of only one characteristic of a liquid crystal display device is not enough, and improvement of any other characteristics toward high level at the same time is necessary for enhancement of whole image quality of the liquid crystal display device. Moreover, it is important for the device to reduce power consumption as well as to improve display characteristics of a liquid crystal display device. If the power consumption of the device is reduced, the stable operation and safety of the device can be realized by suppressing heat generation. In addition, it is important to reduce power consumption from the viewpoint of a countermeasure against depletion of resources and prevention of global warming.

The present invention has been made in view of the foregoing problems. It is an object to provide a display device with improved viewing angle and a driving method thereof. Alternatively, it is another object to provide a display device with enhanced image quality of still image and moving image display and a driving method thereof. It is another object to provide a display device with improved contrast ratio and a driving method thereof. It is another object to provide a display device without flicker and a driving method thereof. It is another object to provide a display device with increased response speed and a driving method thereof It is another object to provide a display device with low power consumption and a driving method thereof. It is another object to provide a display device with low manufacturing cost and a driving method thereof.

The present invention is invented to solve the above objects. Specifically, a circuit in which a conducting state can be changed by a plurality of switches is provided, and charge in the plurality of sub-pixels and capacitor elements is transferred mutually, so that desired voltage is applied to the plurality of sub-pixels without performing plural times of voltage application from outside. Moreover, a period in which each sub-pixel displays black color is provided in accordance with transfer of charge.

One aspect of a liquid crystal display device of the present invention includes a plurality of pixels. The plurality of pixels include a first liquid crystal element, a second liquid crystal element, a capacitor element, and a circuit including functions. A connection between the first liquid crystal element or the second liquid crystal element, and a first wiring is brought into conduction for applying a first voltage to the first liquid crystal element and a capacitor element, or the second liquid crystal element and a capacitor element. Switching is performed between a first state in which a connection between the first liquid crystal element and the capacitor element is brought into conduction and a connection between the second liquid crystal element and the capacitor element is brought out of conduction, and a second state in which a connection between the first liquid crystal element and the capacitor element is brought out of conduction and a connection between the second liquid crystal element and the capacitor element is brought into conduction. A connection between the first liquid crystal element, the second liquid crystal element, the capacitor element, and a second wiring is brought into conduction for applying a second voltage to the first liquid crystal element, the second liquid crystal element, and the capacitor element.

Another aspect of a liquid crystal display device of the present invention includes a plurality of pixels. The plurality of pixels include a first liquid crystal element, a second liquid crystal element, a capacitor element, and a circuit including functions. A connection between the first liquid crystal element, the second liquid crystal element, and a first wiring is brought into conduction for applying a first voltage to the first liquid crystal element and the second liquid crystal element. Switching is performed between a first state in which a connection between the first liquid crystal element and the capacitor element is brought into conduction and a connection between the second liquid crystal element and the capacitor element is brought out of conduction, and a second state in which a connection between the first liquid crystal element and the capacitor element is brought out of conduction and a connection between the second liquid crystal element and the capacitor element is brought into conduction. A connection between the first liquid crystal element, the second liquid crystal element, the capacitor element, and a second wiring is brought into conduction for applying a second voltage to the first liquid crystal element, the second liquid crystal element, and the capacitor element.

Another aspect of a liquid crystal display device of the present invention includes a plurality of pixels. The plurality of pixels include a first liquid crystal element, a second liquid crystal element, a capacitor element, and a circuit including functions. A connection between the first liquid crystal element, the second liquid crystal element, the capacitor element and a first wiring is brought into conduction for applying a first voltage to the first liquid crystal element, the second liquid crystal element, and the capacitor element. Switching is performed between a first state in which a connection between the first liquid crystal element and the capacitor element is brought into conduction and a connection between the second liquid crystal element and the capacitor element is brought out of conduction, and a second state in which a connection between the first liquid crystal element and the capacitor element is brought out of conduction and a connection between the second liquid crystal element and the capacitor element is brought into conduction. A connection between the capacitor element and a second wiring is brought into conduction for applying a second voltage to the capacitor element.

Another aspect of a liquid crystal display device of the present invention includes a plurality of pixels. The plurality of pixels include a first liquid crystal element, a second liquid crystal element, a first switch, a capacitor element, a second switch, a third switch, and a fourth switch. A terminal of the first switch is electrically connected to a second wiring. A terminal of the second switch is electrically connected to the other terminal of the first switch and the capacitor element, and the other terminal of the second switch is electrically connected to the first liquid crystal element. A terminal of the third switch is electrically connected to the other terminal of the first switch and the capacitor element, and the other terminal of the third switch is electrically connected to the second liquid crystal element. A terminal of the fourth switch is electrically connected to the other terminal of the first switch and the capacitor element, and the other terminal of the fourth switch is electrically connected to the first wiring.

Another aspect of a liquid crystal display device of the present invention includes a plurality of pixels which include a first liquid crystal element, a second liquid crystal element, a first switch, a capacitor element, a second switch, a third switch, and a fourth switch. A terminal of the first switch is electrically connected to a second wiring. A terminal of the second switch is electrically connected to the other terminal of the first switch and the capacitor element, and the other terminal of the second switch is electrically connected to the first liquid crystal element. A terminal of the third switch is electrically connected to the other terminal of the first switch and the capacitor element, and the other terminal of the third switch is electrically connected to the second liquid crystal element. A terminal of the fourth switch is electrically connected to the other terminal of the first switch and the capacitor element, and the other terminal of the fourth switch is electrically connected to a first wiring. The liquid crystal display device of the present invention further includes a first scan line, a second scan line, a third scan line, and a fourth scan line. The first scan line controls the first switch by a signal which controls an applying state of voltage for driving the first liquid crystal element and the second liquid crystal element. The second scan line controls the second switch by a signal which controls an electrical connection between the capacitor element and the first liquid crystal element. The third scan line controls the third switch by a signal which controls an electrical connection between the capacitor element and the second liquid crystal element. The fourth scan line controls the fourth switch by a signal which controls an electrical connection between the capacitor element and the first wiring.

Note that various types of switches, for example, an electrical switch and a mechanical switch can be used. That is, any elements can be used without being limited to a particular type as long as it can control a current flow. For example, a transistor (e.g., a bipolar transistor or a MOS transistor), a diode (e.g., a PN diode, a PIN diode, a Schottky diode, a metal-insulator-metal (MIM) diode, a metal-insulator-semiconductor (MIS) diode, or a diode-connected transistor), a thyristor, or the like can be used as a switch. Alternatively, a logic circuit in which such elements are combined can be used as a switch.

Note that when it is explicitly described that A and B are connected, the case where A and B are electrically connected, the case where A and B are functionally connected, and the case where A and B are directly connected are included. The case where A and B are electrically connected particularly includes the case where an object which has some electric operations is provided between A and B. Here, each of A and B is an object (e.g., a device, an element, a circuit, a wiring, an electrode, a terminal, a conductive film, or a layer). Accordingly, another connection relationship shown in drawings and texts is included, without being limited to a predetermined connection relationship, for example, connection relationships shown in the drawings and the texts.

Note that as a transistor, various types of transistors can be employed without being limited to a certain type. For example, a thin film transistor (TFT) including a non-single crystal semiconductor film typified by amorphous silicon, polycrystalline silicon, microcrystalline (also referred to as semi-amorphous) silicon, or the like can be used. The use of the TFT has various advantages. For example, since a transistor can be formed at temperature lower than that of the case of using single-crystal silicon, reduction in manufacturing costs or increase in size of a manufacturing device can be realized. A transistor can be formed using a large substrate with increase in size of the manufacturing device. Accordingly, a large number of display devices can be formed at the same time, and thus can be formed at low cost. Further, since manufacturing temperature is low, a substrate having low heat resistance can be used. Accordingly, a transistor can be formed over a light-transmitting substrate; thus, transmission of light in a display element can be controlled by using the transistor formed over the light-transmitting substrate. Alternatively, since the thickness of the transistor is thin, part of a film forming the transistor can transmit light; thus, an aperture ratio can be increased.

Alternatively, a transistor including a compound semiconductor or an oxide semiconductor such as ZnO, a-InGaZnO, SiGe, GaAs, IZO, ITO, or SnO, a thin film transistor obtained by thinning such a compound semiconductor or an oxide semiconductor, or the like can be used. Thus, manufacturing temperature can be lowered, and a transistor can be formed at room temperature, for example. Accordingly, the transistor can be formed directly on a substrate having low heat resistance, such as a plastic substrate or a film substrate. Note that such a compound semiconductor or an oxide semiconductor can be used for not only a channel portion of the transistor but also other applications. For example, such a compound semiconductor or an oxide semiconductor can be used as a resistor, a pixel electrode, or an electrode having a light-transmitting property. Further, since such an element can be formed at the same time as the transistor, cost can be reduced.

Alternatively, a transistor or the like formed by using an inkjet method or a printing method can be used. Accordingly, the transistor can be formed at room temperature or at a low vacuum, or can be formed using a large substrate. Since the transistor can be formed without using a mask (a reticle), layout of the transistor can be easily changed. Further, since it is not necessary to use a resist, material cost is reduced and the number of steps can be reduced. Moreover, since a film is formed only in a required portion, a material is not wasted and cost can be reduced compared with a manufacturing method in which etching is performed after the film is formed over the entire surface.

Note that one pixel corresponds to one element whose brightness can be controlled. For example, one pixel corresponds to one color element, and brightness is expressed with one color element. Accordingly, in the case of a color display device having color elements of R (red), G (green), and B (blue), the smallest unit of an image is formed of three pixels of an R pixel, a G pixel, and a B pixel. Note that the color elements are not limited to three colors, and color elements of more than three colors may be used and/or a color other than RGB may be used. For example, RGBW can be employed by adding W (white). Alternatively, RGB added with one or more colors of yellow, cyan, magenta, emerald green, vermilion, and the like can be used. Further alternatively, a color similar to at least one of R, G, and B can be added to RGB. For example, R, G, B1, and B2 may be used. Although both B1 and B2 are blue, they have slightly different frequencies. Similarly, R1, R2, G, and B can be used. By using such color elements, display which is closer to a real object can be performed, and power consumption can be reduced. As another example, when brightness of one color element is controlled by using a plurality of regions, one region can correspond to one pixel. For example, when area ratio gray scale display is performed or a subpixel is included, a plurality of regions which control brightness are provided in one color element and gray scales are expressed with all of the regions, and one region which controls brightness can correspond to one pixel. In that case, one color element is formed of a plurality of pixels. Alternatively, even when a plurality of the regions which control brightness are provided in one color element, these regions may be collected and one color element may be referred to as one pixel. In that case, one color element is formed of one pixel. In addition, when brightness of one color element is controlled by a plurality of regions, regions which contribute to display may have different area dimensions depending on pixels in some cases. Alternatively, in a plurality of the regions which control brightness in one color element, signals supplied to respective regions may slightly vary to widen a viewing angle. That is, potentials of pixel electrodes included in the plurality of the regions in one color element can be different from each other. Accordingly, voltages applied to liquid crystal molecules vary depending on the pixel electrodes. Thus, the viewing angle can be widened.

Note that when it is explicitly described as one pixel (for three colors), it corresponds to the case where three pixels of R, G, and B are considered as one pixel. When it is explicitly described as one pixel (for one color), it corresponds to the case where a plurality of the regions provided in each color element are collectively considered as one pixel.

Note that pixels are provided (arranged) in matrix in some cases. Here, description that pixels are provided (arranged) in matrix includes the case where the pixels are arranged in a straight line or in a jagged line in a longitudinal direction or a lateral direction. For example, when full-color display is performed with three color elements (e.g., RGB), the following cases are included therein: the case where the pixels are arranged in stripes, the case where dots of the three color elements are arranged in a delta pattern, and the case where dots of the three color elements are provided in Bayer arrangement. Note that the color elements are not limited to three colors, and color elements of more than three colors may be employed, for example, RGBW (W corresponds to white) or RGB added with one or more of yellow, cyan, magenta, and the like. In addition, the size of display regions may vary in respective dots of color elements. Thus, power consumption can be reduced or the life of a display element can be prolonged.

Note that a transistor is an element having at least three terminals of a gate, a drain, and a source. The transistor includes a channel region between a drain region and a source region, and current can flow through the drain region, the channel region, and the source region. Here, since the source and the drain of the transistor may change depending on a structure, operating conditions, and the like of the transistor, it is difficult to define which is a source or a drain. Therefore, in this document (the specification, the claims, the drawings, and the like), a region functioning as a source and a drain is not called the source or the drain in some cases. In such a case, one of the source and the drain may be referred to as a first terminal and the other thereof may be referred to as a second terminal, for example. Alternatively, one of the source and the drain may be referred to as a first electrode and the other thereof may be referred to as a second electrode. Further alternatively, one of the source and the drain may be referred to as a source region and the other thereof may be referred to as a drain region.

Note that a gate corresponds to all or part of a gate electrode and a gate wiring (also referred to as a gate line, a gate signal line, a scan line, a scan signal line, or the like). A gate electrode corresponds to part of a conductive film which overlaps with a semiconductor forming a channel region with a gate insulating film interposed therebetween. Note that in some cases, part of the gate electrode overlaps with an LDD (lightly doped drain) region or a source region (or a drain region) with the gate insulating film interposed therebetween. A gate wiring corresponds to a wiring for connecting gate electrodes of transistors, a wiring for connecting gate electrodes included in pixels, or a wiring for connecting a gate electrode to another wiring.

Note that a gate terminal corresponds to part of a portion (a region, a conductive film, a wiring, or the like) of a gate electrode or a portion (a region, a conductive film, a wiring, or the like) which is electrically connected to the gate electrode.

When a wiring is called a gate wiring, a gate line, a gate signal line, a scan line, a scan signal line, or the like, there is the case where a gate of a transistor is not connected to the wiring. In this case, the gate wiring, the gate line, the gate signal line, the scan line, or the scan signal line corresponds to a wiring formed in the same layer as the gate of the transistor, a wiring formed of the same material as the gate of the transistor, or a wiring formed at the same time as the gate of the transistor in some cases. Examples of such a wiring include a wiring for storage capacitance, a power supply line, and a reference potential supply line.

A source corresponds to all or part of a source region, a source electrode, and a source wiring (also referred to as a source line, a source signal line, a data line, a data signal line, or the like). A source region corresponds to a semiconductor region containing a large amount of p-type impurities (e.g., boron or gallium) or n-type impurities (e.g., phosphorus or arsenic). Accordingly, a region containing a small amount of p-type impurities or n-type impurities, a so-called LDD (lightly doped drain) region is not included in the source region. A source electrode is part of a conductive layer formed of a material different from that of a source region and electrically connected to the source region. However, there is the case where a source electrode and a source region are collectively called a source electrode. A source wiring corresponds to a wiring for connecting source electrodes of transistors, a wiring for connecting source electrodes included in pixels, or a wiring for connecting a source electrode to another wiring.

Note that a source terminal corresponds to part of a source region, a source electrode, or a portion (a region, a conductive film, a wiring, or the like) which is electrically connected to the source electrode.

When a wiring is called a source wiring, a source line, a source signal line, a data line, a data signal line, or the like, there is the case where a source (a drain) of a transistor is not connected to the wiring. In this case, the source wiring, the source line, the source signal line, the data line, or the data signal line corresponds to a wiring formed in the same layer as the source (the drain) of the transistor, a wiring formed of the same material as the source (the drain) of the transistor, or a wiring formed at the same time as the source (the drain) of the transistor in some cases. Examples of such a wiring include a wiring for storage capacitance, a power supply line, and a reference potential supply line.

Note that a drain is similar to the source.

Note that a semiconductor device corresponds to a device having a circuit including a semiconductor element (e.g., a transistor, a diode, or a thyristor). The semiconductor device may also refer to all devices which can function by utilizing semiconductor characteristics. Alternatively, the semiconductor device refers to a device including a semiconductor material.

A display element corresponds to an optical modulation element, a liquid crystal element, a light-emitting element, an EL element (an organic EL element, an inorganic EL element, or an EL element including both organic and inorganic materials), an electron emitter, an electrophoresis element, a discharging element, a light-reflecting element, a light diffraction element, a digital micromirror device (DMD), or the like. Note that the present invention is not limited thereto.

A display device corresponds to a device including a display element. The display device may include a plurality of pixels having a display element. The display device may include a peripheral driver circuit for driving a plurality of pixels. The peripheral driver circuit for driving a plurality of pixels may be formed over the same substrate as the plurality of pixels. The display device may also include a peripheral driver circuit provided over a substrate by wire bonding or bump bonding, that is, an IC chip connected by so-called chip on glass (COG), TAB, or the like. Further, the display device may also include a flexible printed circuit (FPC) to which an IC chip, a resistor, a capacitor, an inductor, a transistor, or the like is attached. The display device may also include a printed wiring board (PWB) which is connected through a flexible printed circuit (FPC) and the like and to which an IC chip, a resistor, a capacitor, an inductor, a transistor, or the like is attached. The display device may also include an optical sheet such as a polarizing plate or a retardation plate. The display device may also include a lighting device, a housing, an audio input and output device, an optical sensor, or the like.

Here, a lighting device may include a light guide plate, a prism sheet, a diffusion sheet, a reflective sheet, a light source (e.g., an LED or a cold cathode fluorescent lamp), a cooling device (e.g., a water cooling type or an air cooling type), or the like.

A liquid crystal display device corresponds to a display device including a liquid crystal element. Liquid crystal display devices include a direct-view liquid crystal display, a projection liquid crystal display, a transmissive liquid crystal display, a reflective liquid crystal display, a transflective liquid crystal display, and the like in its category.

When it is explicitly described that B is formed on or over A, it does not necessarily mean that B is formed in direct contact with A. The description includes the case where A and B are not in direct contact with each other, that is, the case where another object is interposed between A and B. Here, each of A and B corresponds to an object (e.g., a device, an element, a circuit, a wiring, an electrode, a terminal, a conductive film, or a layer).

As for a liquid crystal display device and a driving method thereof according to the present invention, even when one pixel is divided into a plurality of sub-pixels in order to improve viewing angle and when a method for improving viewing angle in which different signal voltages are applied to sub-pixel is employed, increase in the circuit scale, increase in driving speed of a circuit, or the like for driving sub-pixels does not occur. As the result, reduction in power consumption and in manufacturing cost can be realized. Moreover, an accurate signal can be input to each sub-pixel, so that quality of still image display can be improved. Furthermore, since a black image can be displayed in an arbitrary timing without adding a special circuit and changing a structure, the quality of moving image display can be improved.

Further, as for a liquid crystal display device and a driving method thereof according to the present invention, contrast ratio can be improved by providing a period in which a black image is displayed. Flicker of a display can be reduced by shortening of period for displaying a black image, and response speed of display can be increased by overdrive. Furthermore, drive frequency of a driver circuit of a liquid crystal panel can set to be low, so that power consumption can be reduced.

BRIEF DESCRIPTION OF DRAWINGS

FIGS. 1A to 1E illustrate a conducting state of a first circuit 10 in the present invention.

FIGS. 2A to 2D illustrate a conducting state of the first circuit 10 in the present invention.

FIGS. 3A to 3D illustrate a conducting state of the first circuit 10 in the present invention.

FIGS. 5D1 to 5E illustrate a conducting state of the first circuit 10 in the present invention.

BEST MODE FOR CARRYING OUT THE INVENTION

Figure 2A:
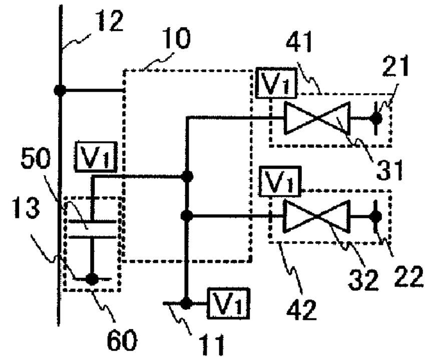
Figure 2A:
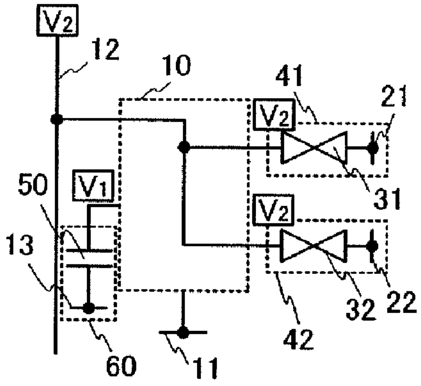
Figure 2A:
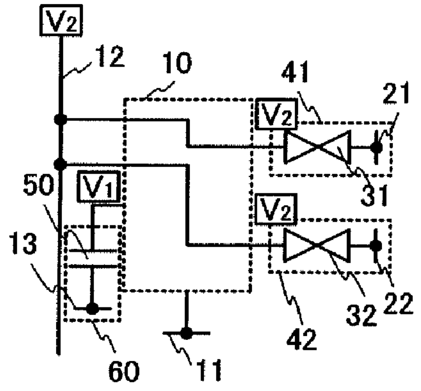
Figure 2A:
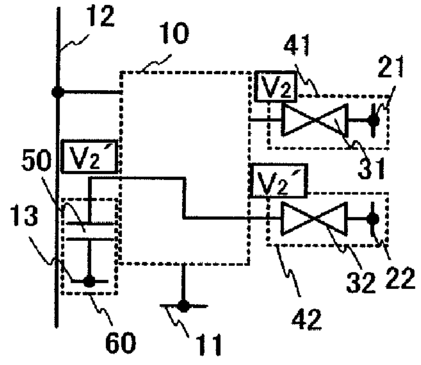
Figure 2A:
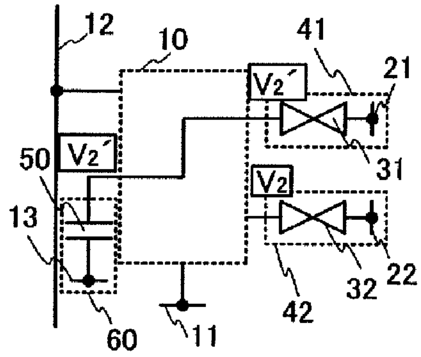

Hereinafter, the embodiment modes of the present invention will be described with reference to the drawings. However, the present invention can be implemented in various modes, and it is easily understood by those skilled in the art that modes and details can be variously changed without departing from the scope and the spirit of the present invention. Therefore, the present invention is not construed as being limited to description of the embodiment modes.

Embodiment Mode 1

<Example of Operation and Pixel Structure>

First, an operation in which a pixel circuit should have in order to solve the above objects and examples of a pixel structure which realize thereof is described. The operation in which a pixel circuit should have in order to solve the above objects mainly includes following two operations. That is, (operation A) different voltages are written to the plurality of sub-pixels included in a pixel by one time of writing, and (operation B) a period in which all sub-pixels display black color is provided in one frame period. With realization of operation A, viewing angle can be improved without increasing circuit scale, driving speed, or the like for driving sub-pixels. In addition, operation B is realized while operation A is realized, so that viewing angle is improved, power consumption is reduced, and image quality of moving image display is improved. As thus described, not only improvement of one characteristic among characteristics which a liquid crystal display device has, but also improvement of any other characteristics toward high level at the same time are highly effective for enhancement of whole image quality of the liquid crystal display device. Note that as for operation B, if changing the length of the period in which all sub-pixels display black color comes to be possible, suitable image quality for each characteristics of moving image can be provided in the case where various moving images are displayed on the liquid crystal display device, which is preferable.

As an example of a pixel structure which realizes the above operation, a first pixel structure is illustrated in FIG. 1A. The first pixel structure includes a first circuit 10 which is electrically connected to a first wiring 11 and a second wiring 12, a first liquid crystal element 31 which is electrically connected to the first circuit 10, a second liquid crystal element 32 which is electrically connected to the first circuit 10, and a first capacitor element 50 which is electrically connected to the first circuit 10.

Here, the first capacitor element 50 has two electrodes, and one electrode which is different from the electrode which is electrically connected to the first circuit 10 is electrically connected to a third wiring 13. Then, a combination of the first capacitor element 50 and the third wiring 13 is a second circuit 60.

Further, the first liquid crystal element 31 has two electrodes, and an electrode which is electrically connected to the first circuit 10 is referred to as a first pixel electrode, and the other electrode is referred to as a first common electrode. Then, it is assumed that the first common electrode is electrically connected to a fourth wiring 21. However, the first common electrode may be electrically connected to another wiring without being limited to this. Furthermore, a combination of the first liquid crystal element 31 and the fourth wiring 21 is a first sub-pixel 41.

Similarly, the second liquid crystal element 32 has two electrodes, and an electrode which is electrically connected to the first circuit 10 is referred to as a second pixel electrode, and the other electrode is referred to as a second common electrode. Then, it is assumed that the second common electrode is electrically connected to a fifth wiring 22. However, the second common electrode may be electrically connected to another wiring without being limited to this. Furthermore, a combination of the second liquid crystal element 32 and the fifth wiring 22 is a second sub-pixel 42.

Note that the first to fifth wirings which are in the circuit included in the first pixel structure can be classified as follows according to the role. The first wiring 11 can have a function as a reset line to which reset voltage $V_1$ is applied. The second wiring 12 can have a function as a data line to which the data voltage $V_2$ is applied. The third wiring 13 can have a function as a common line for controlling voltage applied to the first capacitor element 50. The fourth wiring 21 can have a function as a liquid crystal common electrode for controlling voltage applied to the first liquid crystal element 31. The fifth wiring 22 can have a function as a liquid crystal common electrode for controlling voltage applied to the second liquid crystal element 32.

However, each wiring can have various roles without being limited to this. The wirings for applying the same voltages, in particular, can be common wirings which are electrically connected to each other. Since an area of wiring in a circuit can be reduced by sharing a wiring, aperture ratio can be improved, whereby power consumption can be reduced.

<First Pixel Structure and Function (1)>

Next, the function that the first circuit 10 should have is described in detail in order to realize the above mentioned operation A and operation B by the first pixel structure. Here, it is assumed that: a first voltage $V_1$ is applied to the first wiring 11; a second voltage $V_2$ is applied to the second wiring 12; a third voltage $V_3$ is applied to the third wiring 13; a fourth voltage $V_4$ is applied to the fourth wiring 21; and a fifth voltage $V_5$ is applied to the fifth wiring 22.

The first circuit 10 includes a plurality of switches for controlling a conducting state of the first wiring 11, the second wiring 12, the first liquid crystal element 31, the second liquid crystal element 32, and the first capacitor element 50 which are electrically connected to the first circuit 10. Then, the first circuit 10 should have a function that a conducting state which is needed to realize the above mentioned operation A and operation B can be methodically realized.

<First Conducting State (Reset)>

The first conducting state in a function (1) of the first pixel structure is that the voltage applied to each element which is electrically connected to the first circuit 10 (the first liquid crystal element 31, the second liquid crystal element 32, and the first capacitor element 50) is returned to the voltage of an initial state (also referred to as reset voltage). Therefore, this state is also referred to as a reset state.

The reset state of the first circuit 10 is realized by the following conducting states of the first circuit 10. That is, the connection between the first liquid crystal element 31, the second liquid crystal element 32, the first capacitor element 50, and the first wiring 11 is brought into conduction with each other. FIG. 1B illustrates a schematic diagram of this state. Under such a conducting state, the first voltage $V_1$ can be applied to the first liquid crystal element 31, the second liquid crystal element 32, and the first capacitor element 50. In other words, the first voltage $V_1$ is reset voltage. Here, the first voltage $V_1$ is preferably voltage by which the first liquid crystal element 31 and the second liquid crystal element 32 display black color. For example, if the property of the first liquid crystal element 31 and the second liquid crystal element 32 is normally black, it is preferable that the level of the first voltage is in the range of 0 V to threshold voltage (the voltage that transmissivity begins to rise) of the liquid crystal. On the other hand, if the property of the first liquid crystal element 31 and the second liquid crystal element 32 is normally white, it is preferable that the level of the first voltage $V_1$ is equal to or more than saturation voltage (the voltage that transmissivity finishes dropping) of the liquid crystal.

Note that attention is necessary in that the level of the voltage applied to the liquid crystal is the difference between the first voltage $V_1$, and the fourth voltage $V_4$ or the fifth voltage $V_5$. For example, in the case where 0 V is applied to the first liquid crystal element, when the fourth voltage $V_4$ or the fifth voltage $V_5$ is 0 V, the first voltage $V_1$ is 0 V. Similarly, in the case where 0 V is applied to the first liquid crystal element, for example, when the fourth voltage $V_4$ or the fifth voltage $V_5$ is 5 V, the first voltage $V_1$ is 5V. As thus described, the first voltage $V_1$ is determined by the voltage that should be applied to each liquid crystal element and the voltage of the fourth voltage $V_4$ or the fifth voltage $V_5$. In this embodiment mode, for simplification, the fourth voltage $V_4$ and the fifth voltage $V_5$ is 0 V, and the voltage applied to the liquid crystal is equal to the first voltage $V_1$. However, this is just for considering the convenience of description, and thus, the actual fourth voltage $V_4$ or fifth voltage $V_5$ is not limited to 0 V. Note that as for the third voltage $V_3$ in the first capacitor element, specific voltage used for description is similar to the fourth voltage $V_4$ or the fifth voltage $V_5$.

The reason why each element electrically connected to the first circuit 10 is made to be in a reset state as above described is as follows. The first reason is that the voltage which should be written in each liquid crystal element after the first conducting state does not depend on the voltage which is written before the first conducting state. If the voltage depends on, it becomes difficult to control the voltage normally which should be written in each liquid crystal element, and as a result, it becomes difficult to perform display of the liquid crystal display device normally. The second reason is that each liquid crystal element displays black color by the reset state, and all liquid crystal elements are subjected to this control, whereby the liquid crystal display device displays black color. In other words, the liquid crystal display device displays black color, so that above mentioned operation B can be realized. Therefore, image quality of moving image display is improved. Note that the length of the period of black color display can be controlled by controlling the timing to be in a reset state. The period of black color display is increased, so that image quality of moving image display is improved more. On the other hand, the period of black color display is reduced, so that flicker of the liquid crystal display device can be reduced.

<Second Conducting State (Writing)>

The second conducting state in the function (1) of the first pixel structure is that the voltage (also referred to as data voltage or data signal) which is based on an image signal is written selectively in the first capacitor element 50, and either of the first liquid crystal element 31 or the second liquid crystal element 32, out of the elements (the first liquid crystal element 31, the second liquid crystal element 32, and the first capacitor element 50) electrically connected to the first circuit 10. Therefore, this state is referred to as a writing state. Note that at this time, one of the first liquid crystal element 31 and the second liquid crystal element 32, in which data voltage is not written, holds the voltage before to be in the second conducting state.

The writing state of the first circuit 10 is realized by the following conducting states of the first circuit 10. That is, the connection between the second wiring 12, the first capacitor element 50 and either of the first liquid crystal element 31 or the second liquid crystal element 32 is brought into conduction with each other. Moreover, the other of the first liquid crystal element 31 and the second liquid crystal element 32 is brought out of conduction with any of the above mentioned elements, which is brought out of conduction. FIGS. 1C1 and 1C2 illustrate each conducting state at that time. FIG. 1C1 illustrates the case where the connection between the second wiring 12, the first capacitor element 50, and the first liquid crystal element 31 is brought into conduction with each other, and further, the second liquid crystal element 32 is brought out of conduction. FIG. 1C2 illustrates the case where the connection between the second wiring 12, the first capacitor element 50, and the second liquid crystal element 32 is brought into conduction with each other, and further, the first liquid crystal element 31 is brought out of conduction. In the second conducting state, either of the conducting states can be obtained out the conducting states illustrated in FIGS. 1C1 and 1C2.

Under such a conducting state, the second voltage is applied to the first capacitor element 50 and the first liquid crystal element 31 (or the second liquid crystal element 32), and the second liquid crystal element 32 (or the first liquid crystal element 31) can hold the voltage before the second conducting state. Here, the second voltage is the data voltage, and different voltage values can be taken by the period in which the function (1) of the first pixel structure is repeated (also referred to as one frame period). Display of the liquid crystal display device is performed based on the second voltage which is written in a writing state.

Note that polarity of voltage applied to the liquid crystal element is reversed by a constant period (for example, one frame period), so that burn-in of the liquid crystal element can be prevented (referred to as inversion driving or AC driving). In order to realize the inversion driving, the state of $V_2 > V_1$ and the state of $V_2 < V_1$ are repeated in every one frame period, for example. Alternatively, it can be realized by repeating the state of $V_2 > V_4$ ($V_5$) and the state of $V_2 < V_4$ ($V_5$) in every one frame period.

In the second conducting state, the reason why the data voltage is written in the first liquid crystal element 31 (or the second liquid crystal element 32) and the second liquid crystal element 32 (or the first liquid crystal element 31) hold the voltage before to be in the second conducting state is as follows. That is, before in the third conducting state, a condition is needed, in which there is difference of written voltages between the first capacitor element and either of the first liquid crystal element 31 or the second liquid crystal element 32. Thus, the third conducting state can be effective, and as the result, the above mentioned operation A can be realized.

<Third Conducting State (Distribution)>

The third conducting state in the function (1) of the first pixel structure is that charge is distributed in the first capacitor element 50 and the one of the first liquid crystal element 31 and the second liquid crystal element 32 to which wiring is not performed in the second conducting state (one liquid crystal element which holds voltage before to be in the second conducting state), out of the elements (the first liquid crystal element 31, the second liquid crystal element 32, and the first capacitor element 50) electrically connected to the first circuit 10, and the voltage is changed by the distribution. Therefore, this state is referred to as a distribution state. Note that at this time, one of the first liquid crystal element 31 and the second liquid crystal element 32, in which charge is not distributed with the first capacitor element 50, holds the voltage before to be in the third conducting state.

The distribution state of the first circuit 10 is realized by the following conducting states of the first circuit 10. That is, the first capacitor element 50, and either of the first liquid crystal element 31 or the second liquid crystal element 32 to which writing is not performed in the second conducting state are brought into a conduction each other. Moreover, the other of the first liquid crystal element 31 and the second liquid crystal element 32 is brought out of conduction with any of the above mentioned elements, which is brought out of conduction. FIGS. 1D1 and 1D2 illustrate each conducting state at that time. FIG. 1D1 illustrates the case where the connection between the first capacitor element 50 and the second liquid crystal element 32 is brought into conduction with each other, and further, the first liquid crystal element 31 is brought out of conduction. FIG. 1D2 illustrates the case where the connection between the first capacitor element 50 and the first liquid crystal element 31 is brought into conduction with each other, and further, the second liquid crystal element 32 is brought out of conduction. The conducting state illustrated in FIG. 1D1 is performed in the case where the conducting state illustrated in FIG. 1C1 is selected in the second conducting state. On the other hand, the conducting state illustrated in FIG. 1D2 is performed in the case where the conducting state illustrated in FIG. 1C2 is selected in the second conducting state. Under such a conducting state, distribution of charge occurs in the first capacitor element 50 and the second liquid crystal element 32 (or the first liquid crystal element 31), and the first liquid crystal element 31 (or the second liquid crystal element 32) can hold the voltage before the third conducting state. Distribution of charge in the conducting state illustrated in FIG. 1D1 is realized by the following equations, and the voltage after the distribution of charge is determined.

$$C_{50}V_2+C_{32}V_1=C_{50}V_2'+C_{32}V_2' \quad \text{(Equation 1)}$$

The equation is solved with respect to $V_2'$.

$$V_2'=(C_{50}V_2+C_{32}V_1)/(C_{50}+C_{32}) \quad \text{(Equation 2)}$$

Here, $V_1$ is the first voltage, $V_2$ is the second voltage, $V_2'$ is the voltage after the distribution of charge, $C_{50}$ is capacitance of the first capacitor element 50, and $C_{32}$ is capacitance of the second liquid crystal element 32. Note that equation of distribution of charge in the conducting state illustrated in FIG. 1D2 can be obtained by capacitance $C_{31}$ of the first liquid crystal element 31 taking the place of capacitance $C_{32}$. Here, if the voltage of $V_1$ and $V_2$ are the same, $V_2'$ becomes equal to $V_2$, and thus, voltage is not changed by distribution of charge, which is the purpose of the third conducting state. In other words, this is the reason why the condition in which the level of the voltage written to the first capacitor element differs from the level of the voltage written to either of the first liquid crystal element 31 or the second liquid crystal element 32 before to be in the above mentioned third conducting state is needed.

In the third conducting state, the first liquid crystal element 31 (or the second liquid crystal element 32) holds voltage before to be in the third conducting state, the voltage of the second liquid crystal element 32 (or the first liquid crystal element 31) is changed by charge distribution with the first capacitor element 50, so that the voltage applied to the first liquid crystal element 31 can differ from the voltage applied to the second liquid crystal element 32. The difference of the voltages brings the difference of optical state of the liquid crystal molecule included in the liquid crystal element, and the difference of optical state of the liquid crystal molecule leads to improve the viewing angle of the liquid crystal display device. Furthermore, the difference of the voltages is realized by distribution of charge in the pixel circuit, so that voltage supply from the outside of the pixel circuit is not necessary. In other words, the above mentioned operation A can be satisfied, and thus, viewing angle can be improved without increasing circuit scale, driving speed, or the like for driving sub-pixels.

<Order of Conducting State>

As described above, the function that the first circuit 10 should have in the function (1) of the first pixel structure is that the conducting states which is needed to realize the above mentioned operation A and operation B can be obtained methodically. FIG. 1E simply illustrates the order of the conducting states of the function.

The first is as follows: first, the conducting state illustrated in FIG. 1B is obtained as the first conducting state; next the conducting state illustrated in FIG. 1C1 is obtained as the second conducting state; and next the conducting state illustrated in FIG. 1D1 is obtained as the third conducting state. Note that after obtaining the third conducting state, the conducting state illustrated in FIG. 1D2 can also be obtained as a fourth conducting state. In this case, two times of distributions are performed, and as the result of that, the difference of the voltages applied to the first liquid crystal element 31 and the second liquid crystal element 32 can be reduced compared to the case of single distribution.

The second is as follows: first, the conducting state illustrated in FIG. 1B is obtained as the first conducting state; next, the conducting state illustrated in FIG. 1C2 is obtained as the second conducting state; and next the conducting state illustrated in FIG. 1D2 is obtained as the third conducting state. Note that after obtaining the third conducting state, the conducting state illustrated in FIG. 1D1 can also be obtained as a fourth conducting state. In this case, two times of distributions are performed, and as the result of that, the difference of the voltages applied to the first liquid crystal element 31 and the second liquid crystal element 32 can be reduced compared to the case of single distribution.

The first circuit 10 in the first pixel structure has such functions, so that the above mentioned operation A and operation B can be realized. Therefore, a liquid crystal display device having the above mentioned can be realized.

<First Pixel Structure and Function (2)>

In the first pixel structure, there are other functions which the first circuit 10 should have in order to satisfy the above mentioned operation A and operation B at the same time. The function (1) of the first pixel structure is simply summarized as the function that the reset state, the writing state ($C_{50}$ and either of $C_{31}$ or $C_{32}$), and the distribution state ($C_{50}$ and either of $C_{32}$ or $C_{31}$) are realized in this order. The function (2) of the first pixel structure which is described below is described as the function that the reset state, the writing state (either of $C_{31}$ or $C_{32}$), and the distribution state ($C_{50}$ and either of $C_{32}$ or $C_{31}$) are realized in this order. This function will be described below. Note that the above description which is in common with the description of the function (1) of the first pixel structure is omitted.

<First Conducting State (Reset)>

The first conducting state in the function (2) of the first pixel structure is the state that voltage which is applied to each element (the first liquid crystal element 31, the second liquid crystal element 32, and the first capacitor element 50) electrically connected to the first circuit 10 is returned to the initial state. FIG. 2A illustrates the conducting state. Since the conducting state illustrated in FIG. 2A and the conducting state illustrated in FIG. 1B have similar operation and effect, detailed description is omitted.

<Second Conducting State (Writing)>

The second conducting state in the function (2) of the first pixel structure is that the data voltage is written selectively in the first liquid crystal element 31 and the second liquid crystal element 32, out of the elements (the first liquid crystal element 31, the second liquid crystal element 32, and the first capacitor element 50) electrically connected to the first circuit 10. At this time, the first capacitor element 50 holds voltage before to be in the second conducting state.

FIG. 2B1 illustrates the conducting state of the first circuit 10 in the second conducting state. In the second conducting state, the connection between the second wiring 12, the first liquid crystal element 31, and the second liquid crystal element 32 is brought into conduction with each other, and further, the first capacitor element 50 is brought out of conduction with any elements. Thus, the data voltage is written in the first liquid crystal element 31 and the second liquid crystal element 32 selectively, and the first capacitor element 50 can hold the voltage before to be the second conducting state.

Note that in the second conducting state, the conducting state illustrated in FIG. 2B2 can also be obtained instead of the conducting state illustrated in FIG. 2B1. In the conducting state illustrated in FIG. 2B2, there are two connection destinations between the second wiring 12 and the first circuit 10, and the respective connection destinations are brought into conduction with the first liquid crystal element 31 and the second liquid crystal element 32. As thus described, the case where a conductive path branches inside the first circuit 10 and where a plurality of elements are brought into conduction (for example, the conducting state illustrated in FIG. 2B1) can be taken place of the case where a conductive path branches outside the first circuit 10 and where each path is connected to the first circuit 10. This is not illustrated in other diagrams except for FIG. 2B2 in particular; however, it can be applied to all circuits described in this specification. As an example of other than FIG. 2B2, for example, in the reset state illustrated in FIGS. 1B, 2A, or the like, there are three connection destinations between the first wiring 11 and the first circuit 10, and each connection destination can be brought into conduction with the first capacitor element 50, the first liquid crystal element 31, and the second liquid crystal element 32.

<Third Conducting State (Distribution)>

In the third conducting state in the function (2) of the first pixel structure, charge is distributed in the first capacitor element 50 and either of the first liquid crystal element 31 or the second liquid crystal element 32, out of the elements (the first liquid crystal element 31, the second liquid crystal element 32, and the first capacitor element 50) electrically connected to the first circuit 10, and the voltage is changed by the distribution. At this time, one of the first liquid crystal element 31 and the second liquid crystal element 32, in which distribution of charge is not performed, holds voltage before to be in the third conducting state.

FIGS. 2C1 and 2C2 illustrate the conducting state of the first circuit 10 in the third conducting state. Since this is the same conducting state as the FIGS. 1D1 and 1D2, detailed description is omitted. The voltage applied to each element before to be the third conducting state differs from the voltage described in the function (1) of the first pixel structure, so that the voltage applied to each element after the distribution differs. Distribution of charge in the conducting state illustrated in FIG. 2C1 is realized by the following equations, and the voltage after the distribution of charge is determined.

$$C_{50}V_1+C_{32}V_2=C_{50}V_2''+C_{32}V_2'' \quad \text{(Equation 3)}$$

The equation is solved with respect to $V_2''$.

$$V_2''=(C_{50}V_1+C_{32}V_2)/(C_{50}+C_{32}) \quad \text{(Equation 4)}$$

Here, $V_2''$ is the voltage after the distribution of charge in the function (2) of the first pixel structure. Note that the equation of the distribution of charge in the conducting state illustrated in FIG. 2C2 can be obtained if the capacitance $C_{31}$ of the first liquid crystal element 31 takes the place of the capacitance $C_{32}$.

As thus described, in the function (2) of the first pixel structure, similar to the function (1) of the first pixel structure, in the third conducting state, the first liquid crystal element 31 (or the second liquid crystal element 32) holds voltage before to be in the third conducting state, and the voltage of the second liquid crystal element 32 (or the first liquid crystal element 31) is changed by distribution of charge with the first capacitor element 50, and as the result, the voltage applied to the first liquid crystal element 31 can differ from the voltage applied to the second liquid crystal element 32.

However, the voltage $V_2''$ after the distribution in the function (2) of the first pixel structure comes to be different from the voltage $V_2'$ after the distribution in the function (1) of the first pixel structure. The influence of this is described below with comparing the cases of the conducting states of FIGS. 1D1 and 2C1. The difference between Equation 2 which gives voltage $V_2'$ after the distribution in the function (1) of the first pixel structure and Equation 4 which gives voltage $V_2''$ after the distribution in the function (2) of the first pixel structure is a numerator of the right side. The portion concerned in Equation 2 is ($C_{50}V_2+C_{32}V_1$), and the portion concerned in Equation 4 is ($C_{50}V_1+C_{32}V_2$). $V_1$ is the reset voltage which gives black display to a liquid crystal element, and $V_2$ is the data voltage which gives a certain display to the liquid crystal element. Therefore, when the liquid crystal element is normally black, the relation is $V_1 \leqq V_2$. In other words, in Equation 2, the voltage $V_2'$ after the distribution is largely influenced by the size of $C_{50}$. In Equation 4, the voltage $V_2''$ after the distribution is largely influenced by the size of $C_{32}$. In accordance with the characteristics, for example in the case where control of variations among the pixels of $C_{32}$ is more difficult than the control of variations among the pixels of $C_{50}$, adoption of the function (1) of the first pixel structure, which is less influenced by variations among the pixels of $C_{32}$, can lead to more accurate control of the voltage after the distribution. On the contrary, in the case where control of variations among the pixels of $C_{50}$ is more difficult than the control of variations among the pixels of $C_{32}$, adoption of the function (2) of the first pixel structure, which is less influenced by variations among the pixels of $C_{50}$, can lead to more accurate control of the voltage after the distribution. Note that in that case of the liquid crystal element is normally white, the relation is reversed. As thus described, by the condition at manufacturing of the actual liquid crystal display device, the most suitable function can be selected as appropriate.

<Order of Conducting State>

Figure 2D:
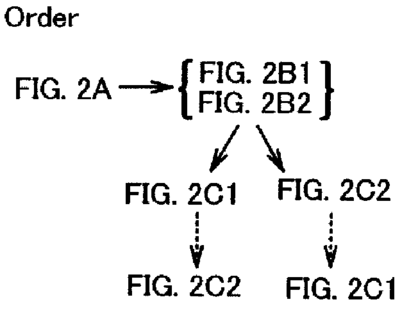

As described above, the function that the first circuit 10 should have in the function (2) of the first pixel structure is that the conducting states which is needed to realize the above mentioned operation A and operation B can be obtained methodically. FIG. 2D simply illustrates the order of the conducting states of the function.

The first is as follows: first, the conducting state illustrated in FIG. 2A is obtained as the first conducting state; next the conducting state illustrated in FIG. 2B1 or FIG. 2B2 is obtained as the second conducting state; and next the conducting state illustrated in FIG. 2C1 is obtained as the third conducting state. Note that after obtaining the third conducting state, the conducting state illustrated in FIG. 2C2 can also be obtained as a fourth conducting state. In this case, two times of distributions are performed, and as the result of that, the difference of the voltages applied to the first liquid crystal element 31 and the second liquid crystal element 32 can be reduced compared to the case of single distribution.

The second is as follows: first, the conducting state illustrated in FIG. 2A is obtained as the first conducting state; next the conducting state illustrated in FIG. 2B1 or FIG. 2B2 is obtained as the second conducting state; and next the conducting state illustrated in FIG. 2C2 is obtained as the third conducting state. Note that after obtaining the third conducting state, the conducting state illustrated in FIG. 2C1 can also be obtained as a fourth conducting state. In this case, two times of distributions are performed, and as the result of that, the difference of the voltages applied to the first liquid crystal element 31 and the second liquid crystal element 32 can be reduced compared to the case of single distribution.

The first circuit 10 in the first pixel structure has such functions, so that the above mentioned operation A and operation B can be realized. Therefore, a liquid crystal display device having the above described advantages can be realized.

<First Pixel Structure and Function (3)>

In the first pixel structure, there are other functions which the first circuit 10 should have in order to satisfy the above described operation A and operation B at the same time. The function (1) and (2) of the first pixel structure is a method in which two of the first capacitor element 50, the first liquid crystal element 31, and the second liquid crystal element 32 are selectively written in a writing state. In the function (1), the first capacitor element 50 and the first liquid crystal element 31 (or the second liquid crystal element 32) are selectively written, and in the function (2), the first liquid crystal element 31 and the second liquid crystal element 32 are selectively written. A function (3) of the first pixel structure, which is described below, is a method in which one of the first capacitor element 50, the first liquid crystal element 31, and the second liquid crystal element 32 is selectively written at the time of a writing state. More specifically, the first circuit 10 can obtain a conducting states of the reset state, the writing state (one of $C_{50}$, $C_{32}$, and $C_{31}$), distribution state 1 ($C_{50}$, and either of $C_{32}$ or $C_{31}$), and the distribution state 2 ($C_{50}$, and either of $C_{31}$ or $C_{32}$), and has a function to realize these conducting states methodically. Note that the above description which is in common with the description of the function (3) of the first pixel structure is omitted.

<First Conducting State (Reset)>

The first conducting state in the function (3) of the first pixel structure is the state that voltage which is applied to each elements (the first liquid crystal element 31, the second liquid crystal element 32, and the first capacitor element 50) electrically connected to the first circuit 10 is returned to the initial state. FIG. 3A illustrates the conducting state. Since the conducting state illustrated in FIG. 3A and the conducting state illustrated in FIG. 1B have similar operation and effect, detailed description is omitted.

<Second Conducting State (Writing)>

The second conducting state in the function (3) of the first pixel structure is that the data voltage is written selectively in one of the elements (the first liquid crystal element 31, the second liquid crystal element 32, and the first capacitor element 50) electrically connected to the first circuit 10. At that time, an element except to which the data voltage is written holds the voltage which is before to be the second conducting state.

FIG. 3B1 illustrates the conducting state of the first circuit 10 when data voltage is selectively written in the first capacitor element 50 in the second conducting state. In the conducting state illustrated in FIG. 3B1, the connection between the second wiring 12 and the first capacitor element 50 is brought into conduction with each other, and further, the first liquid crystal element 31 and the second liquid crystal element 32 are brought out of conduction with any elements.

Further, FIG. 3B2 illustrates the conducting state of the first circuit 10 when data voltage is selectively written in the first liquid crystal element 31 in the second conducting state. In the conducting state illustrated in FIG. 3B2, the connection between the second wiring 12 and the first liquid crystal element 31 is brought into conduction with each other, and further, the first capacitor element 50 and the second liquid crystal element 32 are brought out of conduction with any elements.

Further, FIG. 3B3 illustrates the conducting state of the first circuit 10 when data voltage is selectively written in the second liquid crystal element 32 in the second conducting state. In the conducting state illustrated in FIG. 3B3, the connection between the second wiring 12 and the second liquid crystal element 32 is brought into conduction with each other, and further, the first capacitor element 50 and the first liquid crystal element 31 are brought out of conduction with any elements.

The second conducting state in the function (3) of the first pixel structure can be any of the conducting states illustrated in FIGS. 3B1, 3B2, or 3B3. Thus, the data voltage is selectively written in one of the elements (the first liquid crystal element 31, the second liquid crystal element 32, and the first capacitor element 50) electrically connected to the first circuit 10, and elements except the element in which the data voltage is written can hold the voltage before to be the second conducting state.

<Third and Fourth Conducting States (Distribution)>

In the third conducting state in the function (3) of the first pixel structure, charge is distributed in the first capacitor element 50 and either of the first liquid crystal element 31 or the second liquid crystal element 32, out of the elements (the first liquid crystal element 31, the second liquid crystal element 32, and the first capacitor element 50) electrically connected to the first circuit 10, and the voltage is changed by the distribution. Moreover, although charge is distributed also in the fourth conducting state, at that time, charge is distributed to the first capacitor element 50 and the liquid crystal element which is different from the liquid crystal element to which charge is distributed with the first capacitor element 50 in the third conducting state out of the first liquid crystal element 31 and the second liquid crystal element 32.

FIG. 3C1 illustrates the conducting state of the first circuit 10 when charge is distributed in the second liquid crystal element 32 and the first capacitor element 50 in the third or the fourth conducting state. In the conducting state illustrated in FIG. 3C1, the connection between the first capacitor element 50 and the second liquid crystal element 32 is brought into conduction with each other, and further, the first liquid crystal element 31 is brought out of conduction with any elements.

FIG. 3C2 illustrates the conducting state of the first circuit 10 when charge is distributed in the first liquid crystal element 31 and the first capacitor element 50 in the third or the fourth conducting state. In the conducting state illustrated in FIG. 3C2, the connection between the first capacitor element 50 and the first liquid crystal element 31 is brought into conduction with each other, and further, the second liquid crystal element 32 is brought out of conduction with any elements.

<Order of Conducting State>

As described above, the function that the first circuit 10 should have in the function (3) of the first pixel structure is that the conducting states which is needed to realize the above mentioned operation A and operation B can be obtained methodically. FIG. 3D simply illustrates the order of the conducting states of the function.

The first is as follows: first, the conducting state illustrated in FIG. 3A is obtained as the first conducting state; next the conducting state illustrated in FIG. 3B1 is obtained as the second conducting state; next, the conducting state illustrated in FIG. 3C1 is obtained as the third conducting state; and next the conducting state illustrated in FIG. 3C2 is obtained as the fourth conducting state. Note that at the time of this order, when it is assumed that: the voltage after reset by the first conducting state is $V_1$; the voltage after writing by the second conductive state is $V_2$; the voltage after charge is distributed by the third conductive state is $V_2'$; and the voltage after charge is distributed by the fourth conductive state is $V_2''$, in the case where the liquid crystal element is normally black, $V_1<V_2''<V_2'<V_2$ is satisfied. In the case where the liquid crystal element is normally white, $V_2<V_2'<V_2''<V_1$ is satisfied. Specifically, after the fourth conducting state is obtained, the voltages applied to the liquid crystal elements are $V_2''$ for the first liquid crystal element 31 and $V_2'$ for the second liquid crystal element 32 (in the case of $V_4=V_5=0$). Thus, the above mentioned operation A and operation B can be realized, so that a liquid crystal display device having the above mentioned advantages can be realized.

The second is as follows: first, the conducting state illustrated in FIG. 3A is obtained as the first conducting state; next the conducting state illustrated in FIG. 3B1 is obtained as the second conducting state; next, the conducting state illustrated in FIG. 3C2 is obtained as the third conducting state; and next the conducting state illustrated in FIG. 3C1 is obtained as the fourth conducting state. Note that although magnitude relation of the voltages ($V_2'$, $V_2''$) generated by the change of the conducting state is the same as the first order, the relation of the voltage applied to each liquid crystal element is reversed. Specifically, after the fourth conducting state is obtained, the voltages applied to the liquid crystal elements are $V_2'$ for the first liquid crystal element 31 and $V_2''$ for the second liquid crystal element 32 (in the case of $V_4=V_5=0$). Thus, the above mentioned operation A and operation B can be realized, so that a liquid crystal display device having the above mentioned advantages can be realized.

The third is as follows: first, the conducting state illustrated in FIG. 3A is obtained as the first conducting state; next the conducting state illustrated in FIGS. 3B2 is obtained as the second conducting state; next, the conducting state illustrated in FIG. 3C2 is obtained as the third conducting state; and next the conducting state illustrated in FIG. 3C1 is obtained as the fourth conducting state. Note that although magnitude relation of the voltages ($V_2'$, $V_2''$) generated by the change of the conducting state is the same as the first order, the relation of the voltage applied to each liquid crystal element is reversed. Specifically, after the fourth conducting state is obtained, the voltages applied to the liquid crystal elements are $V_2'$ for the first liquid crystal element 31 and $V_2''$ for the second liquid crystal element 32 (in the case of $V_4=V_5=0$). Thus, the above mentioned operation A and operation B can be realized, so that a liquid crystal display device having the above mentioned advantages can be realized.

The fourth is as follows: first, the conducting state illustrated in FIG. 3A is obtained as the first conducting state; next the conducting state illustrated in FIG. 3B3 is obtained as the second conducting state; next, the conducting state illustrated in FIG. 3C1 is obtained as the third conducting state; and next the conducting state illustrated in FIG. 3C2 is obtained as the fourth conducting state. Magnitude relation of the voltage ($V_2'$, $V_2''$) generated by the change of the conducting state is the same as the first order. Specifically, after the fourth conducting state is obtained, the voltages applied to the liquid crystal elements are $V_2''$ for the first liquid crystal element 31 and $V_2'$ for the second liquid crystal element 32 (in the case of $V_4=V_5=0$). Thus, the above mentioned operation A and operation B can be realized, so that a liquid crystal display device having the above mentioned advantages can be realized.

It should be noted that the voltages ($V_2'$, $V_2''$) which is generated in the first order and the voltage ($V_2'$, $V_2''$) which is generated in the fourth order are not necessarily the same. This is because writing of data voltage in the first order is performed to the first capacitor element 50 while writing of data voltage in the fourth order is performed to the second liquid crystal element 32. In other words, even if the distribution states after the writing state are the same, capacitance of the first capacitor element 50 and the second liquid crystal element 32 differ, so that the sum-total amount of charge which is distributed differs, whereby the voltages to be generated after the distribution also differ. With the difference, there is an advantage that the suitable function can be selected according to the degree of variations in manufacturing of elements. Since the advantage has been already mentioned, detailed description is omitted. Note that the second order and the third order also have similar relation, so that there are similar advantages.

<Second Pixel Structure>

A pixel structure in which one first circuit 10 and two liquid crystal elements are included has been described so far. However, the number of liquid crystal elements included in the pixel structure in order to satisfy the above mentioned operation A and operation B at the same time may be two or more. Here, as the second pixel structure, a pixel structure in which one first circuit 10 and three liquid crystal elements are included is described.

In general, since viewing angle dependence of display can be well averaged as the number of sub-pixels increases, it has a profound effect on viewing angle expansion. However, in a conventional pixel structure, burdens of a peripheral circuit for driving increases as increase the number of sub-pixels, which lead to increase of power consumption or the like. However, a great advantage in a pixel structure in this embodiment mode is in that even if the number of sub-pixels increases, the driving can be realized by increase of the number of conducting states which perform distribution, and the burdens of the peripheral circuit hardly increases.

Figure 4A:
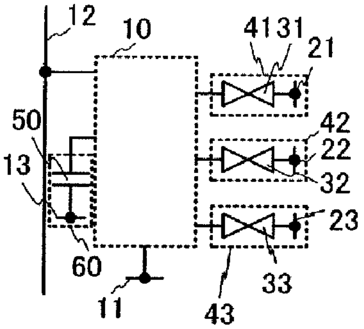
FIGS. 4A to 4C4 illustrate a conducting state of the first circuit 10 in the present invention.

FIG. 4A illustrates the second pixel structure. The second pixel structure is the structure that a third sub-pixel 43 is added to the first pixel structure illustrated in FIG. 1A. The third sub-pixel 43 includes a third liquid crystal element 33 and a sixth wiring 23. Then, one electrode of the third liquid crystal element 33 is electrically connected to the first circuit 10, and the other electrode is electrically connected to the sixth wiring 23. Note that it is assumed that voltage $V_6$ is applied to the sixth wiring 23.

Note that the first to sixth wirings which are in the circuit included in the second pixel structure can be classified as follows according to the role. The first wiring 11 can have a function as a reset line to which reset voltage $V_1$ is applied. The second wiring 12 can have a function as a data line to which the data voltage $V_2$ is applied. The third wiring 13 can have a function as a common line for controlling voltage applied to the first capacitor element 50. The fourth wiring 21 can have a function as a liquid crystal common electrode for controlling voltage applied to the first liquid crystal element 31. The fifth wiring 22 can have a function as a liquid crystal common electrode for controlling voltage applied to the second liquid crystal element 32. The sixth wiring 23 can have a function as a liquid crystal common electrode for controlling voltage applied to the third liquid crystal element 33. However, each wiring can have various roles without being limited to this. The wirings, in particular, for applying the same voltage can be common wirings which are electrically connected to each other. Since an area of wiring in a circuit can be reduced by sharing the wiring, aperture ratio can be improved, whereby power consumption can be reduced.

<Order of Conducting State>

Figure 4B:
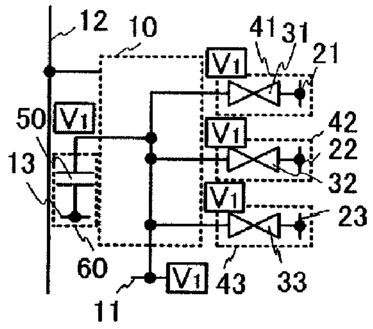
Figure 4B:
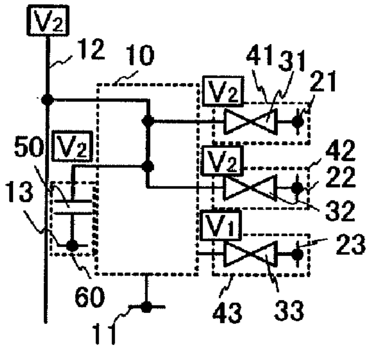
Figure 4B:
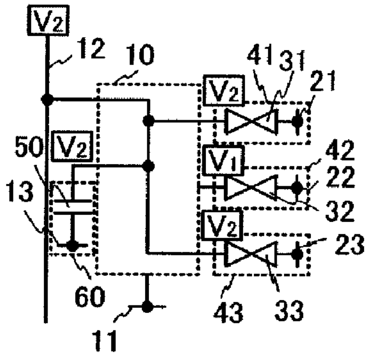
Figure 4B:
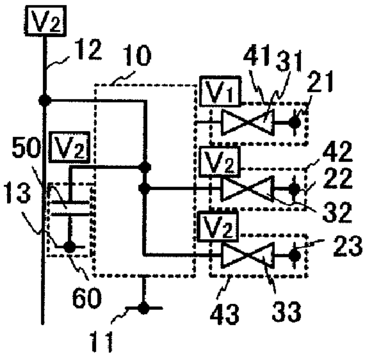
Figure 4B:
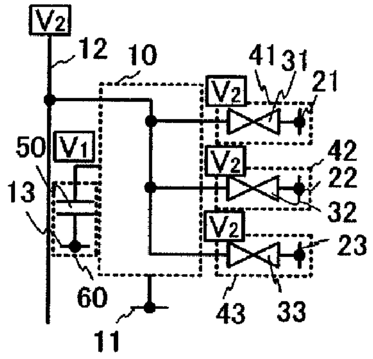

Similar to the first pixel structure, the function that the first circuit 10 should have in the second pixel structure is that the conducting states which are needed to realize the above mentioned operation A and operation B are obtained methodically. Detailed description of each conducting state is omitted here. FIG. 4B illustrates the reset state. FIG. 4C1 illustrates a writing state in which only the third liquid crystal element 33 is brought out of conduction. FIG. 4C2 illustrates a writing state in which only the second liquid crystal element 32 is brought out of conduction. FIG. 4C3 illustrates a writing state in which only the first liquid crystal element 31 is brought out of conduction. FIG. 4C4 illustrates the writing state in which only the first capacitor element 50 is in the nonconducting state. FIG. 5D1 illustrates a distribution state in which the connection between the first capacitor element 50 and the third liquid crystal element 33 is brought into conduction and the other elements are brought out of conduction. FIG. 5D2 illustrates a distribution state in which the connection between the first capacitor element 50 and the second liquid crystal element 32 is brought into conduction and the other elements are brought out of conduction. FIG. 5D3 illustrates a distribution state in which the connection between the first capacitor element 50 and the first liquid crystal element 31 is brought into conduction and the other elements are brought out of conduction.

Then, at least twelve patterns of order are possible as simply illustrated in FIG. 5E as the order of the conducting states of the function. Although detailed description is omitted, when the writing states of FIGS. 4C1 to 4C3 are obtained after the reset state of FIG. 4B, the connection between the liquid crystal element in which writing is not performed in a writing state and the first capacitor element 50 is brought into conduction as the first distribution state. After that, as the second distribution state, the liquid crystal element which is not brought into conduction with the first capacitor element 50 in the first distribution state is brought into conduction with the first capacitor element 50. Thus, when the writing states of FIGS. 4C1 to 4C3 are obtained, six patterns of order are possible in total because two patterns of distribution states can be possible. On the other hand, after the reset state of FIG. 4B, when the writing state of FIG. 4C4 is obtained, any one of the distribution states of FIGS. 5D1 to 5D3 can be obtained as the first distribution state. Then, since each of the three patterns of the first distribution states can take two patterns of the second distribution states, six patterns of order are possible in total. Therefore, twelve patterns of order are possible in total.

Note that there are other conducting states which are needed to realize the above mentioned operation A and operation B, other than the above mentioned conducting states. The above mentioned example is the case where, in the second pixel structure, in the writing state, three elements are written and the rest one element is not written out of four elements (the first capacitor element 50, the first liquid crystal element 31, the second liquid crystal element 32, and the third liquid crystal element 33). Alternatively, the following cases can be given: in the writing state, two elements are written and the rest two elements are not written out of four elements; and in the writing state, one element is written and the rest three elements are not written out of four elements. Although detailed description is omitted, even in any writing states, by adequately selecting the distribution states illustrated in FIGS. 5D1 to 5D3 after that, charge which is written is distributed to a plurality of the liquid crystal elements, and the above mentioned operation A and operation B can be realized.

Note that when the number of sub-pixels is four or more, by adequately selecting the writing state and the distribution state, charge which is written is distributed to a plurality of the liquid crystal elements, and the above mentioned operation A and operation B can be realized in a manner similar to the above mentioned examples. Thus, a liquid crystal display device having the above mentioned advantages can be realized.

Note that although this embodiment mode describes the content with reference to various diagrams, the content (can be part of the content) described in each diagram can be freely applied to, combined or replaced with the content (can be part of the content) described in a different diagram and with the content (can be part of the content) described in a different diagram of other embodiment modes. Further, in the above mentioned diagrams, each part can be combined with another part and another part of another embodiment mode.

Embodiment Mode 2

In this embodiment mode, the first pixel structure described in Embodiment Mode 1 is specifically described. In Embodiment Mode 1, description is made only focused on the conducting state inside of the first circuit 10. In this embodiment mode, description is made about the conducting states of a plurality of switches included in the first circuit 10, and about the timing (a timing chart) of switching the conducting states of each switch.

<Circuit Example (1)>

As a circuit example (1), FIGS. 6A to 6D illustrate a circuit which can realize function (1) and a part of the function (3) of the first circuit 10 described in Embodiment Mode 1. Here, the part of the function (3) is the function including a conducting state in which the data voltage is selectively written only in the first capacitor element 50 out of the function (3) which is already described.

Figure 6A:
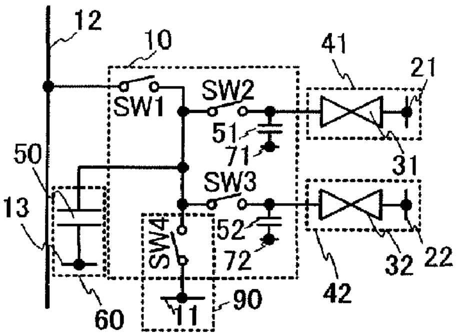
FIGS. 6A to 6F illustrate circuit examples of a pixel circuit in the present invention.

First, a circuit example illustrated in FIG. 6A is described. The circuit example illustrated in FIG. 6A includes a first switch (SW1), a second switch (SW2), a third switch (SW3), a fourth switch (SW4), the first capacitor element 50, a second capacitor element 51, a third capacitor element 52, the first liquid crystal element 31, the second liquid crystal element 32, the first wiring 11, the second wiring 12, the third wiring 13, the fourth wiring 21, the fifth wiring 22, a sixth wiring 71, and a seventh wiring 72.

One electrode of the first capacitor element 50 is electrically connected to the third wiring 13. Here, an electrode of the first capacitor element 50 which is different from the electrode which is electrically connected to the third wiring 13 is referred to as a capacitor electrode.

One electrode of the first liquid crystal element 31 is electrically connected to the fourth wiring 21. Here, an electrode of the first liquid crystal element 31 which is different from the electrode which is electrically connected to the fourth wiring 21 is referred to as a first pixel electrode.

One electrode of the second liquid crystal element 32 is electrically connected to the fifth wiring 22. Here, an electrode of the second liquid crystal element 32 which is different from the electrode which is electrically connected to the fifth wiring 22 is referred to as a second pixel electrode.

One electrode of the first switch SW1 is electrically connected to the second wiring 12, and the other electrode of the first switch SW1 is electrically connected to the capacitor electrode. One electrode of the second switch SW2 is electrically connected to the capacitor electrode, and the other electrode of the second switch SW2 is electrically connected to the first pixel electrode. One electrode of the third switch SW3 is electrically connected to the capacitor electrode, and the other electrode of the third switch SW3 is electrically connected to the second pixel electrode. One electrode of the fourth switch SW4 is electrically connected to the capacitor electrode, and the other electrode of the fourth switch SW4 is electrically connected to the first wiring 11.

One electrode of the second capacitor element 51 is electrically connected to the first pixel electrode, and the other electrode of the second capacitor element 51 is electrically connected to the sixth wiring 71. One electrode of the third capacitor element 52 is electrically connected to the second pixel electrode, and the other electrode of the third capacitor element 52 is electrically connected to the seventh wiring 72.

Note that the second capacitor element 51 and the third capacitor element 52 are provided for the first liquid crystal element 31 and the second liquid crystal element 32 respectively, in order that voltage change over time, which is applied to each liquid crystal element, is suppressed in a reset holding state or a data holding state which is mentioned below, that is, in order to holds the voltage. Here, voltage changing over time is caused by current when switches are in an off state (leakage current), leakage current which flows in the liquid crystal elements, change of capacitance of liquid crystal elements, or the like. Therefore, in the case where these have little influence, the second capacitor element 51 and third capacitor element 52 are not necessarily provided. Note that this can be applied to all circuits in this specification as well as the circuit example (1).

Note that it is preferable that capacitances $C_{50}$, $C_{51}$, and $C_{52}$ of the first capacitor element 50, the second capacitor element 51, and the third capacitor element 52 satisfy the magnitude relation of $C_{50}>C_{51}$ and $C_{50}>C_{52}$. This is because while the first capacitor element 50 is used alone in a distribution state, the second capacitor element 51 and the third capacitor element 52 are used as auxiliary capacitors of the first liquid crystal element 31 and the second liquid crystal element 32 respectively. More specifically, it is preferable that $(½)C_{50}>C_{51}$ and $(½)C_{50}>C_{52}$. The $C_{51}$ and $C_{52}$ may be nearly equal to each other, or may have difference in accordance with the size of respective pixel electrodes. For example, in the case where the size of the first pixel electrode is larger than that of the second pixel electrode, $C_{51}>C_{52}$ is preferable. Similarly, the capacitance $C_{31}$ of the first liquid crystal element 31 and capacitance $C_{32}$ of the second liquid crystal element 32 may be nearly equal to each other, or may have difference in accordance with the size of respective pixel electrodes. For example, in the case where the size of the first pixel electrode is larger than that of the second pixel electrode, $C_{31}>C_{32}$ is preferable.

<Control of Circuit Example (1)>

Next, the control timing of each switch in the circuit example illustrated in FIG. 6A is described with reference to FIG. 6E. The function (1) described in Embodiment Mode 1 can be realized by controlling each switch according to the timing chart illustrated in FIG. 6E. A horizontal axis of the timing chart illustrated in FIG. 6E indicates time. Conducting states of the first switch SW1, the second switch SW2, the third switch SW3, and the fourth switch SW4 are illustrated along the time axis. Furthermore, the voltages applied to the first capacitor element 50, the first liquid crystal element 31, and the second liquid crystal element 32 at each timing are also illustrated.

<Reset State>

First, the first circuit 10 is brought into a reset state in order to prevent the voltage written to a pixel in previous frame from exerting influence on the voltage written to a subsequent frame. A period <P1> indicates this state. The purpose of the period <P1> is that a reset voltage $V_1$ is applied to the first capacitor element 50, the first liquid crystal element 31, and the second liquid crystal element 32. On the other hand, it is preferable that the connection between the second wiring 12 to which the data voltage $V_2$ is applied and the first wiring 11 to which the reset voltage $V_1$ is applied is brought out of conduction. This is because the connection between the first wiring 11 and the second wiring 12 which have voltage difference is brought into conduction directly, whereby a large amount of current flows and power consumption increases. For the above reasons, in the period <P1>, the first switch SW1 is in an off state; the second switch SW2 is in an on state; the third switch SW3 is in an on state; and the fourth switch SW4 is in an on state. Although it is preferable that the period <P1> is nearly equal or the same length as one gate selection period, the period <P1> may be longer than one gate selection period considering the time to finish transferring the charge.

<Reset Holding State>

The purpose of a period <P2> is that the reset voltage $V_1$ is kept applied to the first liquid crystal element 31 and the second liquid crystal element 32. In addition, it is preferable that the connection between the second wiring 12 and the first wiring 11 is brought out of conduction, similar to the period <P1>. For the purpose, SW1 to SW4 are all in an off state in the timing chart illustrated in FIG. 6E. However, there are other states of each switch for achieving the above purpose other than the state illustrated in FIG. 6E. In other words, the purpose of the period <P2> can be achieved as long as the reset voltage $V_1$ is kept applied to the first liquid crystal element 31 and the second liquid crystal element 32; therefore, SW1 may be in an off state, and SW2 to SW4 may be in an on state, similar to the period <P1>, for example. In more general sense, as long as SW1 is in an off state, each of SW2 to SW4 may be either in an on state or in an off state. Thus, the reset voltage $V_1$ can be kept applied to the first liquid crystal element 31 and the second liquid crystal element 32, and the connection between the first wiring 11 and the second wiring 12 is not brought into conduction directly, so that the purpose of the period <P2> can be achieved.

Note that display device displays black in the period <P2>. Thus, image quality of moving image display is improved more as the period <P2> becomes longer. On the other hand, flicker of display can be reduced as the length of the period <P2> becomes shorter. Note that it is preferable that the period <P2> is longer than the period <P1>.

<Writing State>

The purpose of a period <P3> is that a data voltage $V_2$ is applied to the first capacitor element 50 and the first liquid crystal element 31. For the purpose, SW1 is in an on state; SW2 is in an on state; SW3 is in an off state; and SW4 is in an off state in the timing chart illustrated in FIG. 6E. Note that, in the circuit example (1), the data voltage $V_2$ can also be applied to the first capacitor element 50 and the second liquid crystal element 32 in the period <P3>. In that case, SW1 is in an on state; SW2 is in an off state; SW3 is in an on state; and SW4 is in an off state.

Figure 6B:
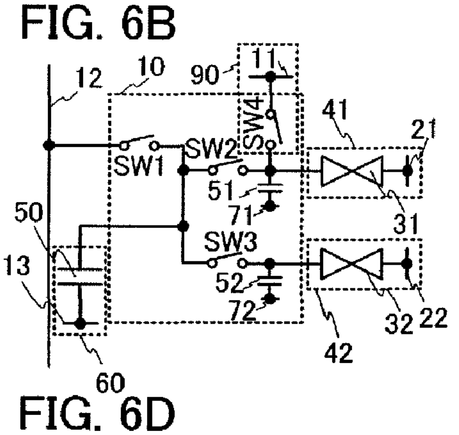
Figure 6C:
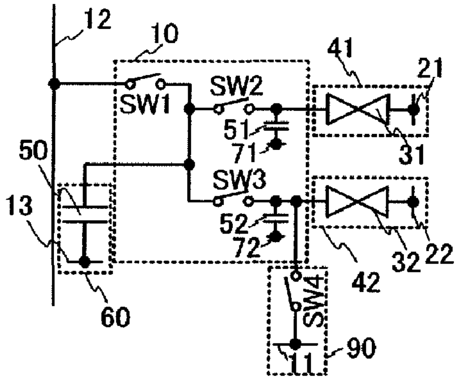
Figure 6D:
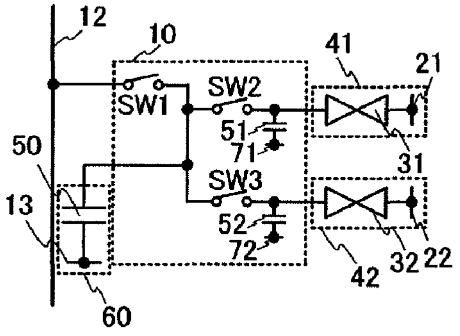
Figure 6E:
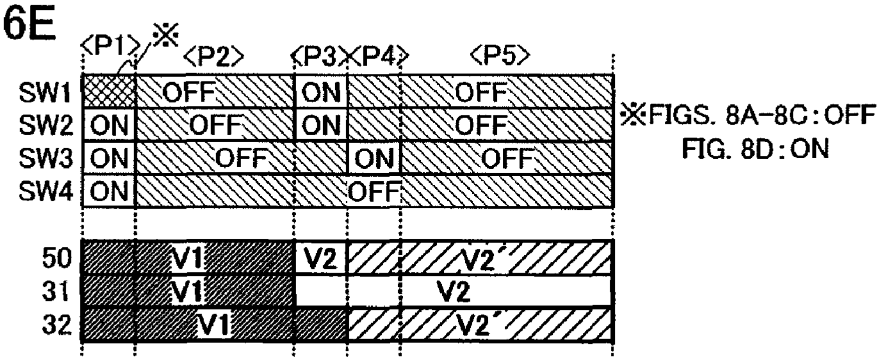

Under the conducting state in the period <P3>, as illustrated in FIG. 6E, the voltage applied to the first capacitor element 50 and the first liquid crystal element 31 (or the second liquid crystal element 32) becomes data voltage $V_2$, and the voltage applied to the second liquid crystal element 32 (or the first liquid crystal element 31) remains at the reset voltage $V_1$. Note that it is preferable that the period <P3> has nearly equal or the same length as one gate selection period has.

<Distribution State>

The purpose of a period <P4> is that the connection between the first capacitor element 50 and the second liquid crystal element 32 is brought into conduction, so that the charge is distributed. For the purpose, SW1 is in an off state; SW2 is in an off state; SW3 is in an on state; and SW4 are in an off state in the timing chart illustrated in FIG. 6E. Note that when the data voltage $V_2$ is applied to the first capacitor element 50 and the second liquid crystal element 32 in the period <P3>, the connection between the first capacitor element 50 and the first liquid crystal element 31 is brought into conduction, and the charge is distributed in period <P4>. In that case, SW1 is in an off state; SW2 is in an on state; SW3 is in an off state; and SW4 is in an off state.

As illustrated in FIG. 6E, under the conducting state in the period <P4>, the voltage applied to the first capacitor element 50 and the second liquid crystal element 32 (or the first liquid crystal element 31) becomes data voltage $V_2'$ after the distribution, and the voltage applied to the first liquid crystal element 31 (or the second liquid crystal element 32) remains as the data voltage $V_2$. Although it is preferable that the period <P4> has nearly equal or the same length as one gate selection period, the period <P4> may be longer than the period <P3> considering the time to finish transferring the charge.

<Data Holding State>

The purpose of a period <P5> is that the voltage applied to each liquid crystal element in the period <P4> is kept applied to the elements. In addition, it is preferable that the connection between the second wiring 12 and the first wiring 11 is brought out of conduction, similar to other periods. For the purpose, SW1 to SW4 are all in an off state in the timing chart illustrated in FIG. 6E. However, there are other states of each switch for achieving the above purposes other than the state illustrated in FIG. 6E. For example, as long as SW1, SW2, and SW4 are in an off state, SW3 may be either in an on state or in an off state. Under such a state, the voltage which is applied to each liquid crystal element in the period <P4> can be kept applied to each element, and the connection between the first wiring 11 and the second wiring 12 is not brought into conduction directly, so that the purpose of the period <P5> can be achieved. Note that it is preferable that the period <P5> is longer than the period <P3>.

<Control (2) of Circuit Example (1)>

Figure 6F:
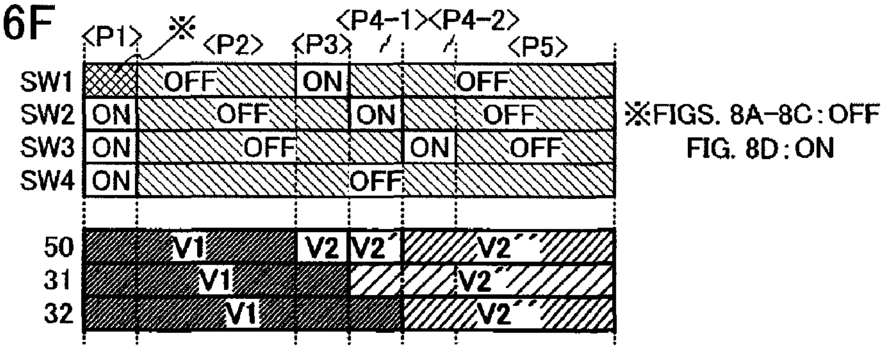

Next, another example of the control timing of each switch in the circuit example illustrated in FIG. 6A is described with reference to FIG. 6F. Part of the function (3) described in Embodiment Mode 1 can be realized by controlling each switch according to the timing chart illustrated in FIG. 6F. A display format of the timing chart illustrated in FIG. 6F is similar to the display format of the timing chart illustrated in FIG. 6E.

Here, the part of the function (3) is the function including a conducting state in which only the first capacitor element 50 is selectively written. Note that since the difference between conducting states of each switch in the control (1) of the circuit example (1) and in the control (2) of the circuit example (1) is only the writing state and the distribution state, detailed description of the other conducting states is omitted.

<Writing State>

The purpose of the period <P3> after the reset state in the period <P1> and the reset holding state in the period <P2> is that the data voltage $V_2$ is applied only to the first capacitor element 50. For the purpose, SW1 is in an on state; SW2 is in an off state; SW3 is in an off state; and SW4 is in an off state in the timing chart illustrated in FIG. 6F. The difference of the control (2) from the control (1) is that SW2 is in an off state which is in an on state in the control (1) of the circuit example (1). Because of this difference, the data voltage $V_2$ can be applied only to the first capacitor element 50. Note that it is preferable that the period <P3> is nearly equal or the same length as one gate selection period has.

<Distribution State>

The purpose of a period <P4-1> is that the connection between the first capacitor element 50 and the first liquid crystal element 31 is brought into conduction, so that the charge is distributed. For the purpose, SW1 is in an off state; SW2 is in an on state; SW3 is in an off state; and SW4 is in an off state in the timing chart illustrated in FIG. 6F. The purpose of a period <P4-2> is that the connection between the first capacitor element 50 and the second liquid crystal element 32 is brought into conduction, so that the charge is distributed. For the purpose, SW1 is in an off state; SW2 is in an off state; SW3 is in an on state; and SW4 are in an off state in the timing chart illustrated in FIG. 6F. Thus, charge is distributed to the first liquid crystal element 31 and the second liquid crystal element 32 at the different timings with the first capacitor element 50, so that as illustrated in FIG. 6F, the voltage applied to the first liquid crystal element 31 becomes data voltage $V_2'$, and the voltage applied to the first capacitor element 50 and the second liquid crystal element 32 becomes data voltage $V_2''$ after the second distribution. Although it is preferable that the period <P4-1> and the period <P4-2> each have nearly equal or the same length as one gate selection period, each of the period <P4-1> and the period <P4-2> may be longer than the period <P3> considering the time to finish transferring the charge.

Note that the order of distribution may be reversed between the first liquid crystal element 31 and the second liquid crystal element 32. In that case, the voltages applied to the first liquid crystal element 31 and the second liquid crystal element 32 after the second distribution are reversed compared to those in the above example.

<Other Examples of Circuit Example (1)>

Here, other circuit examples which can perform control similar to the above described circuit example (1) are described. In the circuit example (1) illustrated in FIG. 6A, the portion which includes the fourth switch SW4 and the first wiring 11 which is electrically connected to one electrode of the fourth switch SW4 is referred to as a reset circuit 90. In order that the first circuit 10 can be brought into the reset state, the reset circuit 90 may be electrically connected to any one of internal electrodes (typically, the capacitor electrode, the first pixel electrode, and the second pixel electrode) of the first circuit. In other words, a circuit illustrated in FIG. 6A is an example that the reset circuit 90 and the capacitor electrode are electrically connected. A circuit illustrated in FIG. 6B is an example that the reset circuit 90 and the first pixel electrode are electrically connected. A circuit illustrated in FIG. 6C is an example that the reset circuit 90 and the second pixel electrode are electrically connected. Note that since the control of the circuits illustrated in FIGS. 6B and 6C can be the same as that of illustrated in FIG. 6A which has already been described, detailed description is omitted.

A circuit illustrated in FIG. 6D is the example that the reset circuit 90 is omitted from the circuits illustrated in FIGS. 6A to 6C. In the circuit illustrated in FIG. 6D, the voltage supplied to the second wiring 12 is the data voltage $V_2$ in the period <P3> and the reset voltage $V_1$ in the period <P1>. In addition, the first switch SW1 is set to be in an on state in the period <P1>, so that a reset state is realized. On the other hand, the control similar to the above description is performed in the other periods, so that a writing state is realized. As thus described, the function similar to those of the circuits illustrated in FIGS. 6A to 6C can be realized by using the second wiring 12 and the first switch SW1 for reset, without using the reset circuit 90.

Note that the timing charts illustrated in FIGS. 6E and 6F are just examples, and there are other control methods which can achieve the purpose. Although other control methods of the circuit illustrated in FIG. 6A are described in detail, description of the circuits illustrated in FIGS. 6B to 6D is omitted. The conducting state of each switch of each circuit in other control methods may be determined the following thought described in the control method of the circuit illustrated in FIG. 6A.

<Circuit Example (2)>

As the circuit example (2), FIGS. 7A to 7D illustrate circuits which can realize the function (2) of the first circuit 10 described in Embodiment Mode 1.

Figure 7A:
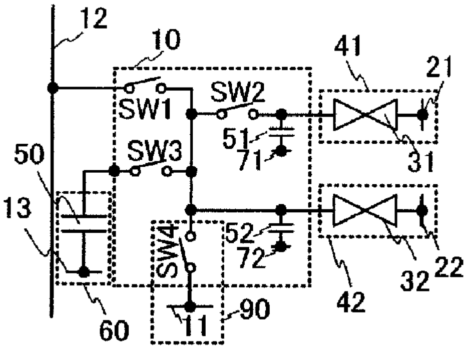
FIGS. 7A to 7E illustrate circuit examples of a pixel circuit in the present invention.

First, a circuit example illustrated in FIG. 7A is described. The circuit example illustrated in FIG. 7A includes the first switch (SW1), the second switch (SW2), the third switch (SW3), the fourth switch (SW4), the first capacitor element 50, the second capacitor element 51, the third capacitor element 52, the first liquid crystal element 31, the second liquid crystal element 32, the first wiring 11, the second wiring 12, the third wiring 13, the fourth wiring 21, the fifth wiring 22, the sixth wiring 71, and the seventh wiring 72.

One electrode of the first capacitor element 50 is electrically connected to the third wiring 13. Here, an electrode of the first capacitor element 50 which is different from the electrode which is electrically connected to the third wiring 13 is referred to as a capacitor electrode. This is similar to the circuit example (1).

One electrode of the first liquid crystal element 31 is electrically connected to the fourth wiring 21. Here, an electrode of the first liquid crystal element 31 which is different from the electrode which is electrically connected to the fourth wiring 21 is referred to as a first pixel electrode. This is similar to the circuit example (1).

One electrode of the second liquid crystal element 32 is electrically connected to the fifth wiring 22. Here, an electrode of the second liquid crystal element 32 which is different from the electrode which is electrically connected to the fifth wiring 22 is referred to as a second pixel electrode. This is similar to the circuit example (1).

One electrode of the first switch SW1 is electrically connected to the second wiring 12, and the other electrode of the first switch SW1 is electrically connected to the second pixel electrode. One electrode of the second switch SW2 is electrically connected to the second pixel electrode, and the other electrode of the second switch SW2 is electrically connected to the first pixel electrode. One electrode of the third switch SW3 is electrically connected to the capacitor electrode, and the other electrode of the third switch SW3 is electrically connected to the second pixel electrode. One electrode of the fourth switch SW4 is electrically connected to the second pixel electrode, and the other electrode of the fourth switch SW4 is electrically connected to the first wiring 11.

One electrode of the second capacitor element 51 is electrically connected to the first pixel electrode, and the other electrode of the second capacitor element 51 is electrically connected to the sixth wiring 71. One electrode of the third capacitor element 52 is electrically connected to the second pixel electrode, and the other electrode of the third capacitor element 52 is electrically connected to the seventh wiring 72.

<Control of Circuit Example (2)>

Figure 7B:
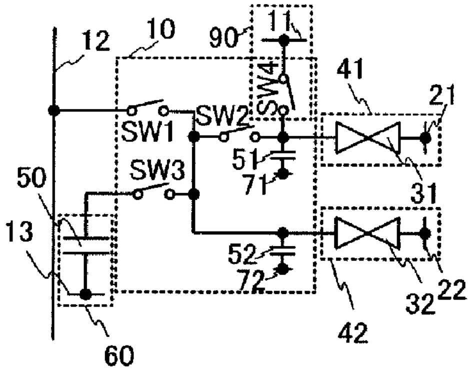
Figure 7C:
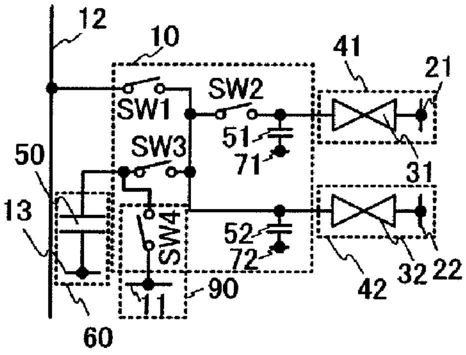

Next, the control timing of each switch in the circuit example illustrated in FIG. 7A is described with reference to FIG. 7E. The function (2) described in Embodiment Mode 1 can be realized by controlling each switch according to the timing chart illustrated in FIG. 7E. Although control timing of each switch of the timing chart illustrated in FIG. 7E is similar to that of FIG. 6E, the voltage values which are applied to the first capacitor element 50, the first liquid crystal element 31, and the second liquid crystal element 32 which are illustrated in lower part of FIG. 7E is different from those illustrated in FIG. 6E.

Note that description of the common portion with the circuit example (1) is omitted.

<Reset State>

First, the first circuit 10 is brought into a reset state in order to prevent the voltage written to a pixel in previous frame from exerting influence on the voltage written to a subsequent frame. A period <P1> indicates this state. The purpose of the period <P1> is that a reset voltage $V_1$ is applied to the first capacitor element 50, the first liquid crystal element 31, and the second liquid crystal element 32. On the other hand, it is preferable that the connection between the second wiring 12 to which the data voltage $V_2$ is applied and the first wiring 11 to which the reset voltage $V_1$ is applied is brought out of conduction. This is because the connection between the first wiring 11 and the second wiring 12 which have voltage difference is brought into conduction directly, whereby a large amount of current flows and power consumption increases.

For the above reasons, in the period <P1>, the first switch SW1 is in an off state; the second switch SW2 is in an on state; the third switch SW3 is in an on state; and the fourth switch SW4 is in an on state. Although it is preferable that the period <P1> is nearly equal or the same length as one gate selection period, the period <P1> may be longer than one gate selection period considering the time to finish transferring the charge.

<Reset Holding State>

The purpose of a period <P2> is that the reset voltage $V_1$ is kept applied to the first liquid crystal element 31 and the second liquid crystal element 32. In addition, it is preferable that the connection between the second wiring 12 and the first wiring 11 is brought out of conduction, similar to the period <P1>. For the purpose, SW1 to SW4 are all in an off state in the timing chart illustrated in FIG. 7E. However, there are other states of each switch for achieving the above purpose other than the state illustrated in FIG. 7E. In other words, the purpose of the period <P2> can be achieved as long as the reset voltage $V_1$ is kept applied to the first liquid crystal element 31 and the second liquid crystal element 32; therefore, SW1 may be in an off state, and SW2 to SW4 may be in an on state, similar to the period <P1>, for example. In a more general sense, as long as SW1 is in an off state, each of SW2 to SW4 may be either in an on state or in an off state. Under such a state, the reset voltage $V_1$ can be kept applied to the first liquid crystal element 31 and the second liquid crystal element 32, and the connection between the first wiring 11 and the second wiring 12 is not brought into conduction directly, so that the purpose of the period <P2> can be achieved.

Note that display device displays black in the period <P2>. Thus, image quality of moving image display is improved more as the period <P2> becomes longer. On the other hand, flicker of display can be reduced as the length of the period <P2> becomes shorter. Note that it is preferable that the period <P2> is longer than the period <P1>.

<Writing State>

The purpose of the period <P3> is that while the data voltage $V_2$ is applied to the first liquid crystal element 31 and the second liquid crystal element 32, the reset voltage $V_1$ is kept applied to the first capacitor element 50. For the purpose, SW1 is in an on state; SW2 is in an on state; SW3 is in an off state; and SW4 is in an off state in the timing chart illustrated in FIG. 7E. Note that it is preferable that the period <P3> has nearly equal or the same length as one gate selection period has.

<Distribution State>

The purpose of the period <P4> is that the connection between the first capacitor element 50 and the second liquid crystal element 32 is brought into conduction, so that the charge is distributed. For the purpose, SW1 is in an off state; SW2 is in an off state; SW3 is in an on state; and SW4 is in an off state in the timing chart illustrated in FIG. 7E.

As illustrated in FIG. 7E, under the conducting state in the period <P4>, the voltage applied to the first capacitor element 50 and the second liquid crystal element 32 (or the first liquid crystal element 31) becomes data voltage $V_2'$ after the distribution, and the voltage applied to the first liquid crystal element 31 (or the second liquid crystal element 32) remains as the data voltage $V_2$. Although it is preferable that the period <P4> has nearly equal or the same length as one gate selection period, the period <P4> may be longer than the period <P3> considering the time to finish transferring the charge.

<Data Holding State>

The purpose of a period <P5> is that the voltage applied to each liquid crystal element in the period <P4> is kept applied to the elements. In addition, it is preferable that the connection between the second wiring 12 and the first wiring 11 is brought out of conduction, similar to other periods. For the purpose, SW1 to SW4 are all in an off state in the timing chart illustrated in FIG. 7E. However, there are other states of each switch for achieving the above purposes other than the state illustrated in FIG. 7E. For example, as long as SW1, SW2, and SW4 are in an off state, SW3 may be either in an on state or in an off state. Under such a state, the voltage which is applied to each liquid crystal element in the period <P4> can be kept applied to each element, and the connection between the first wiring 11 and the second wiring 12 is not brought into conduction directly, so that the purpose of the period <P5> can be achieved. Note that it is preferable that the period <P5> is longer than the period <P3>.

Note that in FIG. 7A, the second switch SW2 is provided between the first liquid crystal element 31 and the first switch SW1; however, the second switch SW2 may be provided between the second liquid crystal element 32 and the first switch SW1. Specifically, each electrode which is included in the first switch SW1, the third switch SW3 and the fourth switch SW4 and which is electrically connected to the second pixel electrode in FIG. 7A may be electrically connected to the first pixel electrode, not to the second pixel electrode. In that case, the voltages applied to the first liquid crystal element 31 and the second liquid crystal element 32 after the distribution are reversed compared to the above example. Note that the voltages applied to the first liquid crystal element 31 and the second liquid crystal element 32 after the distribution are changed each other by changing the arrangement of the second switch SW2, and this can be applied to the other circuits (for example circuits illustrated in FIGS. 7B, 7C, and 7D).

<Other Examples of Circuit Example (2)>

Here, other circuit examples which can perform control similar to the above described circuit example (2) are described. In the circuit example (2) illustrated in FIG. 7A, the portion which includes the fourth switch SW4 and the first wiring 11 which is electrically connected to one electrode of the fourth switch SW4 is referred to as the reset circuit 90 as in the circuit example (1). In order that the first circuit 10 can be brought into the reset state, the reset circuit 90 may be electrically connected to any one of internal electrodes (typically, the capacitor electrode, the first pixel electrode, and the second pixel electrode) of the first circuit. In other words, a circuit illustrated in FIG. 7A is an example that the reset circuit 90 and the capacitor electrode are electrically connected. A circuit illustrated in FIG. 7B is an example that the reset circuit 90 and the first pixel electrode are electrically connected. A circuit illustrated in FIG. 7C is an example that the reset circuit 90 and the second pixel electrode are electrically connected. Note that since the control of the circuits illustrated in FIGS. 7B and 7C can be the same as that of illustrated in FIG. 7A which has already described, detailed description is omitted.

Figure 7D:
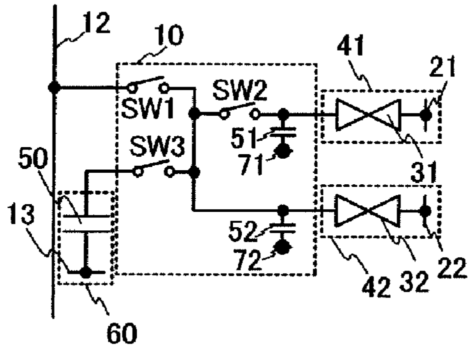
Figure 7E:
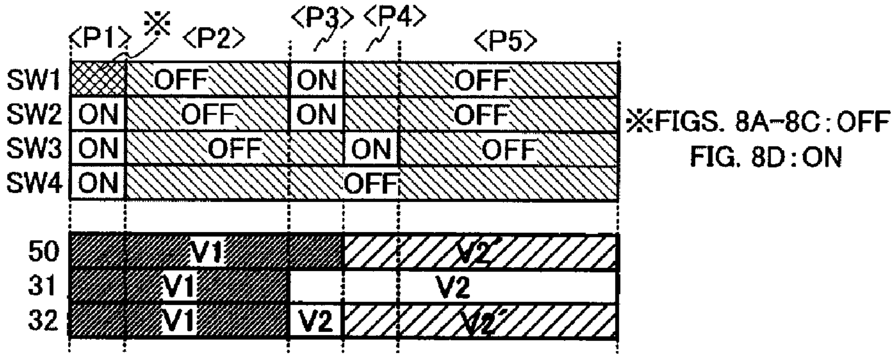

A circuit illustrated in FIG. 7D is the example that the reset circuit 90 is omitted from the circuits illustrated in FIGS. 7A to 7C. In the circuit illustrated in FIG. 7D, the reset state is realized by using the second wiring 12 and the first switch SW1 without using the reset circuit 90. That is, in the circuit illustrated in FIG. 7D, the voltage supplied to the second wiring 12 is the data voltage $V_2$ in the period <P3> and the reset voltage $V_1$ in the period <P1>. In addition, the first switch SW1 comes to be in an on state in the period <P1>, so that the reset state is realized. On the other hand, the control similar to the above description is performed in the other periods, so that a writing state is realized. As thus described, the function similar to those of the circuits illustrated in FIGS.

7A to 7C can be realized by using the second wiring 12 and the first switch SW1 for reset, without using the reset circuit 90.

<Circuit Example (3)>

Next, as the circuit example (3), FIGS. 8A to 8D illustrate circuits which can realize the function (1) and part of the function (3) of the first circuit 10 which are described in Embodiment Mode 1. The part of the function (3) of the circuit example (3) is the function including a conducting state that the data voltage is selectively written only to the first liquid crystal element 31. Note that, here, only the function including a conducting state that the data voltage is selectively written only to the first liquid crystal element 31 is described out of the above described function (3). However, it is clear that if the arrangement of the first liquid crystal element 31 and the second liquid crystal element 32 illustrated in FIGS. 8A to 8D are exchanged, the function including a conducting state that the data voltage is selectively written only to the second liquid crystal element 32 can be realized in the above described function (3).

Figure 8A:
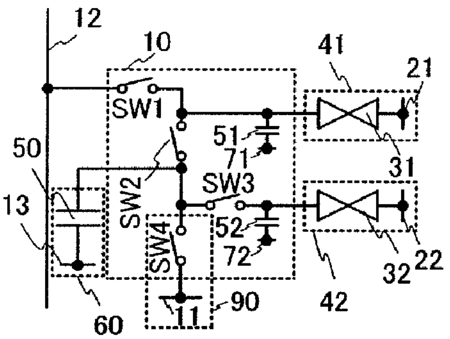
FIGS. 8A to 8F illustrate circuit examples of a pixel circuit in the present invention.

First, a circuit example illustrated in FIG. 8A is described. The circuit example illustrated in FIG. 8A includes the first switch (SW1), the second switch (SW2), the third switch (SW3), the fourth switch (SW4), the first capacitor element 50, the second capacitor element 51, the third capacitor element 52, the first liquid crystal element 31, the second liquid crystal element 32, the first wiring 11, the second wiring 12, the third wiring 13, the fourth wiring 21, the fifth wiring 22, the sixth wiring 71, and the seventh wiring 72.

One electrode of the first capacitor element 50 is electrically connected to the third wiring 13. Here, an electrode of the first capacitor element 50 which is different from the electrode which is electrically connected to the third wiring 13 is referred to as a capacitor electrode. This is similar to the circuit examples (1) and (2).

One electrode of the first liquid crystal element 31 is electrically connected to the fourth wiring 21. Here, an electrode of the first liquid crystal element 31 which is different from the electrode which is electrically connected to the fourth wiring 21 is referred to as a first pixel electrode. This is similar to the circuit examples (1) and (2).

One electrode of the second liquid crystal element 32 is electrically connected to the fifth wiring 22. Here, an electrode of the second liquid crystal element 32 which is different from the electrode which is electrically connected to the fifth wiring 22 is referred to as a second pixel electrode. This is similar to the circuit examples (1) and (2).

One electrode of the first switch SW1 is electrically connected to the second wiring 12, and the other electrode of the first switch SW1 is electrically connected to the first pixel electrode. One electrode of the second switch SW2 is electrically connected to the first pixel electrode, and the other electrode of the second switch SW2 is electrically connected to the capacitor electrode. One electrode of the third switch SW3 is electrically connected to the capacitor electrode, and the other electrode of the third switch SW3 is electrically connected to the second pixel electrode. One electrode of the fourth switch SW4 is electrically connected to the capacitor electrode, and the other electrode of the fourth switch SW4 is electrically connected to the first wiring 11.

One electrode of the second capacitor element 51 is electrically connected to the first pixel electrode, and the other electrode of the second capacitor element 51 is electrically connected to the sixth wiring 71. One electrode of the third capacitor element 52 is electrically connected to the second pixel electrode, and the other electrode of the third capacitor element 52 is electrically connected to the seventh wiring 72.

<Control (1) of Circuit Example (3)>

Figure 8B:
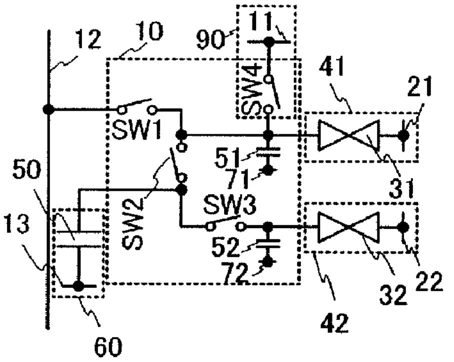
Figure 8C:
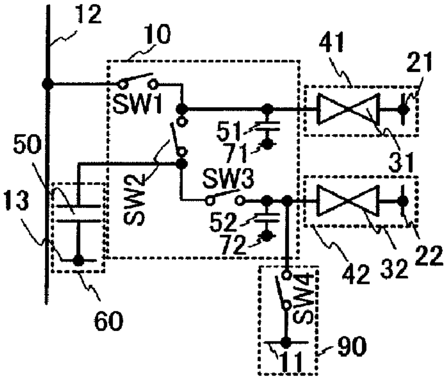
Figure 8D:
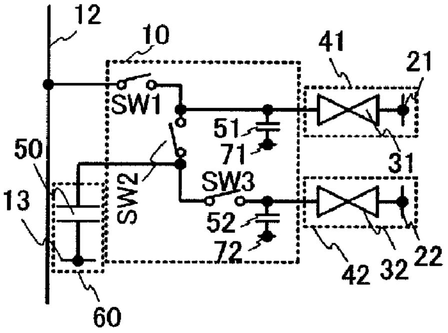
Figure 8E:
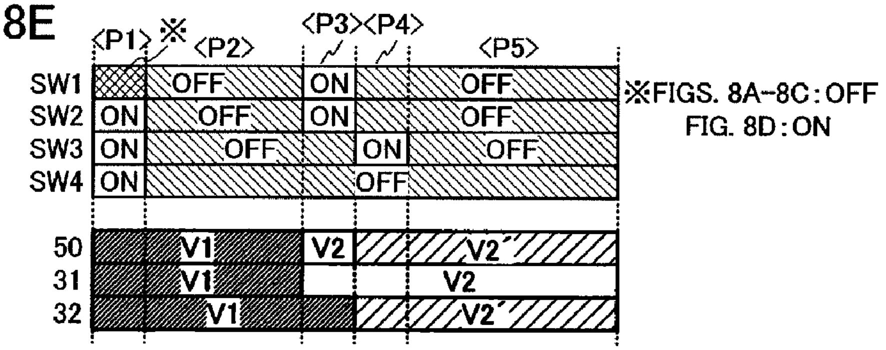

Similar to the above mentioned control (1) of the circuit example (1), the function (1) described in Embodiment Mode 1 can be realized by controlling each switch included in the circuit example (3) in accordance with the timing chart illustrated in FIG. 8E. The control method is referred to as control (1) of the circuit example (3). Since the control (1) of the circuit example (1) has been already described, a detailed description of the control (1) of the circuit example (3) is omitted. Briefly, the function (1) described in Embodiment Mode 1 can be realized through each state in the following order: a reset state in which only SW1 is in an off state, a reset holding state in which all switches are in an off state (or the same as the reset state), a writing state in which SW3 and SW4 are in an off state, a distribution state in which only SW3 is in an on state, and a data holding state in which all switches are in an off state (or the same as the distribution state). Note that control timing of each switch of the timing chart illustrated in FIG. 8E is similar to that of FIG. 6E, and the voltage values which are applied to the first capacitor element 50, the first liquid crystal element 31, and the second liquid crystal element 32 which are illustrated in lower part of FIG. 8E are similar to those of illustrated in FIG. 6E.

<Control (2) of Circuit Example (3)>

Figure 8F:
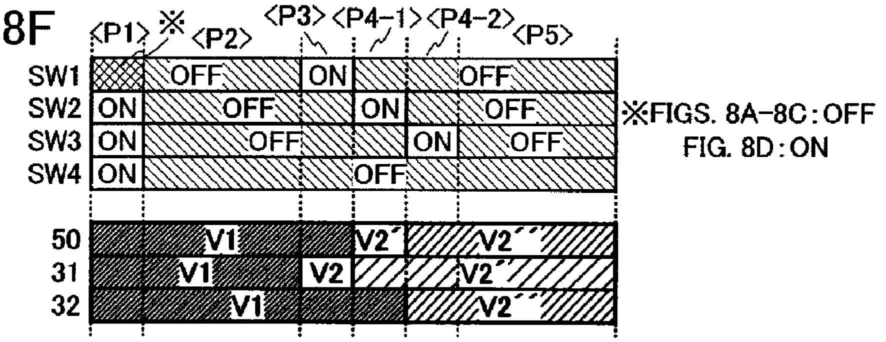

Furthermore, similar to the above mentioned control (2) of the circuit example (1), part of the function (3) described in Embodiment Mode 1 can be realized by controlling each switch included in the circuit example (3) in accordance with the timing chart illustrated in FIG. 8F. This control method is referred to as control (2) of the circuit example (3). Since the control (2) of the circuit example (1) has been already described, a detailed description of the control (2) of the circuit example (3) is omitted. Briefly, the function (3) described in Embodiment Mode 1 can be realized through each state in the order as follows: a reset state in which only SW1 is in an off state, a reset holding state in which all switches are in an off state (or the same as the reset state), a writing state in which only SW1 is in an on state, a distribution state (1) in which only SW2 is in an on state, a distribution state (2) in which only SW3 is in an on state, and a data holding state in which all switches are in an off state (or the same as the distribution state (2)). Note that control timing of each switch of the timing chart illustrated in FIG. 8F is similar to that of FIG. 6F, the voltage values which are applied to the first capacitor element 50, the first liquid crystal element 31, and the second liquid crystal element 32 which are illustrated in lower part of FIG. 8F are different from those of illustrated in FIG. 6F.

<Other Examples of Circuit Example (3)>

Here, other circuit examples which can perform control similar to the above described circuit example (3) are described. In the circuit example (3) illustrated in FIG. 8A, the portion which includes the fourth switch SW4 and the first wiring 11 which is electrically connected to one electrode of the fourth switch SW4 is referred to as the reset circuit 90 as in the circuit example (1) or the circuit example (2). In order that the first circuit 10 can be brought into the reset state, the reset circuit 90 may be electrically connected to any one of internal electrodes (typically, the capacitor electrode, the first pixel electrode, and the second pixel electrode) of the first circuit. In other words, a circuit illustrated in FIG. 8A is an example that the reset circuit 90 and the capacitor electrode are electrically connected. A circuit illustrated in FIG. 8B is an example that the reset circuit 90 and the first pixel electrode are electrically connected. A circuit illustrated in FIG. 8C is an example that the reset circuit 90 and the second pixel electrode are electrically connected. Note that since the control of the circuits illustrated in FIGS. 8B and 8C can be the same as that of illustrated in FIG. 8A which has already described, detailed description is omitted.

A circuit illustrated in FIG. 8D is the example that the reset circuit 90 is omitted from the circuits illustrated in FIGS. 8A to 8C. In the circuit illustrated in FIG. 8D, the reset state is realized by using the second wiring 12 and the first switch SW1 without using the reset circuit 90. That is, in the circuit illustrated in FIG. 8D, the voltage supplied to the second wiring 12 is the data voltage $V_2$ in the period <P3> and the reset voltage $V_1$ in the period <P1>. In addition, the first switch SW1 comes to be in an on state in the period <P1>, so that the reset state is realized. On the other hand, the control similar to the above description is performed in the other periods, so that a writing state is realized. As thus described, the function similar to those of the circuits illustrated in FIGS. 8A to 8C can be realized by using the second wiring 12 and the first switch SW1 for reset, without using the reset circuit 90.

<Circuit Example (4)>

Figure 9A:
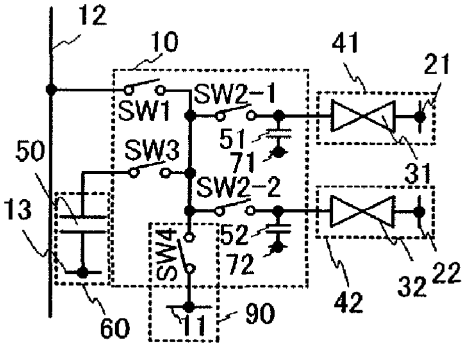
FIGS. 9A to 9E illustrate circuit examples of a pixel circuit in the present invention.

Next, as the circuit example (4), FIG. 9A illustrates a circuit which can realize the function (1), function (2), and function (3) of the first circuit 10 which are in described in Embodiment Mode 1. A feature of the circuit example (4) is that by making the number of switches have redundancy, various functions can be realized by control of switches without changing the circuit structure.

The circuit example illustrated in FIG. 9A includes the first switch (SW1), a second switch (SW2-1), the third switch (SW3), the fourth switch (SW4), a fifth switch (SW2-2), the first capacitor element 50, the second capacitor element 51, the third capacitor element 52, the first liquid crystal element 31, the second liquid crystal element 32, the first wiring 11, the second wiring 12, the third wiring 13, the fourth wiring 21, the fifth wiring 22, the sixth wiring 71, and the seventh wiring 72.

One electrode of the first capacitor element 50 is electrically connected to the third wiring 13. Here, an electrode of the first capacitor element 50 which is different from the electrode which is electrically connected to the third wiring 13 is referred to as a capacitor electrode. This is similar to the circuit examples (1), (2), and (3).

One electrode of the first liquid crystal element 31 is electrically connected to the fourth wiring 21. Here, an electrode of the first liquid crystal element 31 which is different from the electrode which is electrically connected to the fourth wiring 21 is referred to as a first pixel electrode. This is similar to the circuit examples (1), (2), and (3).

One electrode of the second liquid crystal element 32 is electrically connected to the fifth wiring 22. Here, an electrode of the second liquid crystal element 32 which is different from the electrode which is electrically connected to the fifth wiring 22 is referred to as a second pixel electrode. This is similar to the circuit examples (1), (2), and (3).

Furthermore, electrical connections of each element of the circuit example illustrated in FIG. 9A is described below, assuming that an internal electrode P is provided in the circuit example (4) in addition to the above mentioned elements.

One electrode of the first switch SW1 is electrically connected to the second wiring 12, and the other electrode of the first switch SW1 is electrically connected to the internal electrode P. One electrode of the second switch SW2-1 is electrically connected to the internal electrode P, and the other electrode of the second switch SW2-1 is electrically connected to the first pixel electrode. One electrode of the third switch SW3 is electrically connected to the internal electrode P, and the other electrode of the third switch SW3 is electrically connected to the capacitor electrode. One electrode of the fourth switch SW4 is electrically connected to the internal electrode P, and the other electrode of the fourth switch SW4 is electrically connected to the first wiring 11. One electrode of the fifth switch SW2-2 is electrically connected to the internal electrode P, and the other electrode of the fifth switch SW2-2 is electrically connected to the second pixel electrode.

One electrode of the second capacitor element 51 is electrically connected to the first pixel electrode, and the other electrode of the second capacitor element 51 is electrically connected to the sixth wiring 71. One electrode of the third capacitor element 52 is electrically connected to the second pixel electrode, and the other electrode of the third capacitor element 52 is electrically connected to the seventh wiring 72.

In the circuit example (4) illustrated in FIG. 9A, the functions (1), (2), and (3) included in the above described first circuit 10 can be realized by each switch controlled adequately. As thus described, the methods for controlling each switch in order to realize various functions are described with reference to FIGS. 10A to 10D.

Note that in FIGS. 10A to 10D, the state of each switch is illustrated with “ON” or “OFF” in respective conducting states (a reset state, a reset holding state, a writing state, a distribution state, and a data holding state). The reset state, the reset holding state, and the data holding state out of these conducting states are the same in FIGS. 10A to 10D. In other words, in the reset state, only SW1 is in an off state, and the other are in an on state. In the reset holding state, all switches are in an off state (or same as the reset state). In the data holding state, all switches are in an off state (or same as the distribution state). Detailed description of them is omitted because the description has been already made. Here, the state of each switch in a writing state and a distribution state is described.

Note that as for all controlling methods for illustrated in FIGS. 10A to 10D, the methods for controlling the second switch (SW2-1) and the fifth switch (SW2-2) are interchangeable. In other words, even if SW2-1 is controlled by the control method as the case of SW2-2, and if SW2-2 is controlled by the control method as the case of SW2-1, it is clear that only the roles of the first sub-pixel and the second sub-pixel are exchanged as the result of that, and the essential operation is not changed.

<Control (1) of Circuit Example (4)>

Figure 10A:
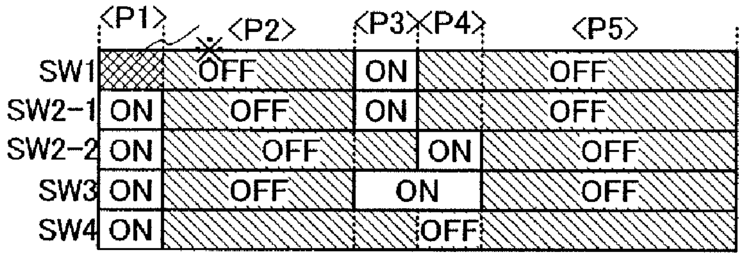
FIGS. 10A to 10D illustrate circuit examples of a pixel circuit in the present invention.

The case where each switch is controlled as illustrated in FIG. 10A is described as the control (1) of the circuit example (4). The control method illustrated in FIG. 10A is a control method when the function (1) which is realized by the circuit example (1) or (3) is realized by the circuit example (4). The control method illustrated in FIG. 10A is as follows: first, after a reset state and a reset holding state, in the writing state, SW1 is in an on state; SW2-1 is in an on state; SW2-2 is in an off state; SW3 is in an on state; and SW4 is in an off state. Thus, the data voltage $V_2$ can be written in the first capacitor element 50 and the first liquid crystal element 31, and the reset voltage $V_1$ can be kept applied to the second liquid crystal element 32. In a distribution state which is after the writing state, SW1 is in an off state; SW2-1 is in an off state; SW2-2 is in an on state; SW3 is in an on state; and SW4 is in an off state. Thus, charge can be distributed in the first capacitor element 50 and the second liquid crystal element 32. Then, after the distribution state, a data holding state is obtained according to the above described method.

<Control (2) of Circuit Example (4)>

Figure 10B:
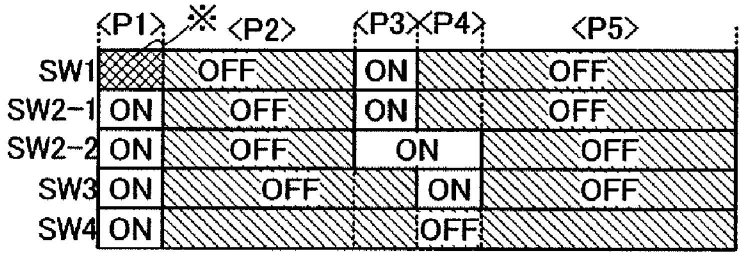

The case where each switch is controlled as illustrated in FIG. 10B is described as the control (2) of the circuit example (4). The control method illustrated in FIG. 10B is a control method when the function (2) which is realized by the circuit example (2) is realized by the circuit example (4). The control method illustrated in FIG. 10B is as follows: first, after a reset state and a reset holding state, in a writing state, SW1 is in an on state; SW2-1 is in an on state; SW2-2 is in an on state; SW3 is in an off state; and SW4 is in an off state. Thus, the data voltage $V_2$ can be written in the first liquid crystal element 31 and the second liquid crystal element 32, and the reset voltage $V_1$ can be kept applied to the first capacitor element 50. In a distribution state which is after the writing state, SW1 is in an off state; SW2-1 is in an off state; SW2-2 is in an on state; SW3 is in an on state; and SW4 is in an off state. Thus, charge can be distributed in the first capacitor element 50 and the second liquid crystal element 32. Then, after the distribution state, a data holding state is obtained according to the above described method.

<Control (3) of Circuit Example (4)>

Figure 10C:
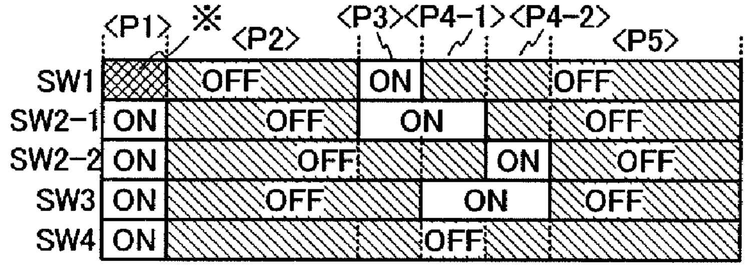

The case where each switch is controlled as illustrated in FIG. 10C is described as the control (3) of the circuit example (4). The control method illustrated in FIG. 10C is a control method when part of the function (3) which is realized by the circuit example (3) is realized by the circuit example (4). The control method illustrated in FIG. 10C is as follows: first, after a reset state or a reset holding state, in a writing state, SW1 is in an on state; SW2-1 is in an on state; SW2-2 is in an off state; SW3 is in an off state; and SW4 is in an off state. Thus, the data voltage $V_2$ can be written in the first liquid crystal element 31, and the reset voltage $V_1$ can be kept applied to the first capacitor element 50 and the second liquid crystal element 32. In a distribution state (1) which is after the writing state, SW1 is in an off state; SW2-1 is in an on state; SW2-2 is in an off state; SW3 is in an on state; and SW4 is in an off state. Thus, charge can be distributed in the first capacitor element 50 and the first liquid crystal element 31. Then, in a distribution state (2), SW1 is in an off state; SW2-1 is in an off state; SW2-2 is in an on state; SW3 is in an on state; and SW4 is in an off state. Thus, charge can be distributed in the first capacitor element 50 and the second liquid crystal element 32. Then, after the distribution states, a data holding state is obtained according to the above described method.

<Control (4) of Circuit Example (4)>

Figure 10D:
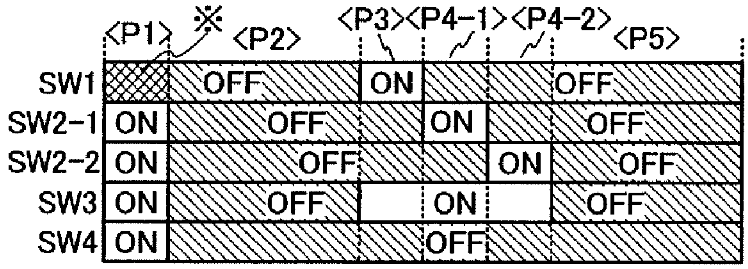

The case where each switch is controlled as illustrated in FIG. 10D is described as the control (4) of the circuit example (4). The control method illustrated in FIG. 10D is a control method when part of the function (3) which is realized by the circuit example (1) is realized by the circuit example (4). The control method illustrated in FIG. 10D is as follows: first, after a reset state and a reset holding state, in a writing state, SW1 is in an on state; SW2-1 is in an off state; SW2-2 is in an off state; SW3 is in an on state; and SW4 is in an off state. Thus, the data voltage $V_2$ can be written in the first capacitor element 50, and the reset voltage $V_1$ can be kept applied to the first liquid crystal element 31 and the second liquid crystal element 32. In a distribution state (1) which is after the writing state, SW1 is in an off state; SW2-1 is in an on state; SW2-2 is in an off state; SW3 is in an on state; and SW4 is in an off state. Thus, charge can be distributed in the first capacitor element 50 and the first liquid crystal element 31. Then, in a distribution state (2), SW1 is in an off state; SW2-1 is in an off state; SW2-2 is in an on state; SW3 is in an on state; and SW4 is in an off state. Thus, charge can be distributed in the first capacitor element 50 and the second liquid crystal element 32. Then, after the distribution states, a data holding state is obtained according to the above described method.

<Selection of Control Method of Circuit Example (4)>

In this manner, in the circuit example (4) illustrated in FIG. 9A, the data voltage $V_2$ can be written in each element (the first capacitor element 50, the first liquid crystal element 31, and the second liquid crystal element 32) separately, and further, distribution of charge can be performed with all combinations. As a result, the above described functions (1), (2), and (3) can be realized only by using the circuit example (4). Therefore, the circuit example (4) illustrated in FIG. 9A can be used in order to switch the above described functions depending on the condition.

An advantage in the case where each switch is controlled as illustrated in FIG. 10A (function (1)) is described. At that time, in a writing state and a data holding state, the data voltage $V_2$ is kept applied to the first liquid crystal element 31 and held. This means that display by the first liquid crystal element 31 is not influenced by variations of capacitance of each element. Therefore, there is an advantage that display can be uniform. Note that when the function (1) is realized by the circuit example (1) illustrated in FIGS. 6A to 6D, and when the function (1) is realized by the circuit example (3) illustrated in FIGS. 8A to 8D, there are the same advantages.

Next, an advantage in the case where each switch is controlled as illustrated in FIG. 10B (function (2)) is described. At this time, the data voltage $V_2$ is applied to the first liquid crystal element 31 and the second liquid crystal element 32 in a writing state, the voltage $V_2'$ and the voltage $V_2''$ are applied to the first liquid crystal element 31 and the second liquid crystal element 32 in a data holding state. Here, when characteristics of a liquid crystal element is normally black, it is found that overdrive for increasing the response speed of the liquid crystal element is employed because $V_2''<V_2'<V_2$ is satisfied. Usually, a conversion process of image data by using look-up table (LUT) or the like is needed in order to perform overdrive, and therefore, the manufacturing cost and power consumption increase. However, in the driving by the function (2), the data voltage $V_2$, and the voltage $V_2'$ and the voltage $V_2''$ which are after the distribution are adequately set, so that overdrive can be performed without a conversion process of image data. As the result, the response speed of the liquid crystal element can be increased, and image quality of moving image display is improved without increasing the manufacturing cost and the power consumption. Note that when the function (2) is realized by the circuit example (2) illustrated in FIGS. 7A to 7D, there is the same advantage.

218

Next, an advantage in the case where each switch is controlled as illustrated in FIG. 10C or 10D (function (3)) is described. At this time, an element to which the data voltage $V_2$ is written in a writing state is any one of the first capacitor element 50, the first liquid crystal element 31, and the second liquid crystal element 32. Thus, since a load at the time of writing is small, power consumption can be reduced. Note that when the function (3) is realized by the circuit example (1) illustrated in FIGS. 6A to 6D, and when the function (3) is realized by the circuit example (3) illustrated in FIGS. 8A to 8D, there are the same advantages.

By the circuit example (4) illustrated in FIG. 9A, functions which have such advantages can be switched depending on the condition. For example, switching functions can be performed as follows: in the condition (at the time of still image display or the like) that uniform display is necessary in particular, display is performed by the function (1); in the condition (at the time of moving image display or the like) that increase in response speed of a liquid crystal element is necessary in particular, display is performed by the function (2); in the condition (at the time of driving performed with a battery or the like) that reduction in power consumption is necessary in particular, display is performed by the function (3); or the like.

Note that as well as the above example, a structure in which while uniform display is performed by the function (1), response speed of a liquid crystal element is increased by performing overdrive in such a manner that image data is converted using a LUT or the like.

<Other Examples of Circuit Example (4)>

Figure 9B:
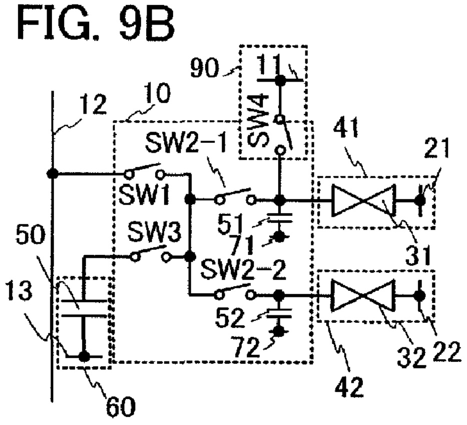
Figure 9C:
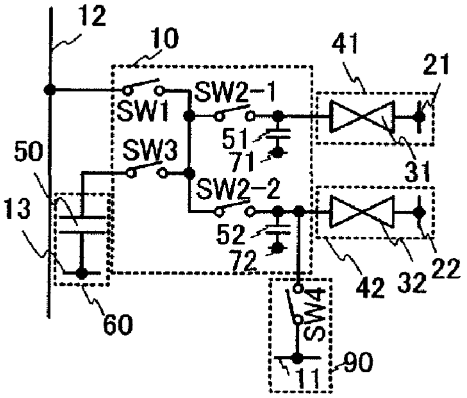
Figure 9D:
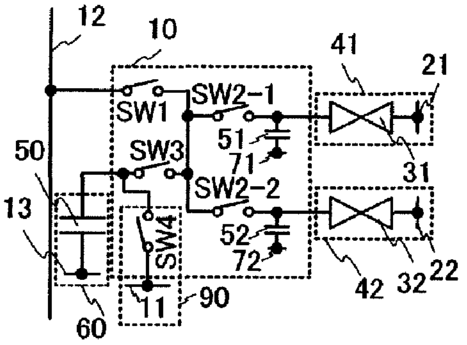
Figure 9E:
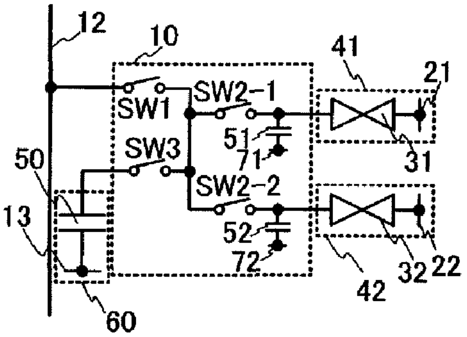

Note that in the circuit example (4), a connection destination of the reset circuit 90 can be variously changed in a manner similar to the above mentioned circuit examples (1) to (3). As the connection destination of the reset circuit 90, for example, the first pixel electrode (FIG. 9B), the second pixel electrode (FIG. 9C), the capacitor electrode (FIG. 9D), or the like can be given. Furthermore, the reset circuit 90 may be omitted (FIG. 9E) in a manner similar to the above mentioned circuit examples (1) to (3).

Note that the first to seventh wirings included in the circuit examples (circuit example (1), circuit example (2), circuit example (3) and circuit example (4)) of this embodiment mode can be classified as follows according to the role. The first wiring 11 can have a function as a reset line to which reset voltage $V_1$ is applied. The second wiring 12 can have a function as a data line to which the data voltage $V_2$ is applied. The third wiring 13 can have a function as a common line for controlling voltage applied to the first capacitor element 50. The fourth wiring 21 can have a function as a liquid crystal common electrode for controlling voltage applied to the first liquid crystal element 31. The fifth wiring 22 can have a function as a liquid crystal common electrode for controlling voltage applied to the second liquid crystal element 32. The sixth wiring 71 can have a function as a common line for controlling voltage applied to the second capacitor element 51. The seventh wiring 72 can have a function as a common line for controlling voltage applied to the third capacitor element 52. However, each wiring can have various roles without being limited to this. The wirings, in particular, for applying the same voltage can be common wirings which are electrically connected to each other. Since an area of wiring in a circuit can be reduced by sharing the wiring, aperture ratio can be improved, whereby power consumption can be reduced.

Note that, in this embodiment mode, the display element is described as a liquid crystal element; however, another display element such as a self-light-emitting element, an element utilizing light-emission of phosphor, an element utilizing reflection of external light, or the like can also be used. For example, as a display device using a self-light-emitting element, an organic EL display, an inorganic EL display, or the like can be given. For example, as a display device using an element utilizing light-emission of phosphor, a display utilizing cathode-ray tube (CRT), a plasma display panel (PDP), a field emission display (FED), or the like can be given. For example, as a display device using an element utilizing reflection of external light, an electronic paper or the like can be given.

Although this embodiment mode is described with reference to various drawings, the contents (or may be part of the contents) described in each drawing can be freely applied to, combined with, or replaced with the contents (or may be part of the contents) described in another drawing and the contents (or may be part of the contents) described in a drawing in another embodiment mode. Further, in the above described drawings, each part can be combined with another part or with another part of another embodiment mode.

Embodiment Mode 3

In this embodiment mode, various circuit examples described in Embodiment Mode 2 are specifically described. In Embodiment Mode 2, conducting states and timing charts of the plurality of switches included in the first circuit 10 are described. In this embodiment mode, as switches shown in the various circuit examples described in Embodiment Mode 2, the case of using the transistors is described in detail with reference to specific examples of circuit diagrams.

<Specific Example (1) of Circuit Example (1)>

Figure 11A:
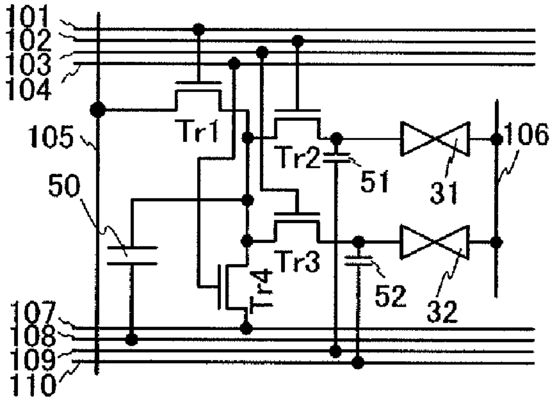
FIGS. 11A to 11D illustrate specific examples of a pixel circuit in the present invention.

First, a specific example of the circuit example (1) in Embodiment Mode 2 is described. A circuit illustrated in FIG. 11A is a specific example (1) of the circuit example (1) illustrated in FIG. 6A and includes a first transistor Tr1, a second transistor Tr2, a third transistor Tr3, a fourth transistor Tr4, the first capacitor element 50, the second capacitor element 51, the third capacitor element 52, the first liquid crystal element 31, the second liquid crystal element 32, a first wiring 101, a second wiring 102, a third wiring 103, a fourth wiring 104, a fifth wiring 105, a sixth wiring 106, a seventh wiring 107, an eighth wiring 108, a ninth wiring 109, and a tenth wiring 110.

One electrode of the first capacitor element 50 is electrically connected to the eighth wiring 108. Here, an electrode of the first capacitor element 50 which is different from the electrode which is electrically connected to the eighth wiring 108 is referred to as a capacitor electrode.

One electrode of the first liquid crystal element 31 is electrically connected to the sixth wiring 106. Here, an electrode of the first liquid crystal element 31 which is different from the electrode which is electrically connected to the sixth wiring 106 is referred to as a first pixel electrode.

One electrode of the second liquid crystal element 32 is electrically connected to the sixth wiring 106. Here, an electrode of the second liquid crystal element 32 which is different from the electrode which is electrically connected to the sixth wiring 106 is referred to as a second pixel electrode.

One electrode of a source electrode and a drain electrode of the first transistor Tr1 is electrically connected to the fifth wiring 105. The other electrode of the source electrode and the drain electrode of the first transistor Tr1 is electrically connected to the capacitor electrode. A gate electrode of the first transistor Tr1 is electrically connected to the first wiring 101.

One electrode of a source electrode and a drain electrode of the second transistor Tr2 is electrically connected to the capacitor electrode. The other electrode of the source electrode and the drain electrode of the second transistor Tr2 is electrically connected to the first pixel electrode. A gate electrode of the second transistor Tr2 is electrically connected to the second wiring 102.

One electrode of a source electrode and a drain electrode of the third transistor Tr3 is electrically connected to the capacitor electrode. The other electrode of the source electrode and the drain electrode of the third transistor Tr3 is electrically connected to the second pixel electrode. A gate electrode of the third transistor Tr3 is electrically connected to the third wiring 103.

One electrode of a source electrode and a drain electrode of the fourth transistor Tr4 is electrically connected to the capacitor electrode. The other electrode of the source electrode and the drain electrode of the fourth transistor Tr4 is electrically connected to the seventh wiring 107. A gate electrode of the fourth transistor Tr4 is electrically connected to the fourth wiring 104.

One electrode of the second capacitor element 51 is electrically connected to the first pixel electrode, and the other electrode of the second capacitor element 51 is electrically connected to the ninth wiring 109. One electrode of the third capacitor element 52 is electrically connected to the second pixel electrode, and the other electrode of the third capacitor element 52 is electrically connected to the tenth wiring 110.

Note that it is assumed that the size of a transistor is represented by (W/L) which is ratio of the channel width W to channel length L of each transistor. A larger transistor can be made to flow large amount of current in an on state (electric resistance in an on state can be made small). Here, the size W/L of each transistor satisfies preferably (the Tr1 or the Tr4)>(the Tr2 or the Tr3). This is because, in a reset state or a writing state, larger amount of current flows in the Tr1 or the Tr4 than that in the Tr2 or the Tr3. Thus, writing and reset can be performed quickly. In more detail, the size of the Tr1 and the Tr4 satisfies preferably the Tr1>the Tr4. This is because since writing the voltage by the Tr1 is performed within one gate selection period, there is less margin for time. As for the size of the Tr2 and the Tr3, it is preferable that the size of electrodes included in a liquid crystal element or a capacitor element which are electrically connected to the Tr2 and the Tr3, and that the size of the transistors is large. The reason is that since an element having a large electrode has large capacitance, writing, reset, distribution, or the like is necessarily performed by using larger amount of current for such elements.

Note that the circuits illustrated in FIG. 11A are placed side by side over a substrate, so that a display portion is formed. The circuit illustrated in FIG. 11A is a minimum unit of a circuit which forms a display portion, and this is referred to as a pixel or a pixel circuit.

Note that the first to the tenth wirings included in the circuit illustrated in FIG. 11A are shared by each of adjacent pixel circuit.

Figure 13A:
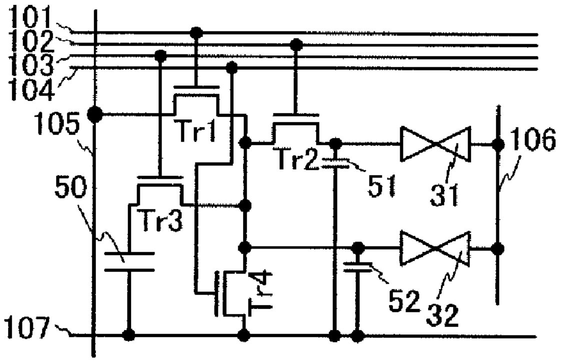
FIGS. 13A to 13D illustrate specific examples of a pixel circuit in the present invention.
Figure 13B:
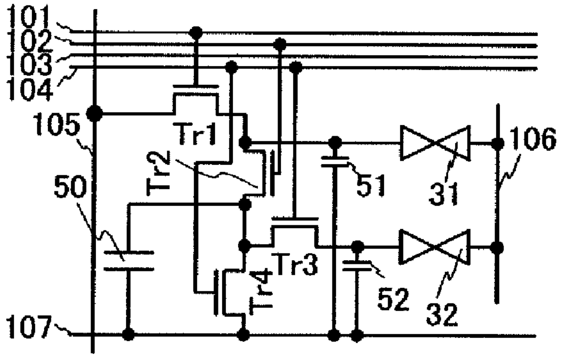
Figure 13C:
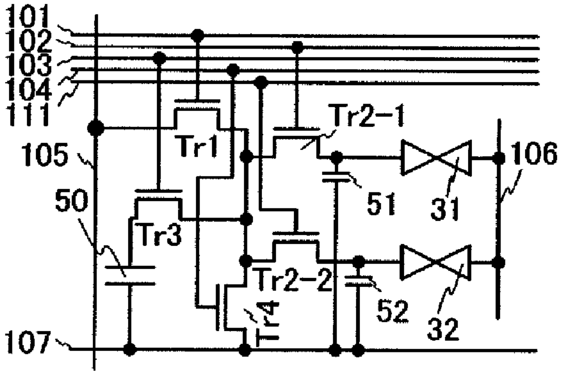
Figure 13D:
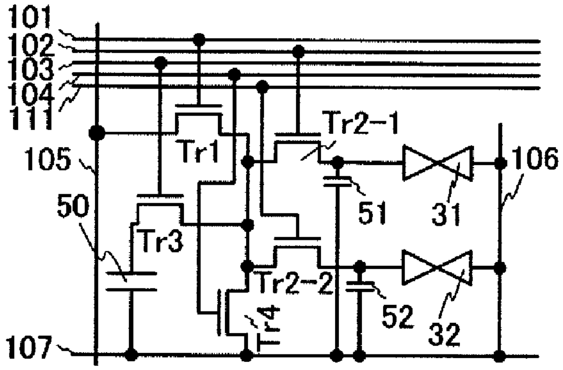

Note that, as illustrated in FIG. 13D, the sixth wiring 106 and the seventh wiring 107 may be electrically connected to each other. Moreover, similar to the seventh wiring 107, each of the eighth wiring 108 to the tenth wiring 110 may be electrically connected to the sixth wiring 106.

Note that the result that the first to the tenth wirings included in the circuit illustrated in FIG. 11A are classified by the role is as follows. The first wiring 101 can have a function as a first scan line for controlling the first transistor Tr1. The second wiring 102 can have a function as a second scan line for controlling the second transistor Tr2. The third wiring 103 can have a function as a third scan line for controlling the third transistor Tr3. The fourth wiring 104 can have a function as a fourth scan line for controlling the fourth transistor Tr4. The fifth wiring 105 can have a function as a data line for applying the data voltage. The sixth wiring 106 can have a function as a liquid crystal common electrode for controlling voltage which is applied to a liquid crystal element. The seventh wiring 107 can have a function as a reset line for applying reset voltage. The eighth wiring 108 can have a function as a first capacitor line for controlling voltage which is applied to the first capacitor element 50. The ninth wiring 109 can have a function as a second capacitor line for controlling voltage which is applied to the second capacitor element 51. The tenth wiring 110 can have a function as a third capacitor line for controlling voltage which is applied to the third capacitor element 52. However, each wiring can have various roles without being limited to them. The wirings, in particular, for applying the same voltage can be common wirings which are electrically connected to each other. Since an area of wiring in a circuit can be reduced by sharing the wiring, aperture ratio can be improved, whereby power consumption can be reduced. More specifically, when a liquid crystal element having a structure in which a liquid crystal common electrode is provided on the transistor substrate side is used (an IPS mode, an FFS mode, or the like), the sixth wiring 106, the seventh wiring 107, the eighth wiring 108, the ninth wiring 109, and tenth wiring 110 can be electrically connected to each other.

<Specific Example (2) of Circuit Example (1)>

Figure 11B:
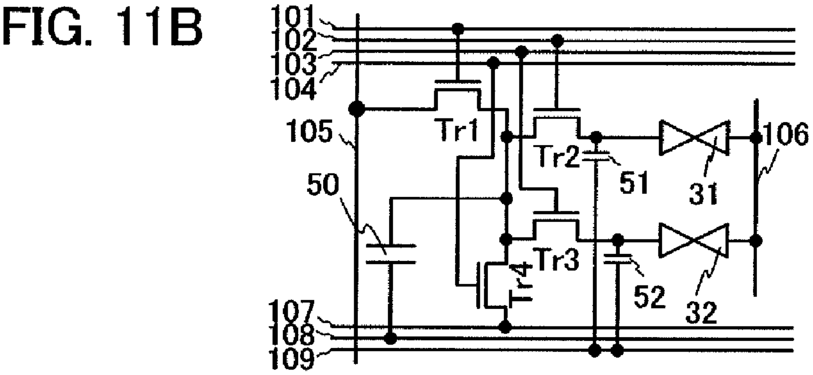

Next, another specific example of the circuit example (1) in Embodiment Mode 2 is described. A circuit illustrated in FIG. 11B is a specific example (2) of the circuit example (1) illustrated in FIG. 6A and includes the first transistor Tr1, the second transistor Tr2, the third transistor Tr3, the fourth transistor Tr4, the first capacitor element 50, the second capacitor element 51, the third capacitor element 52, the first liquid crystal element 31, the second liquid crystal element 32, the first wiring 101, the second wiring 102, the third wiring 103, the fourth wiring 104, the fifth wiring 105, the sixth wiring 106, the seventh wiring 107, the eighth wiring 108, and the ninth wiring 109.

The difference between the specific example (2) of the circuit example (1) and the specific example (1) of the circuit example (1) is that the tenth wiring 110 which is provided in the specific example (1) of the circuit example (1) is not provided in the specific example (2) of the circuit example (1), and in accordance with that, the electrical connection of the third capacitor element 52 differ from that of the specific example (1) of the circuit example (1). In the specific example (2) of the circuit example (1), one electrode of the third capacitor element 52 is electrically connected to the second pixel electrode, and the other electrode of the third capacitor element 52 is electrically connected to the ninth wiring 109. Other connections in the specific example (2) of the circuit example (1) are similar to those in the specific example (1) of the circuit example (1).

As thus described, by reduction in the number of wirings, an area for wiring in a display portion can be reduced, whereby aperture ratio can be improved and power consumption can be reduced. Note that when the number of wirings is large as in the specific example (1) of the circuit example (1), there is an advantage that operation is stable because voltage can be surely supplied to each element.

Note that in the specific example (2) of the circuit example (1), an example is given, in which electrical connection destinations of the second capacitor element 51 and the third capacitor element 52 are common; however, any combination can be realized without being limited to the above example. For example, electrical connections of the first capacitor element 50 and the third capacitor element 52 may be common. Electrical connections of the fourth transistor Tr4 and the third capacitor element 52 may be common. Electrical connections of the fourth transistor Tr4 and the second capacitor element 51 may be common. Electrical connections of the fourth transistor Tr4 and the first capacitor element 50 may be common.

<Specific Example (3) of Circuit Example (1)>

Figure 11C:
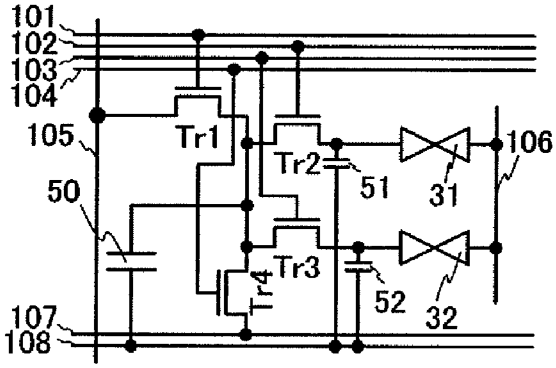

Next, another specific example of the circuit example (1) in Embodiment Mode 2 is described. A circuit illustrated in FIG. 11C is a specific example (3) of the circuit example (1) illustrated in FIG. 6A and includes the first transistor Tr1, the second transistor Tr2, the third transistor Tr3, the fourth transistor Tr4, the first capacitor element 50, the second capacitor element 51, the third capacitor element 52, the first liquid crystal element 31, the second liquid crystal element 32, the first wiring 101, the second wiring 102, the third wiring 103, the fourth wiring 104, the fifth wiring 105, the sixth wiring 106, the seventh wiring 107, and the eighth wiring 108.

The difference between the specific example (3) of the circuit example (1) and the specific example (2) of the circuit example (1) is that the ninth wiring 109 which is provided in the specific example (2) of the circuit example (1) is not provided in the specific example (3) of the circuit example (1), and in accordance with that, electrical connections of the second capacitor element 51 and the third capacitor element 52 differ from those in the specific example (2) of the circuit example (1). In the specific example (3) of the circuit example (1), one electrode of the second capacitor element 51 is electrically connected to the first pixel electrode, and the other electrode of the second capacitor element 51 is electrically connected to the eighth wiring 108. One electrode of the third capacitor element 52 is electrically connected to the second pixel electrode, and the other electrode of the third capacitor element 52 is electrically connected to the eighth wiring 108. Other connections in the specific example (3) of the circuit example (1) are similar to those in the specific example (2) of the circuit example (1).

As thus described, by reduction in the number of wirings, an area for wiring in a display portion can be reduced, whereby aperture ratio can be improved and power consumption can be reduced. Note that when the number of wirings is large as in the specific examples (1) and (2) of the circuit example (1), there is an advantage that operation is stable because voltage can be surely supplied to each element.

Note that in the specific example (3) of the circuit example (1), an example is given, in which electrical connection destinations of the first capacitor element 50, the second capacitor element 51, and the third capacitor element 52 are common; however, any combination can be realized without being limited to the above example. For example, electrical connections of the fourth transistor Tr4, the second capacitor element 51, and the third capacitor element 52 may be common. Electrical connections of the fourth transistor Tr4, the third capacitor element 52, and the first capacitor element 50 may be common. Electrical connections of the fourth transistor Tr4, the first capacitor element 50, and the second capacitor element 51 may be common.

<Specific Example (4) of Circuit Example (1)>

Figure 11D:
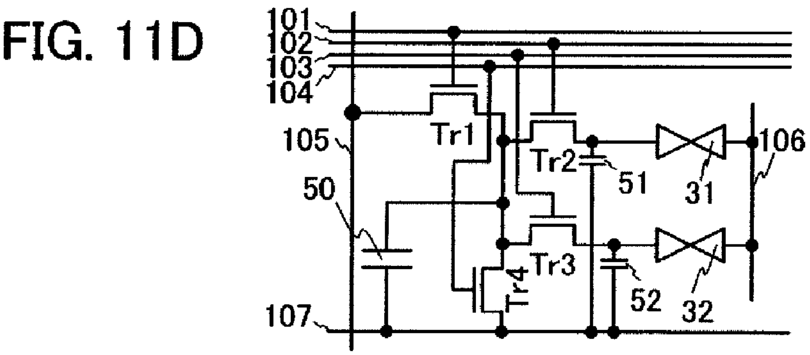

Next, another specific example of the circuit example (1) in Embodiment Mode 2 is described. A circuit illustrated in FIG. 11D is a specific example (4) of the circuit example (1) illustrated in FIG. 6A and includes the first transistor Tr1, the second transistor Tr2, the third transistor Tr3, the fourth transistor Tr4, the first capacitor element 50, the second capacitor element 51, the third capacitor element 52, the first liquid crystal element 31, the second liquid crystal element 32, the first wiring 101, the second wiring 102, the third wiring 103, the fourth wiring 104, the fifth wiring 105, the sixth wiring 106, and the seventh wiring 107.

The difference between the specific example (4) of the circuit example (1) and the specific example (3) of the circuit example (1) is that the eighth wiring 108 which is provided in the specific example (3) of the circuit example (1) is not provided in the specific example (4) of the circuit example (1), and in accordance with that, electrical connections of the first capacitor element 50, the second capacitor element 51, and the third capacitor element 52 differ from those in the specific example (3) of the circuit example (1). In the specific example (4) of the circuit example (1), one electrode of the first capacitor element 50 is electrically connected to the capacitor electrode, and the other electrode of the first capacitor element 50 is electrically connected to the seventh wiring 107. One electrode of the second capacitor element 51 is electrically connected to the first pixel electrode, and the other electrode of the second capacitor element 51 is electrically connected to the seventh wiring 107. One electrode of the third capacitor element 52 is electrically connected to the second pixel electrode, and the other electrode of the third capacitor element 52 is electrically connected to the seventh wiring 107. Other connections in the specific example (4) of the circuit example (1) are similar to those in the specific example (3) of the circuit example (1).

As thus described, by reduction in the number of wirings, an area for wiring in a display portion can be reduced, whereby aperture ratio can be improved and power consumption can be reduced. Note that when the number of wirings is large as in the specific examples (1) to (3) of the circuit example (1), there is an advantage that operation is stable because voltage can be surely supplied to each element.

Note that in the specific example (4) of the circuit example (1), since only one wiring to which constant voltage is applied, a so-called power supply line (other than a liquid crystal common electrode), is provided in a pixel circuit, it is particularly useful pixel circuit because of excellent balance between stable operation and aperture ratio.

Note that since the seventh wiring included in the specific example (4) of the circuit example (1) is connected to a plurality of elements in common, it is also referred to as a common power supply line, a common line, or the like.

<Specific Example (5) of Circuit Example (1)>

Figure 12A:
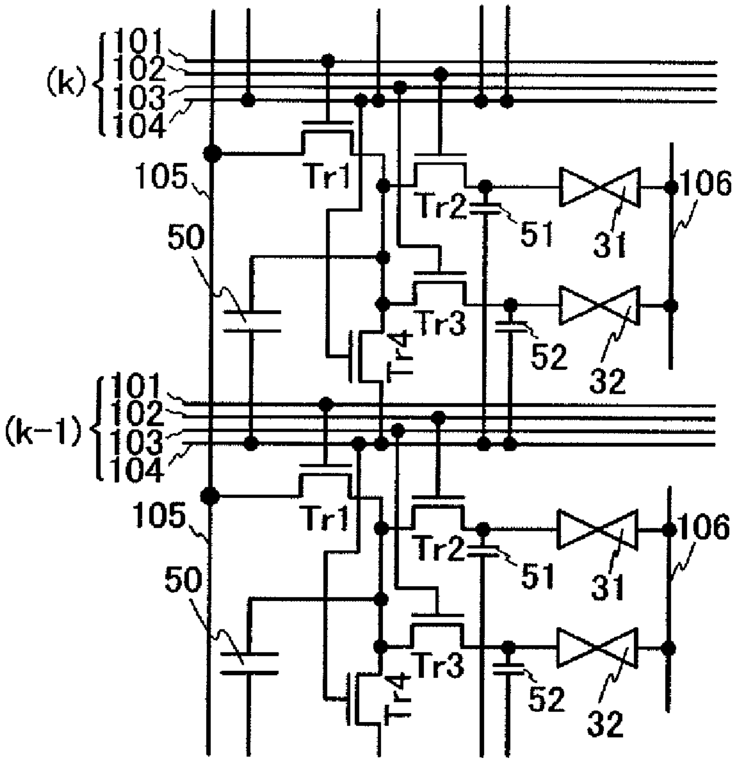
FIGS. 12A and 12B illustrate specific examples of a pixel circuit in the present invention.

Next, another specific example of the circuit example (1) in Embodiment Mode 2 is described. A circuit illustrated in FIG. 12A is a specific example (5) of the circuit example (1) illustrated in FIG. 6A and includes the first transistor Tr1, the second transistor Tr2, the third transistor Tr3, the fourth transistor Tr4, the first capacitor element 50, the second capacitor element 51, the third capacitor element 52, the first liquid crystal element 31, the second liquid crystal element 32, the first wiring 101, the second wiring 102, the third wiring 103, the fourth wiring 104, the fifth wiring 105, and the sixth wiring 106.

A pixel structure of the specific example (5) of the circuit example (1) is that no so-called power supply line (other than a liquid crystal common electrode) as shown in the specific examples (1) to (4) of the circuit example (1) is provided. In this case, an electrode which needs the constant voltage in a pixel circuit is electrically connected to a scan line of an adjacent pixel, so that constant voltage is supplied to the electrode. In other words, a scan line of an adjacent pixel can be used as a power supply line.

In the specific example (5) of the circuit example (1), one electrode of the first capacitor element 50 included in a pixel which belongs to k-th row is electrically connected to the capacitor electrode of the pixel, and the other electrode of the first capacitor element 50 is electrically connected to the fourth wiring 104 included in a pixel which belongs to (k−1) th row. One electrode of the second capacitor element 51 included in a pixel which belongs to k-th row is electrically connected to the first pixel electrode of the pixel, and the other electrode of the second capacitor element 51 is electrically connected to the fourth wiring 104 included in the pixel which belongs to (k−1)th row. One electrode of the third capacitor element 52 included in the pixel which belongs to k-th row is electrically connected to the second pixel electrode of the pixel, and the other electrode of the third capacitor element 52 is electrically connected to the fourth wiring 104 included in the pixel which belongs to (k−1)th row. One electrode of a source electrode and a drain electrode of the fourth transistor Tr4 included in the pixel which belongs to k-th row is electrically connected to the capacitor electrode of the pixel. The other electrode of the source electrode and the drain electrode of the fourth transistor Tr4 is electrically connected to the fourth wiring 104 included in the pixel which belongs to (k−1)th row. A gate electrode of the fourth transistor Tr4 is electrically connected to the fourth wiring 104 of the pixel. Other connections in the specific example (5) of the circuit example (1) are similar to those in the specific example (4) of the circuit example (1). Note that k is an integer more than or equal to two and less than or equal to n (n is the number of rows of a display portion).

The scan line used as a power supply line is preferably included in subsequent pixel which belongs to subsequent row selected at the timing before a row to which a pixel belongs (k-th row) is selected. Typically, as illustrated in the specific example (5) of the circuit example (1), the fourth scan line of the pixel which belongs to (k−1)th row can be used as a power supply line. The reason for this is described below with reference to a timing chart illustrated in FIG. 12B.

Figure 12B:
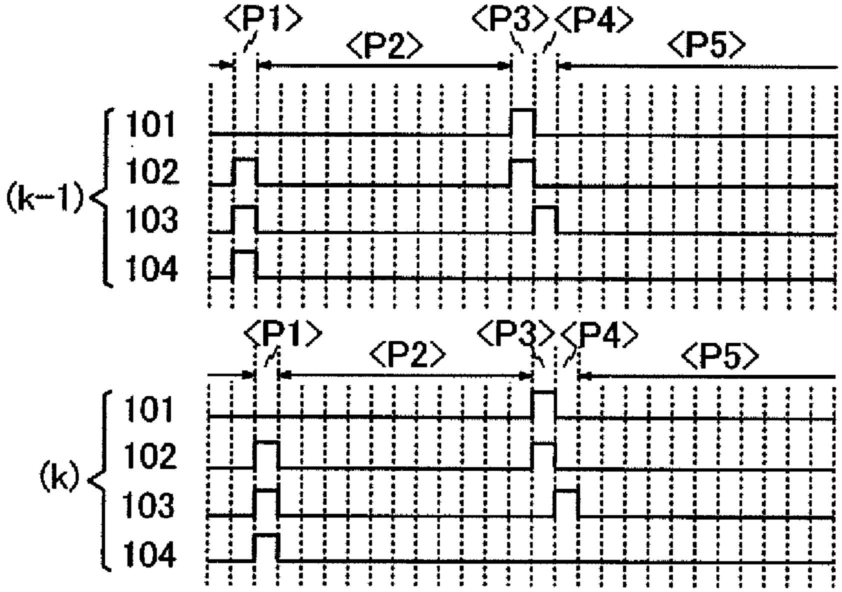

The timing chart illustrated in FIG. 12B illustrate the voltages applied to the first wiring 101, the second wiring 102, the third wiring 103, and the fourth wiring 104 which belong to (k−1)th row, and the first wiring 101, the second wiring 102, the third wiring 103, and the fourth wiring 104 which belong to k-th row along the time axis in order to realize the above mentioned function (1).

As illustrated in FIG. 12B, the conducting state of each switch appears at different timing between the pixel which belong to (k−1)th row and the pixel which belongs to k-th row. In the timing chart illustrated in FIG. 12B, the difference is one gate selection period.

As thus described, voltage which is applied to each scan line changes over time, and the period in which voltage changes is restricted. For example, when the number of rows of a display portion is 480, one gate selection period is only 1/480 of one frame at most. In other words, a period in which voltage which is applied to a scan line is set to be high-level is only 1/480 of all, and low level voltage is kept applied to the scan line for the rest period of 479/480. By such a difference of percentage, a scan line can be used as a power supply line of low level.

However, it is preferable to avoid changing the voltage of the scan line which is used as a power supply line in a period in which a circuit performs important operation as much as possible, even if the percentage is small. Specifically, in the function (1), if voltage of a scan line changes in periods of a reset state, a writing state, and a distribution state, there is a possibility that reset, writing, and distribution are not performed correctly, so that it is preferable to avoid this.

It is found that a scan line which satisfies the condition that the voltage applied is not at high level when the pixel which belongs to k-th row is in a reset state (period <P1>), a writing state (period <P3>), and a distribution state (period <P4>) is the first wiring 101, the second wiring 102, and the fourth wiring 104, out of the scan lines which belong to (k−1)th row. Scan lines of which voltages change with less frequency are the first wiring 101 and the fourth wiring 104. Moreover, a scan line which less influence on display by the voltage change is the fourth wiring 104. This is because the fourth wiring 104 of the pixel which belongs to (k−1)th row comes to high level before the pixel which belongs to k-th row comes to in reset state. Thus, even if the pixel which belongs to k-th row is influenced by the change of voltage, the reset state which appears after that leads to display black color forcibly.

For such a reason, a fourth scan line of the pixel which belongs to (k−1)th row is used as a power supply line in the circuit illustrated in FIG. 12A. However, another scan line can be used as a power supply line. For example, the first scan line or the second scan line of the pixel which belongs to (k−1)th row can be used. Furthermore, a scan line which belongs to a row that precedes (k−1)th row can be used as a power supply line of the pixel which belongs to k-th row. In any case, any scan line can be used as a power supply line as long as the scan line satisfies the above mentioned condition.

As thus described, by using a scan line as a power supply line, the number of wirings and an area for wiring in a display portion can be reduced, whereby aperture ratio can be improved and power consumption can be reduced.

<Specific Example of Circuit Example (2)>

Next, a specific example of the circuit example (2) in Embodiment Mode 2 is described. A circuit illustrated in FIG. 13A is a specific example of the circuit example (2) illustrated in FIG. 7A and includes the first transistor Tr1, the second transistor Tr2, the third transistor Tr3, the fourth transistor Tr4, the first capacitor element 50, the second capacitor element 51, the third capacitor element 52, the first liquid crystal element 31, the second liquid crystal element 32, the first wiring 101, the second wiring 102, the third wiring 103, the fourth wiring 104, the fifth wiring 105, the sixth wiring 106, and the seventh wiring 107.

One electrode of the first capacitor element 50 is electrically connected to the seventh wiring 107. Here, an electrode of the first capacitor element 50 which is different from the electrode which is electrically connected to the seventh wiring 107 is referred to as a capacitor electrode.

One electrode of the first liquid crystal element 31 is electrically connected to the sixth wiring 106. Here, an electrode of the first liquid crystal element 31 which is different from the electrode which is electrically connected to the sixth wiring 106 is referred to as a first pixel electrode.

One electrode of the second liquid crystal element 32 is electrically connected to the sixth wiring 106. Here, an electrode of the second liquid crystal element 32 which is different from the electrode which is electrically connected to the sixth wiring 106 is referred to as a second pixel electrode.

One electrode of a source electrode and a drain electrode of the first transistor Tr1 is electrically connected to the fifth wiring 105. The other electrode of the source electrode and the drain electrode of the first transistor Tr1 is electrically connected to the second pixel electrode. A gate electrode of the first transistor Tr1 is electrically connected to the first wiring 101.

One electrode of a source electrode and a drain electrode of the second transistor Tr2 is electrically connected to the second pixel electrode. The other electrode of the source electrode and the drain electrode of the second transistor Tr2 is electrically connected to the first pixel electrode. A gate electrode of the second transistor Tr2 is electrically connected to the second wiring 102.

One electrode of a source electrode and a drain electrode of the third transistor Tr3 is electrically connected to the capacitor electrode. The other electrode of the source electrode and the drain electrode of the third transistor Tr3 is electrically connected to the second pixel electrode. A gate electrode of the third transistor Tr3 is electrically connected to the third wiring 103.

One electrode of a source electrode and a drain electrode of the fourth transistor Tr4 is electrically connected to the second pixel electrode. The other electrode of the source electrode and the drain electrode of the fourth transistor Tr4 is electrically connected to the seventh wiring 107. A gate electrode of the fourth transistor Tr4 is electrically connected to the fourth wiring 104.

One electrode of the second capacitor element 51 is electrically connected to the first pixel electrode, and the other electrode of the second capacitor element 51 is electrically connected to the seventh wiring 107. One electrode of the third capacitor element 52 is electrically connected to the second pixel electrode, and the other electrode of the third capacitor element 52 is electrically connected to the seventh wiring 107.

Here, the size W/L of each transistor satisfies preferably (the Tr1 or the Tr4)>(the Tr2 or the Tr3). This is because, in a reset state or a writing state, larger amount of current flows in the Tr1 or the Tr4 than that in the Tr2 or the Tr3. Thus, writing and reset can be performed quickly. In more detail, the size of the Tr1 and the Tr4 satisfies preferably the Tr1>the Tr4. This is because since writing the voltage by the Tr1 is performed within one gate selection period, there is less margin for time. As for the size of the Tr2 and the Tr3, it is preferable that the size of electrodes included in a liquid crystal element or a capacitor element which are electrically connected to the Tr2 and the Tr3, and that the size of the transistors is large. The reason is that since an element having a large electrode has large capacitance, writing, reset, distribution, or the like is necessarily performed by using larger amount of current for such elements.

Note that the circuits illustrated in FIG. 13A are placed side by side over a substrate, so that a display portion is formed. The circuit illustrated in FIG. 13A is a minimum unit of a circuit which forms a display portion, and this is referred to as a pixel or a pixel circuit.

Note that the first to the seventh wirings included in the circuit illustrated in FIG. 13A are shared by each of adjacent pixel circuit.

Note that, as illustrated in FIG. 13D, the sixth wiring 106 and the seventh wiring 107 may be electrically connected to each other.

Note that the result that the first to the seventh wirings included in the circuit illustrated in FIG. 13A are classified by the role is as follows. The first wiring 101 can have a function as a first scan line for controlling the first transistor Tr1. The second wiring 102 can have a function as a second scan line for controlling the second transistor Tr2. The third wiring 103 can have a function as a third scan line for controlling the third transistor Tr3. The fourth wiring 104 can have a function as a fourth scan line for controlling the fourth transistor Tr4. The fifth wiring 105 can have a function as a data line for applying the data voltage. The sixth wiring 106 can have a function as a liquid crystal common electrode for controlling voltage which is applied to a liquid crystal element. The seventh wiring 107 can have a function as a common line for applying common voltage. However, each wiring can have various roles without being limited to them. The wirings, in particular, for applying the same voltage can be common wirings which are electrically connected to each other. Since an area of wiring in a circuit can be reduced by sharing the wiring, aperture ratio can be improved, whereby power consumption can be reduced. More specifically, when a liquid crystal element having a structure in which a liquid crystal common electrode is provided on the transistor substrate side is used (an IPS mode, an FFS mode, or the like), the sixth wiring 106 and the seventh wiring 107 can be electrically connected to each other.

Note that as a specific example of the circuit example (2), only a case where one power supply line except a liquid crystal common electrode is provided in a pixel circuit is given in order to avoid repeated description. Various numbers of power supply lines can also be used in the circuit example (2) as described in the specific examples (1) to (4) of the circuit example (1). Moreover, a power supply line can be omitted as described in the specific example (5) of the circuit example (1).

<Specific Example of Circuit Example (3)>

Next, a specific example of the circuit example (3) in Embodiment Mode 2 is described. A circuit illustrated in FIG. 13B is a specific example of the circuit example (3) illustrated in FIG. 8A and includes the first transistor Tr1, the second transistor Tr2, the third transistor Tr3, the fourth transistor Tr4, the first capacitor element 50, the second capacitor element 51, the third capacitor element 52, the first liquid crystal element 31, the second liquid crystal element 32, the first wiring 101, the second wiring 102, the third wiring 103, the fourth wiring 104, the fifth wiring 105, the sixth wiring 106, and the seventh wiring 107.

One electrode of the first capacitor element 50 is electrically connected to the seventh wiring 107. Here, an electrode of the first capacitor element 50 which is different from the electrode which is electrically connected to the seventh wiring 107 is referred to as a capacitor electrode.

One electrode of the first liquid crystal element 31 is electrically connected to the sixth wiring 106. Here, an electrode of the first liquid crystal element 31 which is different from the electrode which is electrically connected to the sixth wiring 106 is referred to as a first pixel electrode.

One electrode of the second liquid crystal element 32 is electrically connected to the sixth wiring 106. Here, an electrode of the second liquid crystal element 32 which is different from the electrode which is electrically connected to the sixth wiring 106 is referred to as a second pixel electrode.

One electrode of a source electrode and a drain electrode of the first transistor Tr1 is electrically connected to the fifth wiring 105. The other electrode of the source electrode and the drain electrode of the first transistor Tr1 is electrically connected to the first pixel electrode. A gate electrode of the first transistor Tr1 is electrically connected to the first wiring 101.

One electrode of a source electrode and a drain electrode of the second transistor Tr2 is electrically connected to the first pixel electrode. The other electrode of the source electrode and the drain electrode of the second transistor Tr2 is electrically connected to the capacitor electrode. A gate electrode of the second transistor Tr2 is electrically connected to the second wiring 102.

One electrode of a source electrode and a drain electrode of the third transistor Tr3 is electrically connected to the capacitor electrode. The other electrode of the source electrode and the drain electrode of the third transistor Tr3 is electrically connected to the second pixel electrode. A gate electrode of the third transistor Tr3 is electrically connected to the third wiring 103.

One electrode of a source electrode and a drain electrode of the fourth transistor Tr4 is electrically connected to the second pixel electrode. The other electrode of the source electrode and the drain electrode of the fourth transistor Tr4 is electrically connected to the seventh wiring 107. A gate electrode of the fourth transistor Tr4 is electrically connected to the fourth wiring 104.

One electrode of the second capacitor element 51 is electrically connected to the first pixel electrode, and the other electrode of the second capacitor element 51 is electrically connected to the seventh wiring 107. One electrode of the third capacitor element 52 is electrically connected to the second pixel electrode, and the other electrode of the third capacitor element 52 is electrically connected to the seventh wiring 107.

Here, the size W/L of each transistor satisfies preferably (the Tr1 or the Tr4)>(the Tr2 or the Tr3). This is because, in a reset state or a writing state, larger amount of current flows in the Tr1 or the Tr4 than that in the Tr2 or the Tr3. Thus, writing and reset can be performed quickly. In more detail, the size of the Tr1 and the Tr4 satisfies preferably the Tr1>the Tr4. This is because since writing the voltage by the Tr1 is performed within one gate selection period, there is less margin for time. As for the size of the Tr2 and the Tr3, it is preferable that the size of electrodes included in a liquid crystal element or a capacitor element which are electrically connected to the Tr2 and the Tr3, and that the size of the transistors is large. The reason is that since an element having a large electrode has large capacitance, writing, reset, distribution, or the like is necessarily performed by using larger amount of current for such elements.

Note that the circuits illustrated in FIG. 13B are placed side by side over a substrate, so that a display portion is formed. The circuit illustrated in FIG. 13B is a minimum unit of a circuit which forms a display portion, and this is referred to as a pixel or a pixel circuit.

Note that the first to the seventh wirings included in the circuit illustrated in FIG. 13B are shared by each of adjacent pixel circuit.

Note that, as illustrated in FIG. 13D, the sixth wiring 106 and the seventh wiring 107 may be electrically connected to each other.

Note that the result that the first to the seventh wirings included in the circuit illustrated in FIG. 13B are classified by the role is as follows. The first wiring 101 can have a function as a first scan line for controlling the first transistor Tr1. The second wiring 102 can have a function as a second scan line for controlling the second transistor Tr2. The third wiring 103 can have a function as a third scan line for controlling the third transistor Tr3. The fourth wiring 104 can have a function as a fourth scan line for controlling the fourth transistor Tr4. The fifth wiring 105 can have a function as a data line for applying the data voltage. The sixth wiring 106 can have a function as a liquid crystal common electrode for controlling voltage which is applied to a liquid crystal element. The seventh wiring 107 can have a function as a common line for applying common voltage. However, each wiring can have various roles without being limited to them. The wirings, in particular, for applying the same voltage can be common wirings which are electrically connected to each other. Since an area of wiring in a circuit can be reduced by sharing the wiring, aperture ratio can be improved, whereby power consumption can be reduced. More specifically, when a liquid crystal element having a structure in which a liquid crystal common electrode is provided on the transistor substrate side is used (an IPS mode, an FFS mode, or the like), the sixth wiring 106 and the seventh wiring 107 can be electrically connected to each other.

Note that as a specific example of the circuit example (3), only a case where one power supply line except a liquid crystal common electrode is provided in a pixel circuit is given in order to avoid repeated description. Various numbers of power supply lines can also be used in the circuit example (3) as described in the specific examples (1) to (4) of the circuit example (1). Moreover, a power supply line can be omitted as described in the specific example (5) of the circuit example (1).

<Specific Example of Circuit Example (4)>

Next, a specific example of the circuit example (4) in Embodiment Mode 2 is described. A circuit illustrated in FIG. 13C is a specific example of the circuit example (4) illustrated in FIG. 9A and includes the first transistor Tr1, a second transistor Tr2-1, the third transistor Tr3, the fourth transistor Tr4, a fifth transistor Tr2-2, the first capacitor element 50, the second capacitor element 51, the third capacitor element 52, the first liquid crystal element 31, the second liquid crystal element 32, the first wiring 101, the second wiring 102, the third wiring 103, the fourth wiring 104, the fifth wiring 105, the sixth wiring 106, the seventh wiring 107, and an eighth wiring 111.

One electrode of the first capacitor element 50 is electrically connected to the seventh wiring 107. Here, an electrode of the first capacitor element 50 which is different from the electrode which is electrically connected to the seventh wiring 107 is referred to as a capacitor electrode.

One electrode of the first liquid crystal element 31 is electrically connected to the sixth wiring 106. Here, an electrode of the first liquid crystal element 31 which is different from the electrode which is electrically connected to the sixth wiring 106 is referred to as a first pixel electrode.

One electrode of the second liquid crystal element 32 is electrically connected to the sixth wiring 106. Here, an electrode of the second liquid crystal element 32 which is different from the electrode which is electrically connected to the sixth wiring 106 is referred to as a second pixel electrode.

Furthermore, the specific example of the circuit example (4) illustrated in FIG. 13C includes the internal electrode P as is illustrated in FIG. 9A.

One electrode of a source electrode and a drain electrode of the first transistor Tr1 is electrically connected to the fifth wiring 105. The other electrode of the source electrode and the drain electrode of the first transistor Tr1 is electrically connected to the internal electrode P. A gate electrode of the first transistor Tr1 is electrically connected to the first wiring 101.

One electrode of a source electrode and a drain electrode of the second transistor Tr2-1 is electrically connected to the internal electrode P. The other electrode of the source electrode and the drain electrode of the second transistor Tr2-1 is electrically connected to the first pixel electrode. A gate electrode of the second transistor Tr2-1 is electrically connected to the second wiring 102.

One electrode of a source electrode and a drain electrode of the third transistor Tr3 is electrically connected to the internal electrode P. The other electrode of the source electrode and the drain electrode of the third transistor Tr3 is electrically connected to the capacitor electrode. A gate electrode of the third transistor Tr3 is electrically connected to the third wiring 103.

One electrode of a source electrode and a drain electrode of the fourth transistor Tr4 is electrically connected to the internal electrode P. The other electrode of the source electrode and the drain electrode of the fourth transistor Tr4 is electrically connected to the seventh wiring 107. A gate electrode of the fourth transistor Tr4 is electrically connected to the fourth wiring 104.

One electrode of a source electrode and a drain electrode of the fifth transistor Tr2-2 is electrically connected to the internal electrode P. The other electrode of the source electrode and the drain electrode of the fifth transistor Tr2-2 is electrically connected to the second pixel electrode. A gate electrode of the fifth transistor Tr2-2 is electrically connected to the eighth wiring 111.

One electrode of the second capacitor element 51 is electrically connected to the first pixel electrode, and the other electrode of the second capacitor element 51 is electrically connected to the seventh wiring 107. One electrode of the third capacitor element 52 is electrically connected to the second pixel electrode, and the other electrode of the third capacitor element 52 is electrically connected to the seventh wiring 107.

Here, the size W/L of each transistor satisfies preferably (the Tr1 or the Tr4)>(the Tr2-1, the Tr2-2, or the Tr3). This is because, in a reset state or a writing state, larger amount of current flows in the Tr1 or the Tr4 than that in the Tr2-1, the Tr2-2, or the Tr3. Thus, writing and reset can be performed quickly. In more detail, the size of the Tr1 and the Tr4 satisfies preferably the Tr1>the Tr4. This is because since writing the voltage by the Tr1 is performed within one gate selection period, there is less margin for time. As for the size of the Tr2-1, the Tr2-2, or the Tr3, it is preferable that the size of electrodes included in a liquid crystal element or a capacitor element which are electrically connected to the Tr2-1, the Tr2-2, or the Tr3, and that the size of the transistors is large. The reason is that since an element having a large electrode has large capacitance, writing, reset, distribution, or the like is necessarily performed by using larger amount of current for such elements.

Note that the circuits illustrated in FIG. 13C are placed side by side over a substrate, so that a display portion is formed. The circuit illustrated in FIG. 13C is a minimum unit of a circuit which forms a display portion, and this is referred to as a pixel or a pixel circuit.

Note that the first to the eighth wirings included in the circuit illustrated in FIG. 13C are shared by each of adjacent pixel circuit.

Note that, as illustrated in FIG. 13D, the sixth wiring 106 and the seventh wiring 107 may be electrically connected to each other.

Note that the result that the first to the eighth wirings included in the circuit illustrated in FIG. 13C are classified by the role is as follows. The first wiring 101 can have a function as a first scan line for controlling the first transistor Tr1. The second wiring 102 can have a function as a second scan line for controlling the second transistor Tr2-1. The third wiring 103 can have a function as a third scan line for controlling the third transistor Tr3. The fourth wiring 104 can have a function as a fourth scan line for controlling the fourth transistor Tr4. The fifth wiring 105 can have a function as a data line for applying the data voltage. The sixth wiring 106 can have a function as a liquid crystal common electrode for controlling voltage which is applied to a liquid crystal element. The seventh wiring 107 can have a function as a common line for applying common voltage. The eighth wiring 111 can have a function as the fifth scan line for controlling the fifth transistor Tr2-2. However, each wiring can have various roles without being limited to them. The wirings, in particular, for applying the same voltage can be common wirings which are electrically connected to each other. Since an area of wiring in a circuit can be reduced by sharing the wiring, aperture ratio can be improved, whereby power consumption can be reduced. More specifically, when a liquid crystal element having a structure in which a liquid crystal common electrode is provided on the transistor substrate side is used (an IPS mode, an FFS mode, or the like), the sixth wiring 106 and the seventh wiring 107 can be electrically connected to each other.

Note that as a specific example of the circuit example (4), only a case where one power supply line except a liquid crystal common electrode is provided in a pixel circuit is given in order to avoid repeated description. Various numbers of power supply lines can also be used in the circuit example (4) as described in the specific examples (1) to (4) of the circuit example (1). Moreover, a power supply line can be omitted as described in the specific example (5) of the circuit example (1).

Note that, in this embodiment mode, the display element is described as a liquid crystal element; however, another display element such as a self-light-emitting element, an element utilizing light-emission of phosphor, an element utilizing reflection of external light, or the like can also be used. For example, as a display device using a self-light-emitting element, an organic EL display, an inorganic EL display, or the like can be given. For example, as a display device using an element utilizing light-emission of phosphor, a display utilizing cathode-ray tube (CRT), a plasma display panel (PDP), a field emission display (FED), or the like can be given. For example, as a display device using an element utilizing reflection of external light, an electronic paper or the like can be given.

Although this embodiment mode is described with reference to various drawings, the contents (or may be part of the contents) described in each drawing can be freely applied to, combined with, or replaced with the contents (or may be part of the contents) described in another drawing and the contents (or may be part of the contents) described in a drawing in another embodiment mode. Further, in the above described drawings, each part can be combined with another part or with another part of another embodiment mode.

Embodiment Mode 4

In this embodiment mode, a case where various circuits which are described above include a display element except a liquid crystal element is described. As described above, various elements as well as the liquid crystal element can be used as the display element which can be included in a pixel in this specification.

Various elements as well as the liquid crystal element can be used as the display elements in the pixel structures described in Embodiment Modes 1 to 3. In the case where an element except the liquid crystal element is used as a display element, when the display element is driven by using voltage of direct current like the liquid crystal element, and when current flowing through the display element is small, the liquid crystal element may be replaced with the display element in the above described structure. However, when the display element which is replaced is a display element driven by a current (current drive display element), not only replacement of the display element, but also changing the structure which will be described below are needed.

Figure 14A:
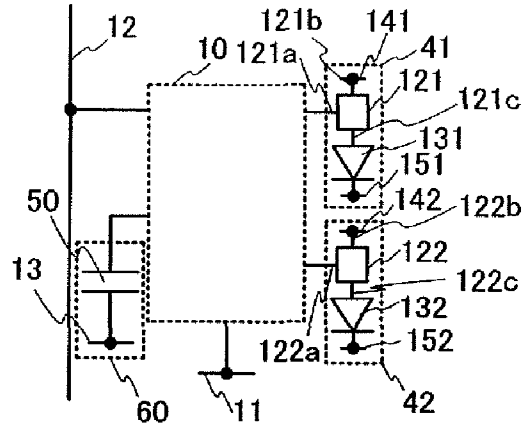
FIGS. 14A to 14E illustrate circuit examples of a pixel circuit in the present invention.
Figure 14B:
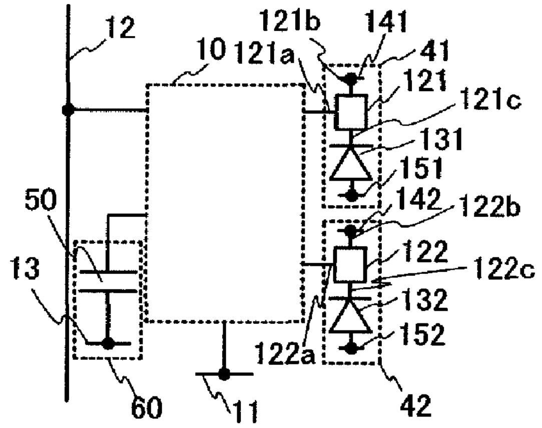

As a current drive display element, a light-emitting diode (LED) having high crystallinity, an organic light-emitting diode (OLED; also referred to as organic EL) using an organic material, or the like can be used. The current drive display element is a display element of which emission intensity is determined by the amount of current flowing through the display element. FIGS. 14A and 14B are examples of the pixel structure of the case where the current drive display element is used in the pixel structure described in Embodiment Mode 1.

Structures of the first sub-pixel 41 and the second sub-pixel 42 in an example of the pixel structure illustrated in FIG. 14A are different from those of the example of the pixel structure illustrated in FIG. 1A, and other structures are similar to each other. Specific different points are as follows. In the example of pixel structure illustrated in FIG. 1A, the first sub-pixel 41 includes the first liquid crystal element 31 and the first common electrode, and the second sub-pixel 42 includes the second liquid crystal element 32 and the second common electrode. On the other hands, in the example of pixel structure illustrated in FIG. 14A, the first sub-pixel 41 includes a first current control circuit 121, a first current drive display element 131, a first anode line 141, and a first cathode line 151, and the second sub-pixel 42 includes a second current control circuit 122, a second current drive display element 132, a second anode line 142, and a second cathode line 152.

In the first sub-pixel 41 in the example of the pixel structure illustrated in FIG. 14A, the first current control circuit 121 includes at least three electrodes 121*a*, 121*b*, and 121*c*. The electrode 121*a* is electrically connected to the first circuit 10.

The electrode 121*b* is electrically connected to the first anode line 141. The electrode 121*c* is electrically connected to the first current drive display element 131. The first current drive display element 131 includes at least two electrodes. One electrode is electrically connected to the electrode 121*c*, and the other electrode is electrically connected to the first cathode line 151.

Similarly, in the second sub-pixel 42, the second current control circuit 122 includes at least three electrodes 122*a*, 122*b*, and 122*c*. The electrode 122*a* is electrically connected to the first circuit 10. The electrode 122*b* is electrically connected to the second anode line 142. The electrode 122*c* is electrically connected to the second current drive display element 132. The second current drive display element 132 includes at least two electrodes. One electrode is electrically connected to the electrode 122*c*. The other electrode is electrically connected to the second cathode line 152.

Figure 14C:
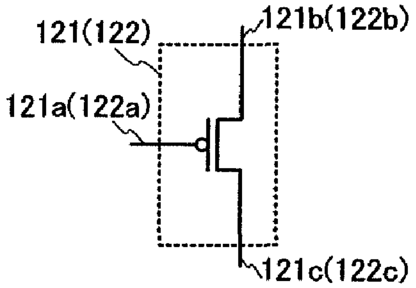
Figure 14D:
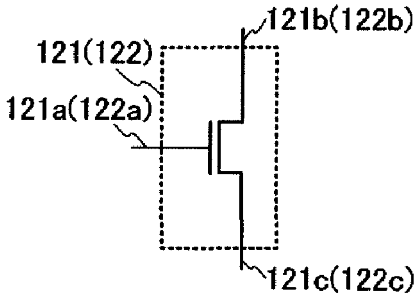

Here, the first current control circuit 121 and the second current control circuit 122 are circuits for controlling current flow through the first current drive display element 131 and the second current drive display element 132, respectively, based on the voltage supplied from the first circuit 10. FIGS. 14C and 14D illustrate a specific example of the first current control circuit 121 and the second current control circuit 122 which have such a function.

A circuit illustrated in FIG. 14C is a p-channel transistor, and the gate electrode thereof is electrically connected to the electrode 121*a* or the electrode 122*a*. One of a source electrode and a drain electrode is electrically connected to the electrode 121*b* or the electrode 122*b*. The other of the source electrode and the drain electrode is electrically connected to the electrode 121*c* or the electrode 122*c*. With such a structure, current flow through a current drive display element can be controlled based on the voltage applied to the electrode 121*a* or the electrode 122*a*.

A circuit illustrated in FIG. 14D is an n-channel transistor, and the gate electrode thereof is electrically connected to the electrode 121*a* or the electrode 122*a*. One of a source electrode and a drain electrode is electrically connected to the electrode 121*b* or the electrode 122*b*. The other of the source electrode and the drain electrode is electrically connected to the electrode 121*c* or the electrode 122*c*. With such a structure, current flow through a current drive display element can be controlled based on the voltage applied to the electrode 121*a* or the electrode 122*a*.

Note that the example of the pixel structure illustrated in FIG. 14B is similar to the example of the pixel structure illustrated in FIG. 14A except that directions of the first current drive display element 131 and the second current drive display element 132 are reversed compared to the example of the pixel structure illustrated in FIG. 14A.

When the circuit illustrated in FIG. 14C is used for the first current control circuit 121 and the second current control circuit 122 in the example of the pixel structure illustrated in FIG. 14A, potential of a source electrode of a p-channel transistor can be easily fixed, whereby constant current can be fed in spite of current voltage characteristics of the current drive display element. Thus, for example, even when current voltage characteristics change due to deterioration of a current drive display element, emission intensity of the current drive display element does not change compared to emission intensity before the deterioration, whereby there is an advantage that burn-in of a display device can be prevented.

On the contrary, when the circuit illustrated in FIG. 14D is used for the first current control circuit 121 and the second current control circuit 122 in the example of the pixel structure illustrated in FIG. 14A, and, for example, a switch included in the first circuit 10 is an n-channel transistor, the polarity of all transistors included in the example of the pixel structure illustrated in FIG. 14A can be n-channel. Thus, the number of manufacturing processes of a display device can be reduced compared to the case where the circuit includes both polarities of transistors, whereby there is an advantage that manufacturing cost can be reduced.

Moreover, when the circuit illustrated in FIG. 14D is used for the first current control circuit 121 and the second current control circuit 122 in the example of the pixel structure illustrated in FIG. 14B, potential of a source electrode of an n-channel transistor can be easily fixed, whereby constant current can be fed in spite of current voltage characteristics of the current drive display element. Thus, for example, even when current voltage characteristics change by deterioration of a current drive display element, emission intensity of the current drive display element does not change compared to emission intensity before the deterioration, whereby there is an advantage that burn-in of a display device can be prevented.

On the contrary, when the circuit illustrated in FIG. 14C is used for the first current control circuit 121 and the second current control circuit 122 in the example of the pixel structure illustrated in FIG. 14B, and, for example, a switch included in the first circuit 10 is a p-channel transistor, the polarity of all transistors included in the example of the pixel structure illustrated in FIG. 14B can be p-channel. Thus, the number of manufacturing processes of a display device can be reduced compared to the case where the circuit includes both polarities of transistors, whereby there is an advantage that manufacturing cost can be reduced.

Note that various circuits as well as the circuits illustrated in FIGS. 14C and 14D can be used for the current control circuits. For example, if a so-called threshold correction circuit is used for the current control circuit, threshold of a transistor can be corrected, whereby variations of a current value among pixels can be reduced, and uniform and beautiful display can be performed.

Figure 14E:
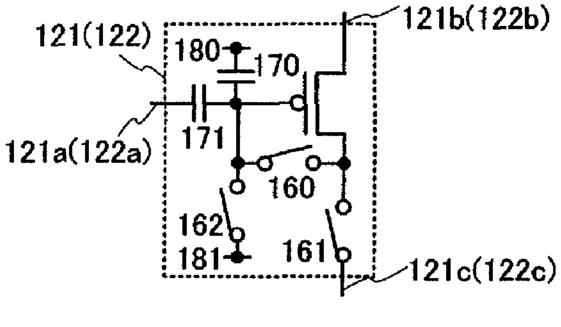

FIG. 14E illustrates an example of a threshold correction circuit. A current control circuit illustrated in FIG. 14E includes switches 160, 161, and 162, capacitor elements 170 and 171, and wirings 180 and 181. One electrode of the switch 160 is electrically connected to a gate electrode of a transistor, and the other electrode of the switch 160 is electrically connected to one of a source electrode and a drain electrode of the transistor. One electrode of the switch 161 is electrically connected to one of the source electrode and the drain electrode of the transistor, and the other electrode of the switch 161 is electrically connected to the electrode 121*c* or the electrode 122*c*. One electrode of the switch 162 is electrically connected to the gate electrode of the transistor, and the other electrode of the switch 162 is electrically connected to the wiring 181. One electrode of the capacitor element 170 is electrically connected to the gate electrode of the transistor, and the other electrode of the capacitor element 170 is electrically connected to the wiring 180. One electrode of the capacitor element 171 is electrically connected to the gate electrode of the transistor, and the other electrode of the capacitor element 171 is electrically connected to the electrode 121*a* or the electrode 122*a*. Note that a p-channel transistor is used in the threshold correction circuit illustrated in FIG. 14E; however, an n-channel transistor may also be used.

An operation of the current control circuit illustrated in FIG. 14E is described simply. First, switch 161 comes to an off state, and switch 162 comes to an on state, so that the capacitor element 170 and 171 are initialized. Initialization voltage at the time is supplied from the wiring 181 and may be the voltage level that a transistor is surely turned on. Subsequently, switch 160 comes to an on state, and switch 161 comes to an off state, and switch 162 comes to an off state, so that current made to flow in the capacitor elements 170 and 171 through the transistor. The current in this state stops when the level of the voltage between the gate and the source of the transistor becomes equal to the threshold of the transistor. At this time, the voltage of the electrode 121*a* or the electrode 122*a* is fixed to the predetermined voltage. Thus, the voltage based on the threshold of the transistor can be applied to opposite ends of the capacitor element 171. Next, the gate electrode of the transistor comes to be a floating state (switch 160 is an off state, and switch 162 is an off state), and then, voltage based on an image signal is applied to the electrode 121*a* or the electrode 122*a*. Thus, gate voltage of the transistor can be voltage which is based on an image signal is corrected with the threshold of the transistor. With this state, when switch 161 comes to be in an on state, current based on an image signal can be made to flow in a current drive display element through a transistor. Note that since the capacitor element 170 is used to hold the voltage applied to the gate electrode of the transistor, if the voltage applied to the gate electrode can be held by parasitic capacitance of a transistor or other means, the capacitor element 170 is not necessarily provided. Note that the voltage applied to the wiring 180 may be the constant voltage. Therefore, for example, the wiring 180 may be electrically connected to the electrode 121*b* or the electrode 122*b*.

Figure 15A:
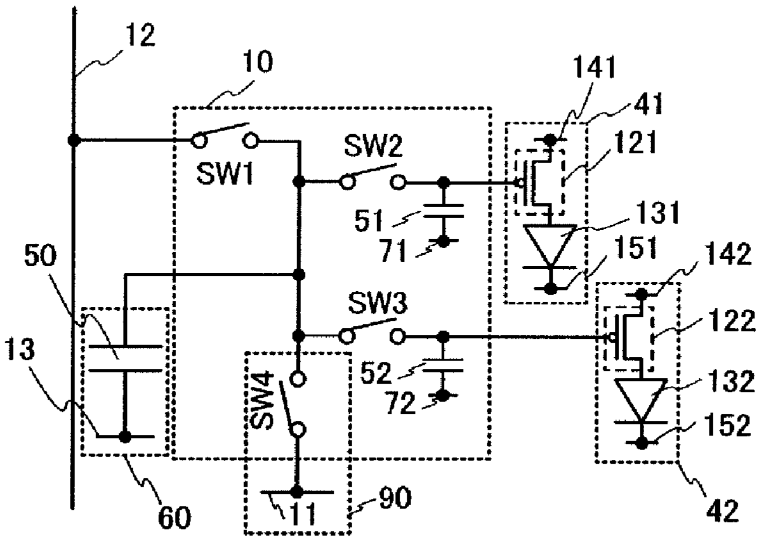
FIGS. 15A and 15B illustrate circuit examples of a pixel circuit in the present invention.

As an example, FIG. 15A illustrates a circuit in the case where the liquid crystal elements included in the first sub-pixel 41 and the second sub-pixel 42 in the circuit example (1) illustrated in FIG. 6A is replaced with a current drive display element as described in this embodiment mode. The circuit illustrated in FIG. 15A is an example of using the circuit illustrated in FIG. 14C as a current control circuit. With the circuit illustrated in FIG. 15A, even when a current drive display element such as an organic EL element is used, driving described in Embodiment Modes 1 to 3 can be performed. Further, in this case, since a pixel structure is simple when a current drive display element such as an organic EL element is used, manufacturing yield can be increased.

Figure 15B:
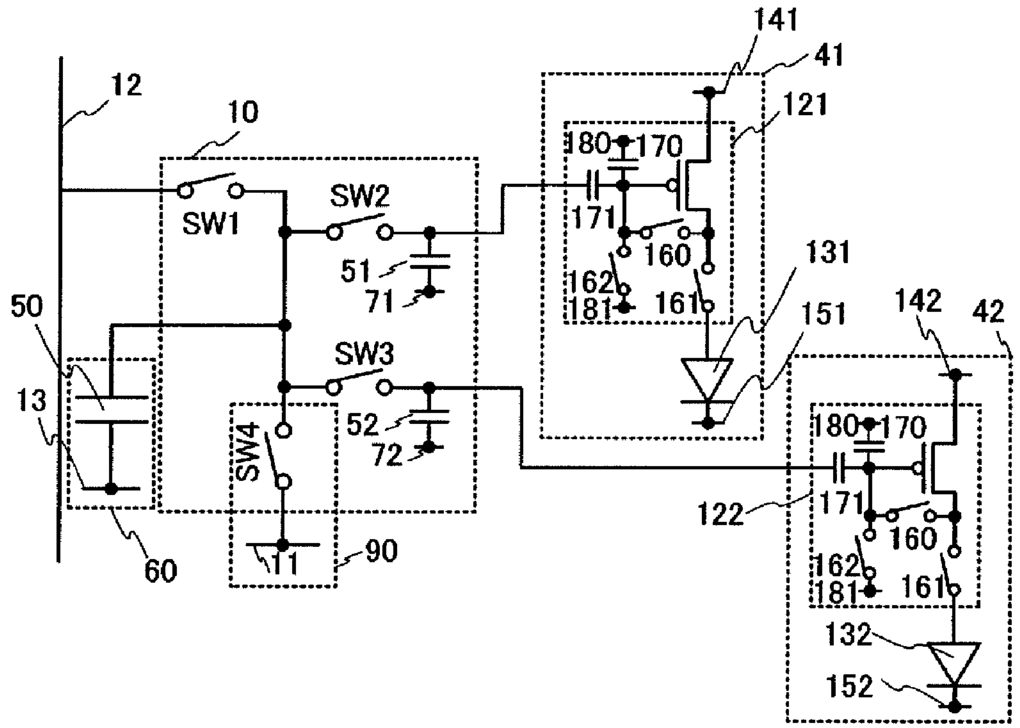

As another example, FIG. 15B illustrates an example in the case where the liquid crystal elements included in the first sub-pixel 41 and the second sub-pixel 42 in the circuit example (1) illustrated in FIG. 6A is replaced with a current drive display element as described in this embodiment mode, and further the circuit illustrated in FIG. 14E is used as a current control circuit. In this case, threshold of a transistor can be corrected, whereby variations of a current value among pixels can be reduced, and uniform and beautiful display can be performed. Note that switch 162 can be controlled at the same timing as switch SW4. Moreover, the wiring 181 may be electrically connected to the first wiring 11.

Note that an advantage of using a current drive display element such as an organic EL element for the sub-pixel is, for example, that a sub-pixel which emits bright light and a sub-pixel which emits dark light can be realized at the same time by using sub-pixels, so that life of the sub-pixel which emits dark light can increase. Furthermore, by driving a sub-pixel which emits bright light and a sub-pixel which emits dark light alternately by a predetermined period (e.g, one frame period), deterioration of display elements can be averaged among sub-pixels, whereby deterioration of display elements is further suppressed.

Although this embodiment mode is described with reference to various drawings, the contents (or may be part of the contents) described in each drawing can be freely applied to, combined with, or replaced with the contents (or may be part of the contents) described in another drawing and the contents (or may be part of the contents) described in a drawing in another embodiment mode. Further, in the above described drawings, each part can be combined with another part or with another part of another embodiment mode.

Embodiment Mode 5

In this embodiment mode, a structure of a display panel including a display portion which is formed with the above described various pixel structures is described.

Note that, in this embodiment mode, a display panel includes a substrate over which a pixel circuit is formed and a whole structure which is formed in contact with the substrate. For example, when a pixel circuit is formed on a glass substrate, a combination of a glass substrate, a transistor formed in contact with the glass substrate, a wiring, and the like is referred to as a display panel.

As well as a pixel circuit, a peripheral driver circuit for driving a pixel circuit is formed over a display panel in some cases (formed in an integrated manner). A peripheral driver circuit typically includes a scan driver for controlling a scan line of a display portion (also referred to as a scan line driver, a gate driver, or the like) and a data driver for controlling a signal line (also referred to as a signal line driver, a source driver, or the like), and furthermore includes a timing controller for controlling these drivers, a data processing unit for processing image data, a power supply circuit for generating a power supply voltage, a reference voltage generating portion of a digital analog converter, or the like in some cases.

A peripheral driver circuit is formed on the same substrate over which a pixel circuit in an integrated manner, the number of connection portion of the substrate between a display panel and an external circuit can be reduced. Mechanical strength of the connection portion of the substrate is weak, and poor connection easily occurs. Therefore, there are advantages such that reduction in the number of connection portion of the substrate can lead to increase of reliability of a device. Further, reduction in the number of external circuits can allow reduction in the manufacturing cost.

However, a semiconductor element over the substrate over which a pixel circuit is formed has low mobility and large variations in characteristics among elements with compared to an element formed over a single crystal semiconductor substrate. Therefore, when a peripheral driver circuit and a pixel circuit are formed over the same substrate in an integrated manner, consideration of many facts is necessary such as increase in performance of an element which is necessary for realizing the function of the circuit, a technique for the circuit which makes up for a shortage of performance of an element, or the like.

When a peripheral driver circuit and a pixel circuit are formed over the same substrate in an integrated manner, for example, the following structures can be mainly given: (1) formation of only a display portion; (2) formation of a display portion and a scan driver in an integrated manner; (3) formation of a display portion, a scan driver, and a data driver in an integrated manner; and (4) formation of a display portion, a scan driver, a data driver, and other peripheral driver circuits in an integrated manner. However, other combinations may also be used for the combination of circuits formed in an integrated manner. For example, when the frame area where scan driver is located have to be reduced while the frame area where data driver is located is not needed to be reduced, a structure that (5) formation of a display portion and a data driver in an integrated manner is the most suitable in some cases. Similarly, the following structures can also be employed: (6) formation of a display portion and other peripheral driver circuits in an integrated manner; (7) formation of a display portion, a data driver, and other peripheral driver circuits in an integrated manner; and (8) formation of a display portion, a scan driver, and other peripheral driver circuits in an integrated manner.

<(1) Formation of Only Display Portion>

Out of the above mentioned combinations, (1) formation of only a display portion is described with reference to FIG. 16A. A display panel 200 illustrated in FIG. 16A includes a display portion 201 and a connection point 202. The connection point 202 includes a plurality of electrodes, and a drive signal can be input from the outside of the display panel 200 to the inside of the display panel 200 by connecting a connection substrate 203 to the connection point 202.

Note that when a scan driver and a data driver are not formed in an integrated manner with a display portion, the number of electrodes included in the connection point 202 becomes nearer the sum of the number of scan lines and the signal lines which are included in the display portion 201. However, input to a signal line is performed by time division, so that the number of electrodes of the signal line can be equal to one divided by the number of time divisions. For example, in the display device which can display colors, input to a signal line corresponding to R, G, and B is divided by time, so that the number of electrodes of the signal line can be reduced to one-third. This is similar to other examples in this embodiment mode.

Note that as the peripheral driver circuit which is not formed with the display portion 201 in an integrated manner, an IC manufactured with a single crystal semiconductor can be used. The IC may be mounted over an external printed wiring board, may be mounted (TAB) over the connection substrate 203, and may be mounted (COG) over the display panel 200. This is similar to other examples in this embodiment mode.

Note that in order to suppress a phenomenon (ESD; electrostatic discharge) that an element is damaged by generating static electricity in a scan line or a signal line which are included in the display portion 201, the display panel 200 may include an electrostatic discharge protection circuit between each of scan lines, each of signal lines, or each of power supply lines. Thus, yield of the display panel 200 can be improved, whereby manufacturing cost can be reduced. This is similar to other examples in this embodiment mode.

Figure 16A:
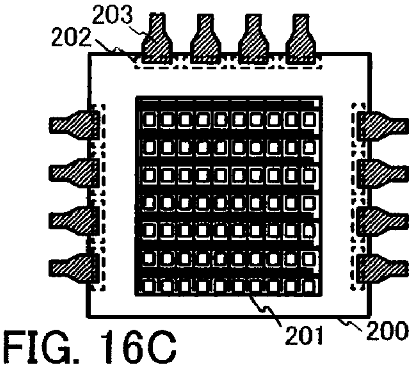
FIGS. 16A to 16H illustrate manufacturing examples of a peripheral driver circuit in the present invention.

The display panel 200 illustrated in FIG. 16A is effective in particular when the semiconductor element included in the display panel 200 is formed with semiconductor having low mobility such as amorphous silicon or the like. This is because peripheral driver circuits except a display portion are not formed over the display panel 200 in an integrated manner, so that yield of the display panel 200 can be improved. Thus, manufacturing cost can be reduced. Furthermore, the pixel structures described in Embodiment Modes 1 to 4 include at least four scan lines by pixels of one row, and four kinds of scan drivers for driving these scan lines are needed. Thus, the peripheral driver circuit is not formed over the display panel 200 in an integrated manner, whereby a frame area can be reduced.

<(2) Formation of Display Portion and Scan Driver in an Integrated Manner>

Out of the above mentioned combinations, (2) a display portion and a scan driver are formed in an integrated manner is described with reference to FIG. 16B. The display panel 200 illustrated in FIG. 16B includes the display portion 201, the connection point 202, a first scan driver 211, a second scan driver 212, a third scan driver 213, and a fourth scan driver 214. The connection point 202 includes a plurality of electrodes, and a drive signal can be input from the outside of the display panel 200 to the inside of the display panel 200 by connecting the connection substrate 203 to the connection point 202.

Figure 16B:
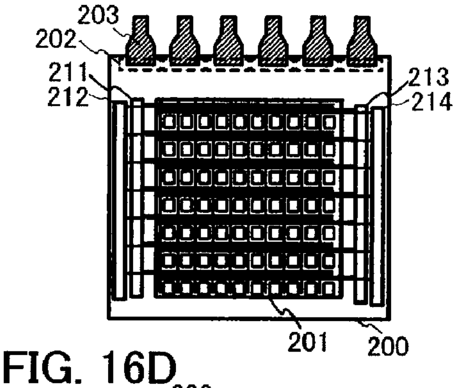

In the case of the display panel 200 illustrated in FIG. 16B, the first scan driver 211, the second scan driver 212, the third scan driver 213, and the fourth scan driver 214 are formed in an integrated manner with the display portion 201, so that the connection point 202 and the connection substrate 203 of the scan driver side are not needed. Therefore, there is an advantage that an external substrate can be freely arranged. Moreover, since the number of connection point of the substrate is a small, poor connections less occur, whereby reliability of a device can be improved.

The semiconductor element included in the display panel 200 illustrated in FIG. 16B may be formed with semiconductor which has low mobility such as amorphous silicon or may be formed with semiconductor which has high mobility such as polysilicon or single crystal silicon. When a semiconductor element is formed with amorphous silicon, in particular, the number of steps in a manufacturing process of an inverted staggered transistor is small. Thus, manufacturing cost can be reduced. When a semiconductor element is formed with polysilicon, the size of a transistor can be reduced by high mobility. Thus, aperture ratio can be improved, and power consumption can be reduced. Furthermore, since the area of a scan driver circuit can be reduced by reduction in the size of the transistor, the frame area can be reduced. When a semiconductor element is formed with single crystal silicon, the size of the transistor can be further reduced by extreme high mobility. Thus, aperture ratio can be improved, and the frame area can be further reduced.

<(3) Formation of Display Portion, Scan Driver, and Data Driver in an Integrated Manner>

Out of the above mentioned combinations, (3) formation of a display portion, a scan driver, and a data driver in an integrated manner is described with reference to FIG. 16C. The display panel 200 illustrated in FIG. 16C includes the display portion 201, the connection point 202, the first scan driver 211, the second scan driver 212, the third scan driver 213, the fourth scan driver 214, and a data driver 221. The connection point 202 includes a plurality of electrodes, and a drive signal can be input from the outside of the display panel 200 to the inside of the display panel 200 by connecting the connection substrate 203 to the connection point 202.

Figure 16C:
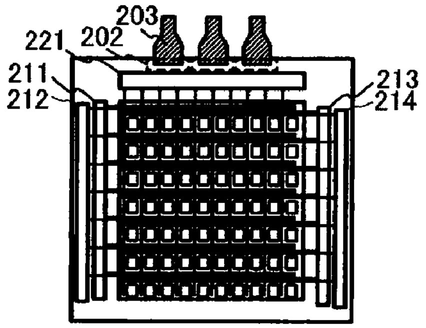

In the case of the display panel 200 illustrated in FIG. 16C, the first scan driver 211, the second scan driver 212, the third scan driver 213, the fourth scan driver 214, and the data driver 221 are formed in an integrated manner with the display portion 201, so that the connection point 202 and the connection substrate 203 of the scan driver side are not needed, and further the number of the connection substrates 203 provided on the scan driver side can be reduced. Therefore, there is an advantage that an external substrate can be freely arranged. Moreover, since the number of connection points of the substrate is small, poor connections less occur, whereby reliability of a device can be improved.

The semiconductor element included in the display panel 200 illustrated in FIG. 16C may be formed with semiconductor which has low mobility such as amorphous silicon or may be formed with semiconductor which has high mobility such as polysilicon or single crystal silicon. When a semiconductor element is formed with amorphous silicon, in particular, the number of steps in a manufacturing process of an inverted staggered transistor is small. Thus, manufacturing cost can be reduced. When a semiconductor element is formed with polysilicon, the size of a transistor can be reduced by high mobility. Thus, aperture ratio can be improved, and power consumption can be reduced. Furthermore, since the area of a scan driver circuit and a data driver circuit can be reduced by reduction in the size of the transistor, the frame area can be reduced. Since the data driver particularly has higher drive frequency than that of the scan driver, a data driver which can surely operate is realized by using polysilicon for formation of a semiconductor element. When a semiconductor element is formed with single crystal silicon, the size of the transistor can be further reduced by extreme high mobility. Thus, aperture ratio can be improved, and the frame area can be further reduced.

<(4) Formation of Display Portion, Scan Driver, Data Driver, and Other Peripheral Driver Circuits in an Integrated Manner>

Out of the above mentioned combinations, (4) formation of a display portion, a scan driver, a data driver, and other peripheral driver circuits in an integrated manner is described with reference to FIG. 16D. The display panel 200 illustrated in FIG. 16D includes the display portion 201, the connection point 202, the first scan driver 211, the second scan driver 212, the third scan driver 213, the fourth scan driver 214, the data driver 221, and other peripheral driver circuits 231, 232, 233, and 234. Here, it is an example that the number of other peripheral driver circuits which are formed in an integral manner is four. Various number and kinds of the other peripheral driver circuits which are formed in an integral manner can be employed. For example, the peripheral driver circuits 231 may be a timing controller. The peripheral driver circuit 232 may be a data processing unit for processing image data. The peripheral driver circuit 233 may be a power supply circuit for generating a power supply voltage. The peripheral driver circuit 234 may be a reference voltage generating portion of a digital analog converter (DAC). The connection point 202 includes a plurality of electrodes, and a drive signal can be input from the outside of the display panel 200 to the inside of the display panel 200 by connecting the connection substrate 203 to the connection point 202.

Figure 16D:
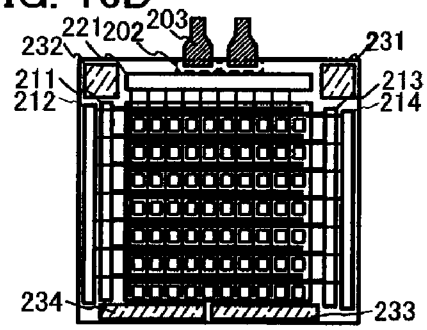

In the case of the display panel 200 illustrated in FIG. 16D, the first scan driver 211, the second scan driver 212, the third scan driver 213, the fourth scan driver 214, the data driver 221, and other peripheral driver circuits 231, 232, 233, and 234 are formed in an integrated manner with the display portion 201, so that the connection point 202 and the connection substrate 203 which are provided on the scan driver side are not needed, and further the number of the connection substrates 203 which are provided on the scan driver side can be reduced. Therefore, there is an advantage that an external substrate can be freely arranged. Moreover, since the number of connection points of the substrate is small, poor connections less occur, whereby reliability of a device can be improved.

The semiconductor element included in the display panel 200 illustrated in FIG. 16D may be formed with semiconductor which has low mobility such as amorphous silicon or may be formed with semiconductor which has high mobility such as polysilicon or single crystal silicon. When a semiconductor element is formed with amorphous silicon, in particular, the number of steps of a manufacturing process of an inverted staggered transistor is small. Thus, manufacturing cost can be reduced. When a semiconductor element is formed with polysilicon, the size of a transistor can be reduced by high mobility. Thus, aperture ratio can be improved, and power consumption can be reduced. Furthermore, since the area of a scan driver circuit and a data driver circuit can be reduced by reduction in the size of a transistor, the frame area can be reduced. Since the data driver particularly has higher drive frequency than that of the scan driver, a data driver which can surely operate is realized by using polysilicon for formation of a semiconductor element. Moreover, since a high-speed logic circuit (a data processing unit or the like), or an analog circuit (a timing controller, a reference voltage generation portion of a DAC, a power supply circuit, or the like) is needed for the other peripheral driver circuits, forming a circuit with a semiconductor element which has high mobility offers many advantages. When a semiconductor element is formed with single crystal silicon in particular, the size of the transistor can be further reduced by extreme high mobility. Thus, aperture ratio can be improved, and the frame area can be further reduced, and other peripheral driver circuits can be surely operated. The power supply voltage is set to be low or the like, whereby power consumption can be reduced.

<Formation in an Integral Manner with Other Combinations>

FIGS. 16E, 16F, 16G, and 16H illustrate (5) formation of a display portion and a data driver in an integrated manner, (6) formation of a display portion and other peripheral driver circuits in an integrated manner; (7) formation of a display portion, a data driver, and other peripheral driver circuits in an integrated manner; and (8) formation of a display portion, a scan driver, and other peripheral driver circuits in an integrated manner, respectively. Advantages of integral formation and respective materials of the semiconductor element are similar to the above description.

Figure 16E:
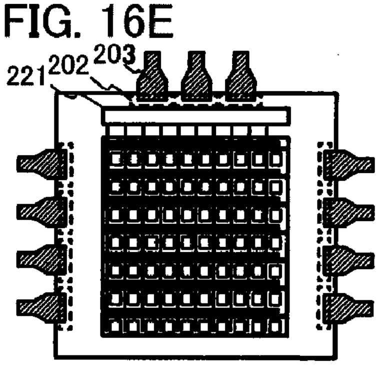

As illustrated in FIG. 16E, when (5) formation of a display portion and a data driver in an integrated manner is realized, the frame area except a portion where the data driver has been provided can be reduced.

Figure 16F:
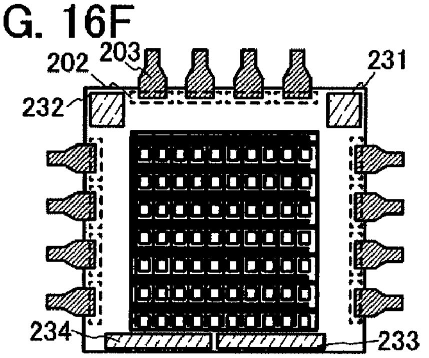

As illustrated in FIG. 16F, when (6) formation of a display portion and other peripheral driver circuits in an integrated manner is realized, other peripheral driver circuits can be freely arranged, so that the frame area can be reduced by appropriately selecting a portion which meets the purpose.

Figure 16G:
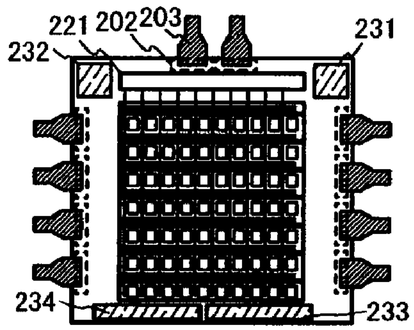

As illustrated in FIG. 16G, in the case of (7) formation of a display portion, a data driver, and other peripheral driver circuits in an integrated manner is realized, a portion of the frame area where the scan driver has been provided can be reduced when the scan driver is formed in an integrated manner.

Figure 16H:
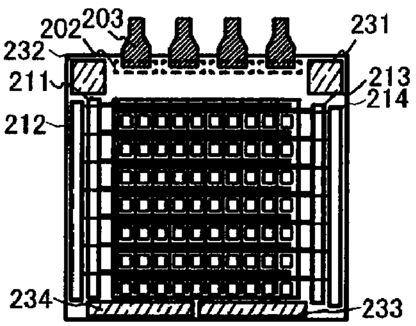

As illustrated in FIG. 16H, in the case of (8) formation of a display portion, a scan driver, and other peripheral driver circuits in an integrated manner is realized, a portion of the frame area where the data driver has been provided can be reduced when the data driver is formed in an integrated manner.

Although this embodiment mode is described with reference to various drawings, the contents (or may be part of the contents) described in each drawing can be freely applied to, combined with, or replaced with the contents (or may be part of the contents) described in another drawing and the contents (or may be part of the contents) described in a drawing in another embodiment mode. Further, in the above described drawings, each part can be combined with another part or with another part of another embodiment mode.

Embodiment Mode 6

In this embodiment mode, a structure of transistor and a method for manufacturing a transistor are described.

Figure 17A:
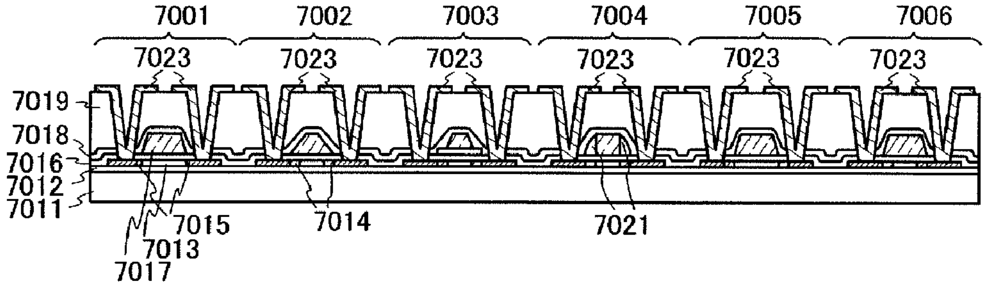
FIGS. 17A to 17G illustrate manufacturing examples of a semiconductor element in the present invention.
Figure 17B:
Figure 17C:
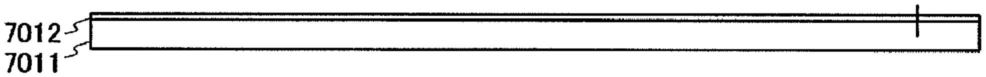
Figure 17D:
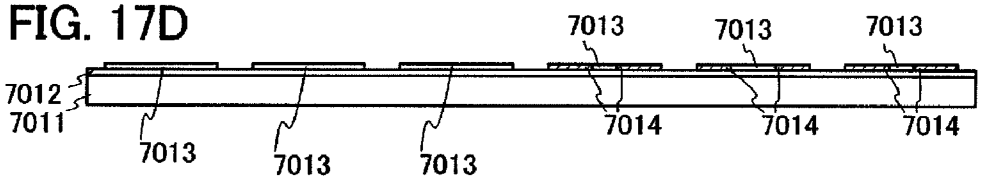
Figure 17E:
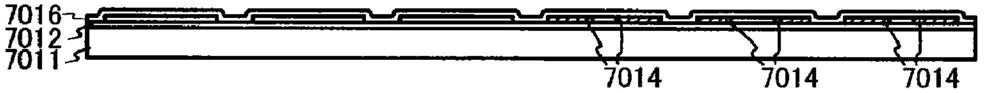
Figure 17F:
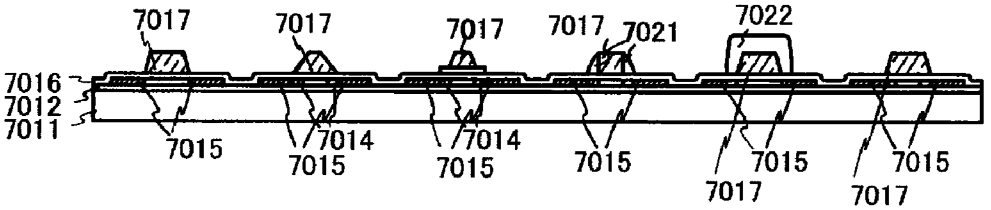
Figure 17G:

FIGS. 17A to 17G illustrate examples of structures and methods for manufacturing transistors. FIG. 17A illustrates structure examples of transistors. FIGS. 17B to 17G illustrate examples of methods for manufacturing transistors.

Note that the structure and the methods for manufacturing transistors are not limited to those illustrated in FIGS. 17A to 17G, and various structures and manufacturing methods can be employed.

First, structure examples of transistors are described with reference to FIG. 17A. FIG. 17A is a cross-sectional view of a plurality of transistors each having a different structure. Here, in FIG. 17A, the plurality of transistors each having different structures are placed in a line, which is for describing structures of the transistors. Accordingly, the transistors are not needed to be actually placed as illustrated in FIG. 17A and can be separately formed as needed.

Next, characteristics of each layer forming the transistor are described.

A substrate 7011 can be a glass substrate using barium borosilicate glass, aluminoborosilicate glass, or the like, a quartz substrate, a ceramic substrate, a metal substrate containing stainless steel, or the like. Further, a substrate formed of plastics typified by polyethylene terephthalate (PET), polyethylene naphthalate (PEN), or polyethersulfone (PES), or a substrate formed of a flexible synthetic resin such as acrylic can also be used. By using a flexible substrate, a semiconductor device capable of being bent can be formed. A flexible substrate has no strict limitations on the area or the shape of the substrate. Accordingly, for example, when a substrate having a rectangular shape, each side of which is 1 meter or more, is used as the substrate 7011, productivity can be significantly improved. Such an advantage is highly favorable as compared with the case where a circular silicon substrate is used.

An insulating film 7012 functions as a base film and is provided to prevent alkali metal such as Na or alkaline earth metal from the substrate 7011 from adversely affecting characteristics of a semiconductor element. The insulating film 7012 can have a single-layer structure or a stacked-layer structure of an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y). For example, when the insulating film 7012 is provided to have a two-layer structure, it is preferable that a silicon nitride oxide film be used as a first insulating film and a silicon oxynitride film be used as a second insulating film. As another example, when the insulating film 7012 is provided to have a three-layer structure, it is preferable that a silicon oxynitride film be used as a first insulating film, a silicon nitride oxide film be used as a second insulating film, and a silicon oxynitride film be used as a third insulating film.

Semiconductor layers 7013, 7014, and 7015 can be formed using an amorphous semiconductor, a microcrystalline semiconductor, or a semi-amorphous semiconductor (SAS). Alternatively, a polycrystalline semiconductor layer may be used. SAS is a semiconductor having an intermediate structure between amorphous and crystalline (including single crystal and polycrystalline) structures and having a third state which is stable in terms of free energy. Moreover, SAS includes a crystalline region with a short-range order and lattice distortion. A crystalline region of 0.5 to 20 nm can be observed at least in part of a film. When silicon is contained as a main component, Raman spectrum shifts to a wave number side lower than 520 $cm^{-1}$. The diffraction peaks of (111) and (220) which are thought to be derived from a silicon crystalline lattice are observed by X-ray diffraction. SAS contains hydrogen or halogen of at least 1 atomic percent or more to compensate dangling bonds. SAS is formed by glow discharge decomposition (plasma CVD) of a material gas. As the material gas, $Si_2H_6$, $SiH_2Cl_2$, $SiHCl_3$, $SiCl_4$, $SiF_4$, or the like as well as $SiH_4$ can be used. Alternatively, $GeF_4$ may be mixed. The material gas may be diluted with $H_2$, or $H_2$ and one or more kinds of rare gas elements selected from He, Ar, Kr, and Ne. A dilution ratio is in the range of 2 to 1000 times. Pressure is in the range of approximately 0.1 to 133 Pa, and a power supply frequency is 1 to 120 MHz, preferably 13 to 60 MHz. A substrate heating temperature may be 300° C. or lower. A concentration of impurities in atmospheric components such as oxygen, nitrogen, and carbon is preferably $1\times10^{20}$ $cm^{-1}$ or less as impurity elements in the film. In particular, an oxygen concentration is $5\times10^{19}/cm^3$ or less, preferably $1\times10^{19}/cm^3$ or less. Here, an amorphous semiconductor layer is formed using a material containing silicon (Si) as its main component (e.g., $Si_xGe_{1-x}$) by a method such as a sputtering method, an LPCVD method, or a plasma CVD method. Then, the amorphous semiconductor layer is crystallized by a crystallization method such as a laser crystallization method, a thermal crystallization method using RTA or an annealing furnace, or a thermal crystallization method using a metal element which promotes crystallization.

An insulating film 7016 can have a single-layer structure or a stacked-layer structure of an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y).

A gate electrode 7017 can have a single-layer structure of a conductive film or a stacked-layer structure of two or three conductive films. As a material for the gate electrode 7017, a conductive film can be used. For example, a single film of an element such as tantalum (Ta), titanium (Ti), molybdenum (Mo), tungsten (W), chromium (Cr), or silicon (Si); a nitride film containing the aforementioned element (typically, a tantalum nitride film, a tungsten nitride film, or a titanium nitride film); an alloy film in which the aforementioned elements are combined (typically, a Mo—W alloy or a Mo—Ta alloy); a silicide film containing the aforementioned element (typically, a tungsten silicide film or a titanium silicide film); and the like can be used. Note that the aforementioned single film, nitride film, alloy film, silicide film, and the like can have a single-layer structure or a stacked-layer structure.

An insulating film 7018 can have a single-layer structure or a stacked-layer structure of an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y); or a film containing carbon, such as a DLC (diamond-like carbon), by a method such as a sputtering method or a plasma CVD method.

An insulating film 7019 can have a single-layer structure or a stacked-layer structure of a siloxane resin; an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y); a film containing carbon, such as a DLC (diamond-like carbon); or an organic material such as epoxy, polyimide, polyamide, polyvinyl phenol, benzocyclobutene, or acrylic. Note that a siloxane resin corresponds to a resin having Si—O—Si bonds. Siloxane includes a skeleton structure of a bond of silicon (Si) and oxygen (O). As a substituent, an organic group containing at least hydrogen (such as an alkyl group or aromatic hydrocarbon) is used. A fluoro group may be included in the organic group. Note that the insulating film 7019 can be directly provided so as to cover the gate electrode 7017 without provision of the insulating film 7018.

As a conductive film 7023, a single film of an element such as Al, Ni, C, W, Mo, Ti, Pt, Cu, Ta, Au, or Mn, a nitride film containing the aforementioned element, an alloy film in which the aforementioned elements are combined, a silicide film containing the aforementioned element, or the like can be used. For example, as an alloy containing a plurality of the aforementioned elements, an Al alloy containing C and Ti, an Al alloy containing Ni, an Al alloy containing C and Ni, an Al alloy containing C and Mn, or the like can be used. For example, when the conductive film has a stacked-layer structure, Al can be interposed between Mo, Ti, or the like; thus, resistance of Al to heat and chemical reaction can be improved.

Next, with reference to the cross-sectional view of the plurality of transistors each having a different structure illustrated in FIG. 17A, characteristics of each structure are described.

A transistor 7001 is a single drain transistor. Since the single drain transistor can be formed by a simple method, it is advantageous in low manufacturing cost and high yield. Note that the tapered angle is 45° or more and less than 95°, and preferably, 60° or more and less than 95°. Alternatively, the tapered angle can be less than 45°. Here, the semiconductor layers 7013 and 7015 have different concentrations of impurities. The semiconductor layer 7013 is used as a channel formation region. The semiconductor layers 7015 are used as a source region and a drain region. By controlling the concentration of impurities in this manner, the resistivity of the semiconductor layer can be controlled. Moreover, an electrical connection state of the semiconductor layer and the conductive film 7023 can be closer to ohmic contact. Note that as a method of separately forming the semiconductor layers each having different amount of impurities, a method can be used in which impurities are doped in a semiconductor layer using the gate electrode 7017 as a mask.

A transistor 7002 is a transistor in which the gate electrode 7017 is tapered at an angle of at least certain degrees. Since the transistor can be formed by a simple method, it is advantageous in low manufacturing cost and high yield. Here, the semiconductor layers 7013, 7014, and 7015 have different concentrations of impurities. The semiconductor layer 7013 is used as a channel region, the semiconductor layers 7014 as lightly doped drain (LDD) regions, and the semiconductor layers 7015 as a source region and a drain region. By controlling the amount of impurities in this manner, the resistivity of the semiconductor layer can be controlled. Moreover, an electrical connection state of the semiconductor layer and the conductive film 7023 can be closer to ohmic contact. Since the transistor includes the LDD regions, a high electric field is hardly applied inside the transistor, so that deterioration of the element due to hot carriers can be suppressed. Note that as a method of separately forming the semiconductor layers having different amount of impurities, a method can be used in which impurities are doped in a semiconductor layer using the gate electrode 7017 as a mask. In the transistor 7002, since the gate electrode 7017 is tapered at an angle of at least certain degrees, gradient of the concentration of impurities doped in the semiconductor layer through the gate electrode 7017 can be provided, and the LDD region can be easily formed. Note that the tapered angle is 45° or more and less than 95°, and preferably, 60° or more and less than 95°. Alternatively, the tapered angle can be less than 45°.

A transistor 7003 is a transistor in which the gate electrode 7017 is formed of at least two layers and a lower gate electrode is longer than an upper gate electrode. In this specification, a shape of the lower and upper gate electrodes is called a hat shape. When the gate electrode 7017 has a hat shape, an LDD region can be formed without addition of a photomask. Note that a structure where the LDD region overlaps with the gate electrode 7017, like the transistor 7003, is particularly called a GOLD (gate overlapped LDD) structure. As a method of forming the gate electrode 7017 with a hat shape, the following method may be used.

First, when the gate electrode 7017 is patterned, the lower and upper gate electrodes are etched by dry etching so that side surfaces thereof are inclined (tapered). Then, the inclination of the upper gate electrode is processed to be almost perpendicular by anisotropic etching. Thus, the gate electrode having a cross section of which is a hat shape is formed. After that, impurity elements are doped twice, so that the semiconductor layer 7013 used as the channel region, the semiconductor layers 7014 used as the LDD regions, and the semiconductor layers 7015 used as a source electrode and a drain electrode are formed.

Note that part of the LDD region, which overlaps with the gate electrode 7017, is referred to as an Lov region, and part of the LDD region, which does not overlap with the gate electrode 7017, is referred to as an Loff region. Here, the Loff region is highly effective in suppressing an off-current value, whereas it is not very effective in preventing deterioration in an on-current value due to hot carriers by relieving an electric field in the vicinity of the drain. On the other hand, the Lov region is effective in preventing deterioration in the on-current value by relieving the electric field in the vicinity of the drain, whereas it is not very effective in suppressing the off-current value. Thus, it is preferable to form a transistor having a structure appropriate for characteristics of each of a variety of circuits. For example, when the semiconductor device is used as a display device, a transistor having an Loff region is preferably used as a pixel transistor in order to suppress the off-current value. On the other hand, as a transistor in a peripheral circuit, a transistor having an Lov region is preferably used in order to prevent deterioration in the on-current value by relieving the electric field in the vicinity of the drain.

A transistor 7004 is a transistor including a sidewall 7021 in contact with the side surface of the gate electrode 7017. When the transistor includes the sidewall 7021, a region overlapping with the sidewall 7021 can be made to be an LDD region.

A transistor 7005 is a transistor in which an LDD (Loff) region is formed by performing doping of the semiconductor layer with the use of a mask 7022. Thus, the LDD region can surely be formed, and an off-current value of the transistor can be reduced.

A transistor 7006 is a transistor in which an LDD (Lov) region is formed by performing doping of the semiconductor layer with the use of a mask. Thus, the LDD region can surely be formed, and deterioration in an on-current value can be prevented by relieving the electric field in the vicinity of the drain of the transistor.

Next, FIGS. 17B to 17G illustrate an example of a method for manufacturing the transistor.

Note that a structure of the transistor and a method for manufacturing the transistor are not limited to those in FIGS. 17A to 17G, and a variety of structures and manufacturing methods can be used.

In this embodiment mode, a surface of the substrate 7011, a surface of the insulating film 7012, a surface of the semiconductor layer 7013, a surface of the semiconductor layer 7014, a surface of the semiconductor layer 7015, a surface of the insulating film 7016, a surface of the insulating film 7018, or a surface of the insulating film 7019 is oxidized or nitrided using plasma treatment, so that the semiconductor layer or the insulating film can be oxidized or nitrided. By oxidizing or nitriding the semiconductor layer or the insulating film by plasma treatment in such a manner, the surface of the semiconductor layer or the insulating film is modified, and the insulating film can be formed to be denser than an insulating film formed by a CVD method or a sputtering method. Thus, a defect such as a pinhole can be suppressed, and characteristics and the like of the semiconductor device can be improved. An insulating film 7024 which is subjected to the plasma treatment is referred to as a plasma-treated insulating film.

Note that silicon oxide ($SiO_x$) or silicon nitride ($SiN_x$) can be used for the sidewall 7021. As a method for forming the sidewall 7021 on the side surface of the gate electrode 7017, a method can be used, for example, in which a silicon oxide ($SiO_x$) film or a silicon nitride ($SiN_x$) film is formed after the gate electrode 7017 is formed, and then, the silicon oxide ($SiO_x$) film or the silicon nitride ($SiN_x$) film is etched by anisotropic etching. Thus, the silicon oxide ($SiO_x$) film or the silicon nitride ($SiN_x$) film remains only on the side surface of the gate electrode 7017, so that the sidewall 7021 can be formed on the side surface of the gate electrode 7017.

Figure 18A:
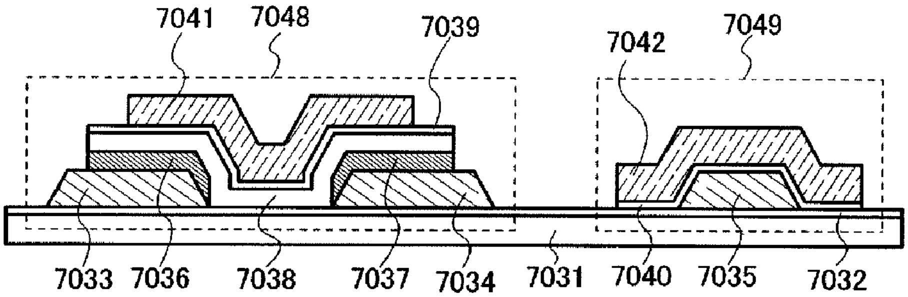
FIGS. 18A to 18D illustrate manufacturing examples of a semiconductor element in the present invention.
Figure 18B:
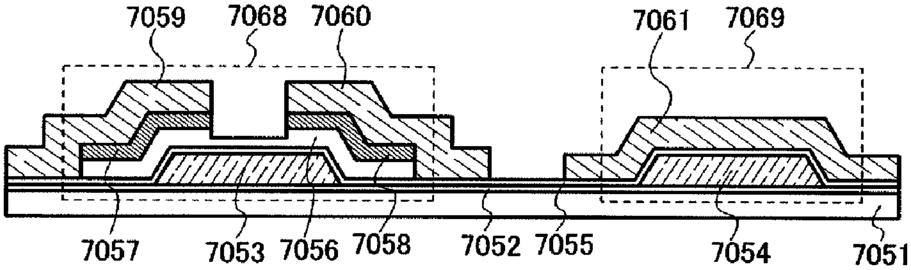
Figure 18C:
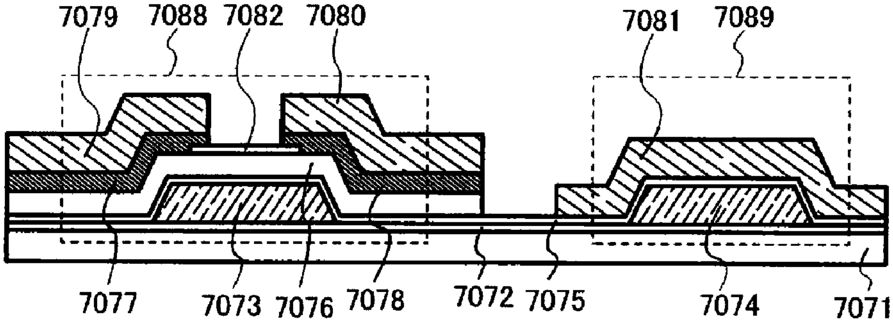
Figure 18D:
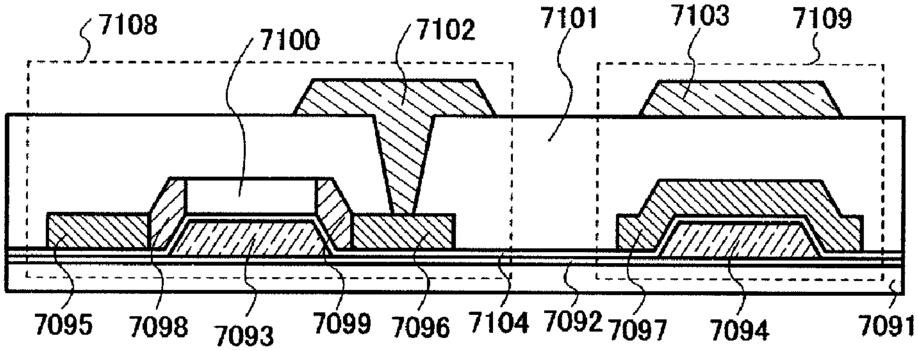

FIG. 18D illustrates cross-sectional structures of a bottom-gate transistor and a capacitor element.

A first insulating film (an insulating film 7092) is formed over an entire surface of a substrate 7091. However, the structure is not limited to this. The case where the first insulating film (the insulating film 7092) is not formed is also possible. The first insulating film can prevent impurities from the substrate from adversely affecting a semiconductor layer and changing properties of a transistor. That is, the first insulating film functions as a base film. Thus, a transistor with high reliability can be formed. As the first insulating film, a single layer or stacked layers of a silicon oxide film, a silicon nitride film, a silicon oxynitride film ($SiO_xN_y$), or the like can be used.

A first conductive layer (conductive layers 7093 and 7094) is formed over the first insulating film. The conductive layer 7093 includes a portion functioning as a gate electrode of a transistor 7108. The conductive layer 7094 includes a portion functioning as a first electrode of a capacitor element 7109. As the first conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternatively, stacked layers of these elements (including the alloy thereof) can be used.

A second insulating film (an insulating film 7104) is formed to cover at least the first conductive layer. The second insulating film functions as a gate insulating film. As the second insulating film, a single layer or stacked layers of a silicon oxide film, a silicon nitride film, a silicon oxynitride film ($SiO_xN_y$), or the like can be used.

Note that for a portion of the second insulating film, which is in contact with the semiconductor layer, a silicon oxide film is preferably used. This is because the trap level at the interface between the semiconductor layer and the second insulating film is lowered.

When the second insulating film is in contact with Mo, a silicon oxide film is preferably used for a portion of the second insulating film in contact with Mo. This is because the silicon oxide film does not oxidize Mo.

A semiconductor layer is formed in part of a portion over the second insulating film, which overlaps with the first conductive layer, by a photolithography method, an inkjet method, a printing method, or the like. Part of the semiconductor layer extends to a portion over the second insulating film, which does not overlap with the first conductive layer. The semiconductor layer includes a channel formation region (a channel formation region 7100), an LDD region (LDD regions 7098 and 7099), and an impurity region (impurity regions 7095, 7096, and 7097). The channel formation region 7100 functions as a channel formation region of the transistor 7108. The LDD regions 7098 and 7099 function as LDD regions of the transistor 7108. Note that the LDD regions 7098 and 7099 are not necessarily formed. The impurity region 7095 includes a portion functioning as one of a source electrode and a drain electrode of the transistor 7108. The impurity region 7096 includes a portion functioning as the other of the source electrode and the drain electrode of the transistor 7108. The impurity region 7097 includes a portion functioning as a second electrode of the capacitor element 7109.

A third insulating film (an insulating film 7101) is entirely formed. A contact hole is selectively formed in part of the third insulating film. The insulating film 7101 functions as an interlayer film. As the third insulating film, an inorganic material (e.g., silicon oxide, silicon nitride, or silicon oxynitride), an organic compound material having a low dielectric constant (e.g., a photosensitive or nonphotosensitive organic resin material), or the like can be used. Alternatively, a material containing siloxane may be used. Note that siloxane is a material in which a skeleton structure is formed by a bond of silicon (Si) and oxygen (O). As a substitute, an organic group containing at least hydrogen (such as an alkyl group or aromatic hydrocarbon) is used. A fluoro group may be included in the organic group.

A second conductive layer (conductive layers 7102 and 7103) is formed over the third insulating film. The conductive layer 7102 is connected to the other of the source electrode and the drain electrode of the transistor 7108 through the contact hole formed in the third insulating film. Thus, the conductive layer 7102 includes a portion functioning as the other of the source electrode and the drain electrode of the transistor 7108. When the conductive layer 7103 is electrically connected to the conductive layer 7094, the conductive layer 7103 includes a portion which acts as a first electrode of the capacitor element 7109. Alternatively, when the conductive layer 7103 is electrically connected to the impurity region 7097, the conductive layer 7103 includes a portion functioning as the second electrode of the capacitor element 7109. Further alternatively, when the conductive layer 7103 is not connected to the conductive layer 7094 and the impurity region 7097, a capacitor element other than the capacitor element 7109 is formed. In this capacitor element, the conductive layer 7103, the impurity region 7097, and the insulating film 7101 are used as a first electrode, a second electrode, and an insulating film, respectively. As the second conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternatively, stacked layers of these elements (including the alloy thereof) can be used.

Note that in steps after forming the second conductive layer, various insulating films or various conductive films may be formed.

Next, structures of a transistor and a capacitor element are described in the case where an amorphous silicon (a-Si:H) film, a microcrystalline film, or the like is used as a semiconductor layer of the transistor.

FIG. 18A illustrates cross-sectional structures of a top-gate transistor and a capacitor element.

A first insulating film (an insulating film 7032) is formed over an entire surface of a substrate 7031. The first insulating film can prevent impurities from the substrate from adversely affecting a semiconductor layer and changing properties of a transistor. That is, the first insulating film functions as a base film. Thus, a transistor with high reliability can be formed. As the first insulating film, a single layer or stacked layers of a silicon oxide film, a silicon nitride film, a silicon oxynitride film ($SiO_xN_y$), or the like can be used.

Note that the first insulating film is not necessarily formed. In this case, reduction in the number of steps and reduction in manufacturing cost can be realized. Further, since the structure can be simplified, the yield can be improved.

A first conductive layer (conductive layers 7033, 7034, and 7035) is formed over the first insulating film. The conductive layer 7033 includes a portion functioning as one of a source electrode and a drain electrode of a transistor 7048. The conductive layer 7034 includes a portion functioning as the other of the source electrode and the drain electrode of the transistor 7048. The conductive layer 7035 includes a portion functioning as a first electrode of a capacitor element 7049. As the first conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternatively, stacked layers of these elements (including the alloy thereof) can be used.

A first semiconductor layer (semiconductor layers 7036 and 7037) is formed above the conductive layers 7033 and 7034. The semiconductor layer 7036 includes a portion functioning as one of the source electrode and the drain electrode. The semiconductor layer 7037 includes a portion functioning as the other of the source electrode and the drain electrode. As the first semiconductor layer, silicon containing phosphorus or the like can be used, for example.

A second semiconductor layer (a semiconductor layer 7038) is formed over the first insulating film and between the conductive layer 7033 and the conductive layer 7034. Part of the semiconductor layer 7038 extends over the conductive layers 7033 and 7034. The semiconductor layer 7038 includes a portion functioning as a channel formation region of the transistor 7048. As the second semiconductor layer, a semiconductor layer having no crystallinity such as an amorphous silicon (a-Si:H) layer, a semiconductor layer such as a microcrystalline semiconductor (μ-Si:H) layer, or the like can be used.

A second insulating film (insulating films 7039 and 7040) is formed to cover at least the semiconductor layer 7038 and the conductive layer 7035. The second insulating film functions as a gate insulating film. As the second insulating film, a single layer or stacked layers of a silicon oxide film, a silicon nitride film, a silicon oxynitride film ($SiO_xN_y$), or the like can be used.

Note that for a portion of the second insulating film, which is in contact with the second semiconductor layer, a silicon oxide film is preferably used. This is because the trap level at the interface between the second semiconductor layer and the second insulating film is lowered.

When the second insulating film is in contact with Mo, a silicon oxide film is preferably used for a portion of the second insulating film in contact with Mo. This is because the silicon oxide film does not oxidize Mo.

A second conductive layer (conductive layers 7041 and 7042) is formed over the second insulating film. The conductive layer 7041 includes a portion functioning as a gate electrode of the transistor 7048. The conductive layer 7042 functions as a second electrode of the capacitor element 7049 or a wiring. As the second conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternatively, stacked layers of these elements (including the alloy thereof) can be used.

Note that in steps after forming the second conductive layer, various insulating films or various conductive films may be formed.

FIG. 18B illustrates cross-sectional structures of an inverted staggered (bottom gate) transistor and a capacitor element. In particular, the transistor illustrated in FIG. 18B has a channel-etched structure.

A first insulating film (an insulating film 7052) is formed over an entire surface of a substrate 7051. The first insulating film can prevent impurities from the substrate from adversely affecting a semiconductor layer and changing properties of a transistor. That is, the first insulating film functions as a base film. Thus, a transistor with high reliability can be formed. As the first insulating film, a single layer or stacked layers of a silicon oxide film, a silicon nitride film, a silicon oxynitride film ($SiO_xN_y$), or the like can be used.

Note that the first insulating film is not necessarily formed. In this case, reduction in the number of steps and reduction in manufacturing cost can be realized. Further, since the structure can be simplified, the yield can be improved.

A first conductive layer (conductive layers 7053 and 7054) is formed over the first insulating film. The conductive layer 7053 includes a portion functioning as a gate electrode of a transistor 7068. The conductive layer 7054 includes a portion functioning as a first electrode of a capacitor element 7069. As the first conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternatively, stacked layers of these elements (including the alloy thereof) can be used.

A second insulating film (an insulating film 7055) is formed to cover at least the first conductive layer. The second insulating film functions as a gate insulating film. As the second insulating film, a single layer or stacked layers of a silicon oxide film, a silicon nitride film, a silicon oxynitride film ($SiO_xN_y$), or the like can be used.

Note that for a portion of the second insulating film, which is in contact with the semiconductor layer, a silicon oxide film is preferably used. This is because the trap level at the interface between the semiconductor layer and the second insulating film is lowered.

When the second insulating film is in contact with Mo, a silicon oxide film is preferably used for a portion of the second insulating film in contact with Mo. This is because the silicon oxide film does not oxidize Mo.

A first semiconductor layer (a semiconductor layer 7056) is formed in part of a portion over the second insulating film, which overlaps with the first conductive layer, by a photolithography method, an inkjet method, a printing method, or the like. Part of the semiconductor layer 7056 extends to a portion over the second insulating film, which does not overlap with the first conductive layer. The semiconductor layer 7056 includes a portion functioning as a channel formation region of the transistor 7068. As the semiconductor layer 7056, a semiconductor layer having no crystallinity such as an amorphous silicon (a-Si:H) layer, a semiconductor layer such as a microcrystalline semiconductor (μ-Si:H) layer, or the like can be used.

A second semiconductor layer (semiconductor layers 7057 and 7058) is formed over part of the first semiconductor layer. The semiconductor layer 7057 includes a portion functioning as one of a source electrode and a drain electrode. The semiconductor layer 7058 includes a portion functioning as the other of the source electrode and the drain electrode. As the second semiconductor layer, silicon containing phosphorus or the like can be used, for example.

A second conductive layer (conductive layers 7059, 7060, and 7061) is formed over the second semiconductor layer and the second insulating film. The conductive layer 7059 includes a portion functioning as one of the source electrode and the drain electrode of the transistor 7068. The conductive layer 7060 includes a portion functioning as the other of the source electrode and the drain electrode of the transistor 7068. The conductive layer 7061 includes a portion functioning as a second electrode of the capacitor element 7069. As the second conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternatively, stacked layers of these elements (including the alloy thereof) can be used.

Note that in steps after forming the second conductive layer, various insulating films or various conductive films may be formed.

Here, an example of a step which is a feature of the channel-etched type transistor is described. The first semiconductor layer and the second semiconductor layer can be formed using the same mask. Specifically, the first semiconductor layer and the second semiconductor layer are successively formed. Further, the first semiconductor layer and the second semiconductor layer are formed using the same mask.

Another example of a step which is a feature of the channel-etched type transistor is described. The channel region of the transistor can be formed without using an additional mask. Specifically, after the second conductive layer is formed, part of the second semiconductor layer is removed using the second conductive layer as a mask. Alternatively, part of the second semiconductor layer is removed by using the same mask as the second conductive layel The first semiconductor layer below the removed second semiconductor layer serves as the channel formation region of the transistor.

FIG. 18C illustrates cross-sectional structures of an inverted staggered (bottom gate) transistor and a capacitor element. In particular, the transistor illustrated in FIG. 18C has a channel protection (channel stop) structure.

A first insulating film (an insulating film 7072) is formed over an entire surface of a substrate 7071. The first insulating film can prevent impurities from the substrate from adversely affecting a semiconductor layer and changing properties of a transistor. That is, the first insulating film functions as a base film. Thus, a transistor with high reliability can be formed. As the first insulating film, a single layer or stacked layers of a silicon oxide film, a silicon nitride film, a silicon oxynitride film ($SiO_xN_y$), or the like can be used.

Note that the first insulating film is not necessarily formed. In this case, reduction in the number of steps and reduction in manufacturing cost can be realized. Further, since the structure can be simplified, the yield can be improved.

A first conductive layer (conductive layers 7073 and 7074) is formed over the first insulating film. The conductive layer 7073 includes a portion functioning as a gate electrode of a transistor 7088. The conductive layer 7074 includes a portion functioning as a first electrode of a capacitor element 7089. As the first conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternately, stacked layers of these elements (including the alloy thereof) can be used.

A second insulating film (an insulating film 7075) is formed to cover at least the first conductive layer. The second insulating film functions as a gate insulating film. As the second insulating film, a single layer or stacked layers of a silicon oxide film, a silicon nitride film, a silicon oxynitride film ($SiO_xN_y$), or the like can be used.

Note that for a portion of the second insulating film, which is in contact with the semiconductor layer, a silicon oxide film is preferably used. This is because the trap level at the interface between the semiconductor layer and the second insulating film is lowered.

When the second insulating film is in contact with Mo, a silicon oxide film is preferably used for a portion of the second insulating film in contact with Mo. This is because the silicon oxide film does not oxidize Mo.

A first semiconductor layer (a semiconductor layer 7076) is formed in part of a portion over the second insulating film, which overlaps with the first conductive layer, by a photolithography method, an inkjet method, a printing method, or the like. Part of the semiconductor layer 7076 extends to a portion over the second insulating film, which does not overlap with the first conductive layer. The semiconductor layer 7076 includes a portion functioning as a channel formation region of the transistor 7088. As the semiconductor layer 7076, a semiconductor layer having no crystallinity such as an amorphous silicon (a-Si:H) layer, a semiconductor layer such as a microcrystalline semiconductor (μ-Si:H) layer, or the like can be used.

A third insulating film (an insulating film 7082) is formed over part of the first semiconductor layer. The insulating film 7082 prevents the channel region of the transistor 7088 from being removed by etching. That is, the insulating film 7082 functions as a channel protection film (a channel stop film). As the third insulating film, a single layer or stacked layers of a silicon oxide film, a silicon nitride film, a silicon oxynitride film ($SiO_xN_y$), or the like can be used.

A second semiconductor layer (semiconductor layers 7077 and 7078) is formed over part of the first semiconductor layer and part of the third insulating film. The semiconductor layer 7077 includes a portion functioning as one of a source electrode and a drain electrode. The semiconductor layer 7078 includes a portion functioning as the other of the source electrode and the drain electrode. As the second semiconductor layer, silicon containing phosphorus or the like can be used, for example.

A second conductive layer (conductive layers 7079, 7080, and 7081) is formed over the second semiconductor layer. The conductive layer 7079 includes a portion functioning as one of the source electrode and the drain electrode of the transistor 7088. The conductive layer 7080 includes a portion functioning as the other of the source electrode and the drain electrode of the transistor 7088. The conductive layer 7081 includes a portion functioning as a second electrode of the capacitor element 7089. As the second conductive layer, an element such as Ti, Mo, Ta, Cr, W, Al, Nd, Cu, Ag, Au, Pt, Nb, Si, Zn, Fe, Ba, or Ge, or an alloy of these elements can be used. Alternately, stacked layers of these elements (including the alloy thereof) can be used.

Note that in steps after forming the second conductive layer, various insulating films or various conductive films may be formed.

Next, an example where a semiconductor substrate is used as a substrate for forming a transistor is described. Since a transistor formed using a semiconductor substrate has high mobility, the size of the transistor can be decreased. Accordingly, the number of transistors per unit area can be increased (the degree of integration can be improved), and the size of the substrate can be decreased as the degree of integration is increased in the case of the same circuit structure. Thus, manufacturing cost can be reduced. Further, since the circuit scale can be increased as the degree of integration is increased in the case of the same substrate size, more advanced functions can be provided without increase in manufacturing cost. Moreover, reduction in variations in characteristics can improve manufacturing yield. Reduction in operating voltage can reduce power consumption. High mobility can realize high-speed operation.

When a circuit which is formed by integrating transistors formed using a semiconductor substrate is mounted on a device in the form of an IC chip or the like, the device can be provided with a variety of functions. For example, when a peripheral driver circuit (e.g., a data driver (a source driver), a scan driver (a gate driver), a timing controller, an image processing circuit, an interface circuit, a power supply circuit, or an oscillation circuit) of a display device is formed by integrating transistors formed using a semiconductor substrate, a small peripheral circuit which can be operated with low power consumption and at high speed can be formed at low cost in high yield. Note that a circuit which is formed by integrating transistors formed using a semiconductor substrate may include a unipolar transistor. Thus, a manufacturing process can be simplified, so that manufacturing cost can be reduced.

A circuit which is formed by integrating transistors formed using a semiconductor substrate may also be used for a display panel, for example. More specifically, the circuit can be used for a reflective liquid crystal panel such as a liquid crystal on silicon (LCOS) device, a digital micromirror device (DMD) element in which micromirrors are integrated, an EL panel, and the like. When such a display panel is formed using a semiconductor substrate, a small display panel which can be operated with low power consumption and at high speed can be formed at low cost in high yield. Note that the display panel may be formed over an element having a function other than a function of driving the display panel, such as a large-scale integration (LSI).

Hereinafter, a method for forming a transistor using a semiconductor substrate is described. As an example, such steps as illustrated in FIGS. 19A to 19G may be used for forming a transistor.

Figures 19A, 19B, 19C, 19D, 19E, 19F, 19G:
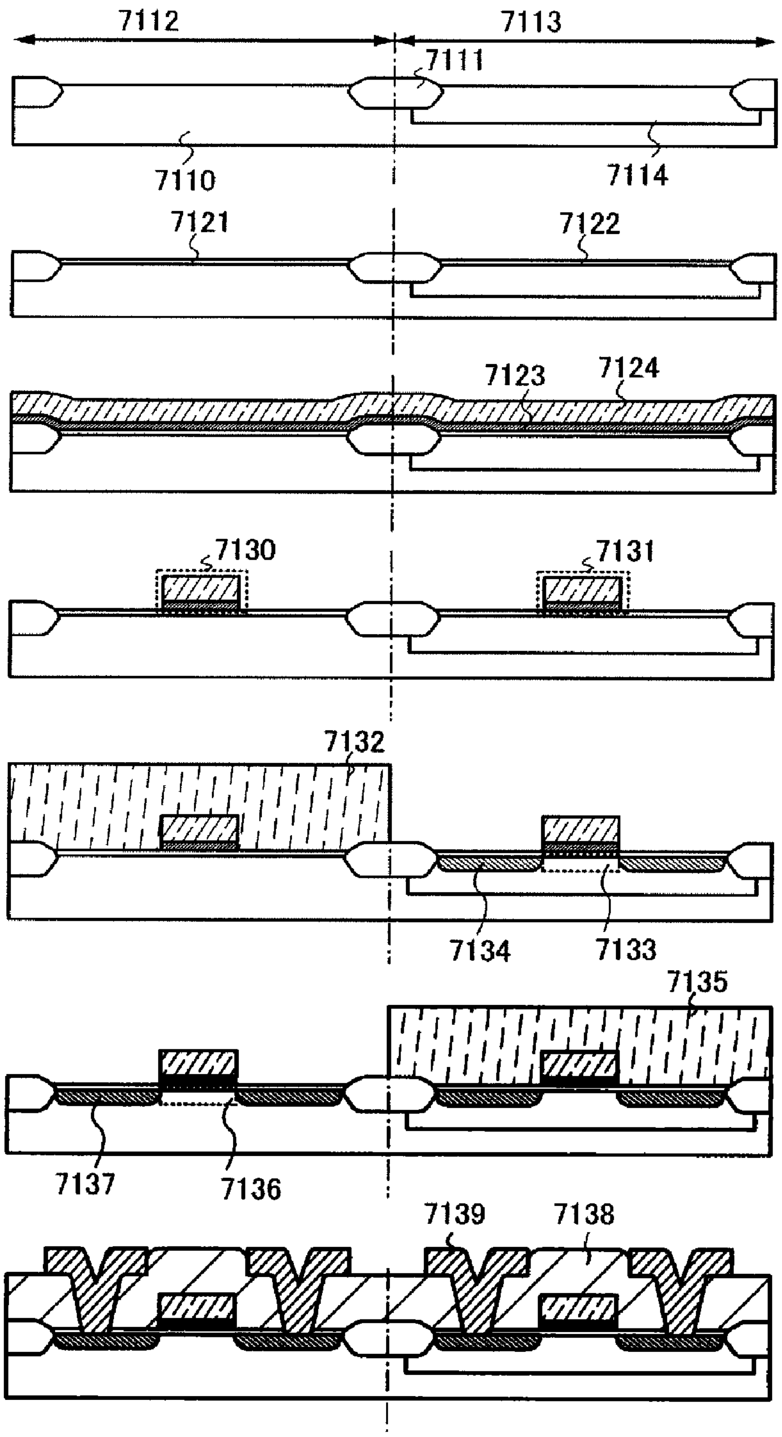
FIGS. 19A to 19G illustrate manufacturing examples of a semiconductor element in the present invention.

FIG. 19A illustrates a region 7112 and a region 7113 by which an element is isolated in a semiconductor substrate 7110, an insulating film 7111 (also referred to as a field oxide film), and a p-well 7114.

Any substrate can be used as the substrate 7110 as long as it is a semiconductor substrate. For example, a single crystal Si substrate having n-type or p-type conductivity, a compound semiconductor substrate (e.g., a GaAs substrate, an InP substrate, a GaN substrate, a SiC substrate, a sapphire substrate, or a ZnSe substrate), an SOI (silicon on insulator) substrate formed by a bonding method or a SIMOX (separation by implanted oxygen) method, or the like can be used.

FIG. 19B illustrates insulating films 7121 and 7122. The insulating films 7121 and 7122 can be formed of silicon oxide films in such a manner that, for example, surfaces of the regions 7112 and 7113 provided in the semiconductor substrate 7110 are oxidized by heat treatment.

FIG. 19C illustrates conductive films 7123 and 7124.

As a material of the conductive films 7123 and 7124, an element selected from tantalum (Ta), tungsten (W), titanium (Ti), molybdenum (Mo), aluminum (Al), copper (Cu), chromium (Cr), niobium (Nb), and the like, or an alloy material or a compound material containing such an element as its main component can be used. Alternatively, a metal nitride film obtained by nitridation of the above element can be used. Further alternatively, a semiconductor material typified by polycrystalline silicon doped with an impurity element such as phosphorus or silicide in which a metal material is introduced can be used.

FIGS. 19D to 19G illustrate a gate electrode 7130, a gate electrode 7131, a resist mask 7132, an impurity region 7134, a channel formation region 7133, a resist mask 7135, an impurity region 7137, a channel formation region 7136, a second insulating film 7138, and wirings 7139.

The second insulating film 7138 can be formed to have a single-layer structure or a stacked-layer structure of an insulating film containing oxygen and/or nitrogen such as silicon oxide ($SiO_x$), silicon nitride ($SiN_x$), silicon oxynitride ($SiO_xN_y$) (x>y), or silicon nitride oxide ($SiN_xO_y$) (x>y); a film containing carbon such as DLC (diamond-like carbon); an organic material such as epoxy, polyimide, polyamide, polyvinyl phenol, benzocyclobutene, or acrylic; or a siloxane material such as a siloxane resin by a CVD method, a sputtering method, or the like. A siloxane material corresponds to a material having a bond of Si—O—Si. Siloxane has a skeleton structure with the bond of silicon (Si) and oxygen (O). As a substituent of siloxane, an organic group containing at least hydrogen (e.g., an alkyl group or aromatic hydrocarbon) is used. A fluoro group may be included in the organic group.

The wirings 7139 are formed with a single layer or stacked layers of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing such an element as its main component by a CVD method, a sputtering method, or the like. An alloy material containing aluminum as its main component corresponds to, for example, a material which contains aluminum as its main component and also contains nickel, or a material which contains aluminum as its main component and also contains nickel and one or both of carbon and silicon. The wirings 7139 are preferably formed to have a stacked-layer structure of a barrier film, an aluminum-silicon (Al—Si) film, and a barrier film or a stacked-layer structure of a barrier film, an aluminum-silicon (Al—Si) film, a titanium nitride film, and a barrier film. Note that the barrier film corresponds to a thin film formed of titanium, titanium nitride, molybdenum, or molybdenum nitride. Aluminum and aluminum silicon are suitable materials for forming the wirings 7139 because they have low resistance values and are inexpensive. For example, when barrier layers are provided as the top layer and the bottom layer, generation of hillocks of aluminum or aluminum silicon can be prevented. For example, when a barrier film is formed of titanium which is an element having a high reducing property, even if a thin natural oxide film is formed on a crystalline semiconductor film, the natural oxide film can be reduced. As a result, the wirings 7139 can be connected to the crystalline semiconductor in electrically and physically with favorable condition.

Note that the structure of a transistor is not limited to that illustrated in the drawing. For example, a transistor with an inverted staggered structure, a FinFET structure, or the like can be used. A FinFET structure is preferable because it can suppress a short channel effect which occurs along with reduction in transistor size.

The above is the description of the structures and the methods for manufacturing transistors. In this embodiment mode, a wiring, an electrode, a conductive layer, a conductive film, a terminal, a via, a plug, and the like are preferably formed of one or more elements selected from aluminum (Al), tantalum (Ta), titanium (Ti), molybdenum (Mo), tungsten (W), neodymium (Nd), chromium (Cr), nickel (Ni), platinum (Pt), gold (Au), silver (Ag), copper (Cu), magnesium (Mg), scandium (Sc), cobalt (Co), zinc (Zn), niobium (Nb), silicon (Si), phosphorus (P), boron (B), arsenic (As), gallium (Ga), indium (In), tin (Sn), and oxygen (O); or a compound or an alloy material including one or more of the aforementioned elements (e.g., indium tin oxide (ITO), indium zinc oxide (IZO), indium tin oxide containing silicon oxide (ITSO), zinc oxide (ZnO), tin oxide (SnO), cadmium tin oxide (CTO), aluminum neodymium (Al—Nd), magnesium silver (Mg—Ag), or molybdenum-niobium (Mo—Nb)); a substance in which these compounds are combined; or the like. Alternatively, they are preferably formed to contain a substance including a compound (silicide) of silicon and one or more of the aforementioned elements (e.g., aluminum silicon, molybdenum silicon, or nickel silicide); or a compound of nitrogen and one or more of the aforementioned elements (e.g., titanium nitride, tantalum nitride, or molybdenum nitride).

Note that silicon (Si) may contain an n-type impurity (such as phosphorus) or a p-type impurity (such as boron). When silicon contains the impurity, the conductivity is increased, and a function similar to a general conductor can be realized. Accordingly, such silicon can be utilized easily as a wiring, an electrode, or the like.

In addition, silicon with various levels of crystallinity, such as single crystalline silicon, polycrystalline silicon, or microcrystalline silicon can be used. Alternatively, silicon having no crystallinity, such as amorphous silicon can be used. By using single crystalline silicon or polycrystalline silicon, resistance of a wiring, an electrode, a conductive layer, a conductive film, a terminal, or the like can be reduced. By using amorphous silicon or microcrystalline silicon, a wiring or the like can be formed by a simple process.

Aluminum and silver have high conductivity, and thus can reduce signal delay. Moreover, since aluminum and silver can be easily etched, they are easily patterned and can be minutely processed.

Copper has high conductivity, and thus can reduce signal delay. When copper is used, a stacked-layer structure is preferably employed to improve adhesion.

Molybdenum and titanium are preferable because even if molybdenum or titanium is in contact with an oxide semiconductor (e.g., ITO or IZO) or silicon does not cause defects. Moreover, molybdenum and titanium are preferable because they are easily etched and have high heat resistance.

Tungsten is preferable because it has advantages such as high heat resistance.

Neodymium is also preferable because it has advantages such as high heat resistance. In particular, an alloy of neodymium and aluminum is preferable because heat resistance is increased and aluminum hardly causes hillocks.

Silicon is preferably used because it can be formed at the same time as a semiconductor layer included in a transistor and has high heat resistance.

Since ITO, IZO, ITSO, zinc oxide (ZnO), silicon (Si), tin oxide (SnO), and cadmium tin oxide (CTO) have light-transmitting properties, they can be used for a portion which transmits light. For example, they can be used for a pixel electrode or a common electrode.

IZO is preferable because it is easily etched and processed. In etching IZO, a residue is hardly left. Accordingly, when IZO is used for a pixel electrode, defects (such as short circuit or orientation disorder) of a liquid crystal element or a light-emitting element can be reduced.

A wiring, an electrode, a conductive layer, a conductive film, a terminal, a via, a plug, or the like may have a single-layer structure or a multi-layer structure. By employing a single-layer structure, each manufacturing process of a wiring, an electrode, a conductive layer, a conductive film, a terminal, or the like can be simplified, the number of days for a process can be reduced, and cost can be reduced. Alternatively, by employing a multi-layer structure, a wiring, an electrode, and the like with high quality can be formed while an advantage of each material is utilized and a disadvantage thereof is reduced. For example, when a low-resistant material (e.g., aluminum) is included in a multi-layer structure, reduction in resistance of a wiring can be realized. As another example, when a stacked-layer structure in which a low heat-resistant material is interposed between high heat-resistant materials is employed, heat resistance of a wiring, an electrode, and the like can be increased, utilizing advantages of the low heat-resistance material. For example, it is preferable to employ a stacked-layer structure in which a layer containing aluminum is interposed between layers containing molybdenum, titanium, neodymium, or the like.

When wirings, electrodes, or the like are in direct contact with each other, they adversely affect each other in some cases. For example, one wiring or one electrode is mixed into a material of another wiring or another electrode and changes its properties, and thus, an intended function cannot be obtained in some cases. As another example, when a high-resistant portion is formed, a problem may occur so that it cannot be normally formed. In such cases, a reactive material is preferably interposed by or covered with a non-reactive material in a stacked-layer structure. For example, when ITO and aluminum are connected, titanium, molybdenum, or an alloy of neodymium is preferably interposed between ITO and aluminum. As another example, when silicon and aluminum are connected, titanium, molybdenum, or an alloy of neodymium is preferably interposed between silicon and aluminum.

The term "wiring" indicates a portion including a conductor. A wiring may be a linear shape or made to be short without being a linear shape. Therefore, an electrode is included in a wiring.

Note that a carbon nanotube may be used for a wiring, an electrode, a conductive layer, a conductive film, a terminal, a via, a plug, or the like. Since a carbon nanotube has a light-transmitting property, it can be used for a portion which transmits light. For example, a carbon nanotube can be used for a pixel electrode or a common electrode.

Although this embodiment mode is described with reference to various drawings, the contents (or may be part of the contents) described in each drawing can be freely applied to, combined with, or replaced with the contents (or may be part of the contents) described in another drawing and the contents (or may be part of the contents) described in a drawing in another embodiment mode. Further, in the above described drawings, each part can be combined with another part or with another part of another embodiment mode.

Embodiment Mode 7

This embodiment mode will describe examples of electronic devices.

Figure 20A:
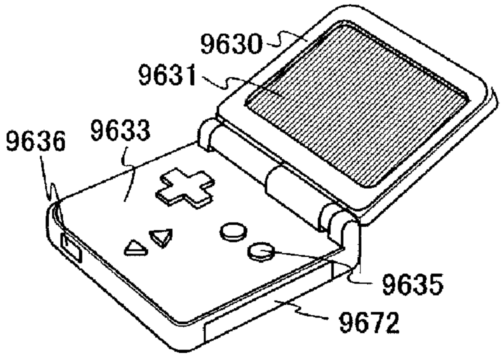
FIGS. 20A to 20E illustrate an electronic device of the present invention.

FIG. 20A illustrates a portable game machine which includes a housing 9630, a display portion 9631, speakers 9633, operation keys 9635, a connection terminal 9636, a recording medium reading portion 9672, and the like. The portable game machine illustrated in FIG. 20A can have various functions such as a function of reading a program or data stored in a recording medium to display on the display portion; a function of sharing information by wireless communication with another portable game machine; or the like. Note that functions of the portable game machine illustrated in FIG. 20A are not limited to them, and the portable game machine can have various functions.

Figure 20B:
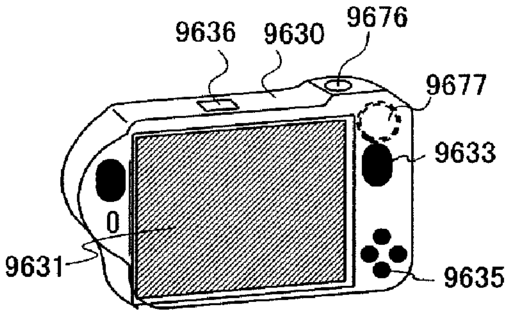

FIG. 20B illustrates a digital camera which includes the housing 9630, the display portion 9631, the speakers 9633, the operation keys 9635, the connection terminal 9636, a shutter button 9676, an image receiving portion 9677, and the like. The digital camera having the television reception function illustrated in FIG. 20B can have various functions such as a function of photographing a still image and a moving image; a function of automatically or manually adjusting the photographed image; a function of obtaining various kinds of information from an antenna; a function of storing the photographed image or the information obtained from the antenna; and a function of displaying the photographed image or the information obtained from the antenna on the display portion. Note that functions of the digital camera having the television reception function illustrated in FIG. 20B are not limited to them, and the digital camera having the television reception function can have various functions.

Figure 20C:
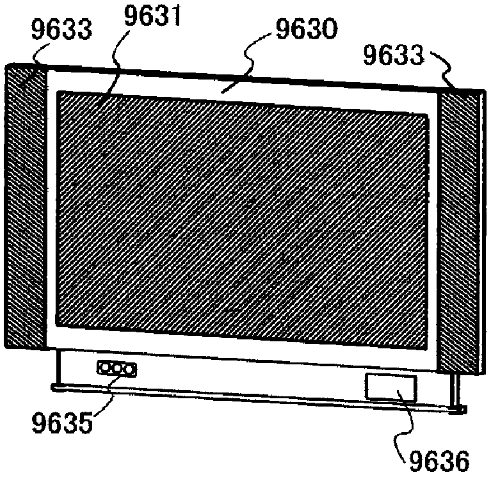

FIG. 20C illustrates a television receiver which includes the housing 9630, the display portion 9631, the speakers 9633, the operation keys 9635, the connection terminal 9636, and the like. The television receiver illustrated in FIG. 20C can have various functions such as a function of converting radio wave for television into an image signal; a function of converting an image signal into a signal which is suitable for display; and a function converting frame frequency of an image signal. Note that functions of the television receiver illustrated in FIG. 20C are not limited to them, and the television receiver can have various functions.

Figure 20D:
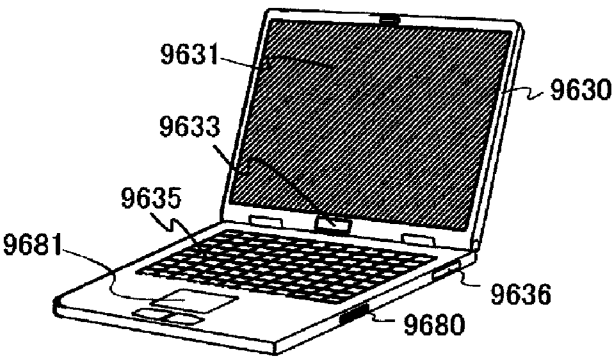

FIG. 20D illustrates a computer which includes the housing 9630, the display portion 9631, the speaker 9633, the operation keys 9635, the connection terminal 9636, a pointing device 9681, an external connection port 9680, and the like. The computer illustrated in FIG. 20D can have various functions such as a function of displaying various kinds of information (e.g., a still image, a moving image, and a text image) on the display portion; a function of controlling processing by various kinds of software (programs); a communication function such as wireless communication or wire communication; a function of connecting with various computer networks by using the communication function; and a function of transmitting or receiving various kinds of data by using the communication function. Note that functions of the computer illustrated in FIG. 20D are not limited to them, and the computer can have various functions.

Figure 20E:
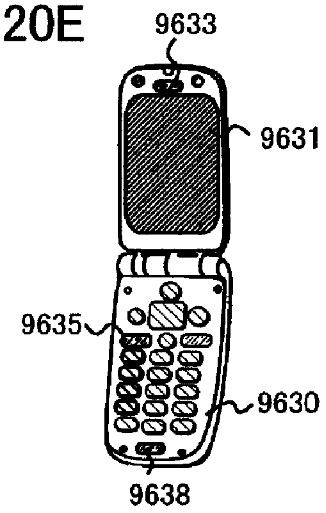

FIG. 20E illustrates a mobile phone which includes the housing 9630, the display portion 9631, the speaker 9633, the operation keys 9635, a microphone 9638, and the like. The mobile phone illustrated in FIG. 20E can have various functions such as a function of displaying various kinds of information (e.g, a still image, a moving image, and a text image); a function of displaying a calendar, a date, the time, and the like on the display portion; a function of operating or editing the information displaying on the display portion; and a function of controlling processing by various kinds of software (programs). Note that functions of the mobile phone illustrated in FIG. 20E are not limited to them, and the mobile phone can have various functions.

Electronic devices described in this embodiment mode are characterized by having a display portion for displaying some sort of information. Since such electronic devices can increase a viewing angle, display with a little visual change from any angles can be performed. Further, in order to improve the viewing angle, even when one pixel is divided into a plurality of sub-pixels and different signal voltages are applied to each sub-pixel in order for improving the viewing angle, increase of a circuit scale or increase of driving speed of a circuit for driving the sub-pixel are not caused. As the result, reduction in power consumption and reduction in manufacturing cost can be realized. Moreover, an accurate signal can be input to each sub-pixel, so that quality of still image display can be improved. Furthermore, since a black image can be displayed in an arbitrary timing without adding a special circuit and changing a structure, quality of moving image display can be improved.

Although this embodiment mode is described with reference to various drawings, the contents (or may be part of the contents) described in each drawing can be freely applied to, combined with, or replaced with the contents (or may be part of the contents) described in another drawing and the contents (or may be part of the contents) described in a drawing in another embodiment mode. Further, in the above described drawings, each part can be combined with another part or with another part of another embodiment mode.

This application is based on Japanese Patent Application serial No. 2007-308858 filed with Japan Patent Office on Nov. 29, 2007, the entire contents of which are hereby incorporated by reference.

EXPLANATION OF REFERENCE

10: first circuit; 11: first wiring; 12: second wiring; 13: third wiring; 21: fourth wiring; 22: fifth wiring; 23: sixth wiring; 31: first liquid crystal element; 32: second liquid crystal element; 33: third liquid crystal element; 41: first sub-pixel; 42: second sub-pixel; 43: third sub-pixel; 50: capacitor element; 51: capacitor element; 52: capacitor element; 60: second circuit; 71: sixth wiring; 72: seventh wiring; 90: reset circuit; 101: first wiring; 102: second wiring; 103: third wiring; 104 fourth wiring; 105: fifth wiring; 106: sixth wiring; 107: seventh wiring; 108: eighth wiring; 109: ninth wiring; 110: tenth wiring; 111: eighth wiring; 121: first current control circuit; 122: second current control circuit; 131: first current drive display element; 132: second current drive display element; 141: first anode line; 142: second anode line; 151: first cathode line; 152: second cathode line; 160: switch; 161: switch; 162: switch; 170: capacitor element; 171: capacitor element; 180: wiring; 181: wiring; 200: display panel; 201: display portion; 202: connection point; 203: connection substrate; 211: first scan driver; 212: second scan driver; 213: third scan driver; 214: fourth scan driver; 221: data driver; 231: peripheral driver circuit; 232: peripheral driver circuit; 233: peripheral driver circuit; 234: peripheral driver circuit; **121*a*: electrode; 121*b*: electrode; 121*c*: electrode; 122*a*: electrode; 122*b*: electrode; 122*c*: electrode; 7001: transistor; 7002: transistor; 7003: transistor; 7004: transistor; 7005: transistor; 7006: transistor; 7011: substrate; 7012: insulating film; 7013: semiconductor layer; 7014: semiconductor layer 7015: semiconductor layer; 7016: insulating film; 7017: gate electrode; 7018: insulating film; 7019: insulating film; 7021: sidewall; 7022: mask; 7023: conductive film; 7024: insulating film; 7031: substrate; 7032: insulating film; 7033: conductive layer; 7033: conductive layer; 7034: conductive layer; 7035: conductive layer; 7036: semiconductor layer; 7037: semiconductor layer; 7038: semiconductor layer 7039: insulating film; 7040: insulating film; 7041: conductive layer; 7042: conductive layer; 7048: transistor; 7049: capacitor element; 7051: substrate; 7052: insulating film; 7053: conductive layer; 7054: conductive layer 7055: insulating film; 7056: semiconductor layer; 7057: semiconductor layer; 7058: semiconductor layer; 7059: conductive layer; 7060: conductive layer; 7061: conductive layer; 7068: transistor 7069: capacitor element; 7071: substrate; 7072: insulating film; 7073: conductive layer; 7074: conductive layer; 7075: insulating film; 7076: semiconductor layer 7077: semiconductor layer; 7078: semiconductor layer; 7079: conductive layer 7080: conductive layer, 7081: conductive layer; 7082: insulating film; 7088: transistor; 7089: capacitor element; 7091**:

substrate; 7092: insulating film; 7093: conductive layer; 7094: conductive layer 7095: impurity region; 7096: impurity region; 7097: impurity region; 7098: LDD region; 7099: LDD region; 7100: channel formation region; 7101: insulating film; 7102: conductive layer; 7103: conductive layer; 7104: insulating film; 7108: transistor; 7109: capacitor element 7110: semiconductor substrate; 7111: insulating film; 7112: region; 7113: region; 7114: p-well; 7121: insulating film; 7122: insulating film; 7123: conductive film; 7124: conductive film; 7130: gate electrode; 7131: gate electrode; 7132: resist mask; 7133: channel formation region; 7134: impurity region; 7135: resist mask; 7136: channel formation region; 7137: impurity region; 7138: insulating film; 7139: wiring; 9630: housing; 9631: display portion; 9633: speaker; 9635: operation key; 9636: connection terminal; 9638: microphone; 9672: recording medium reading portion; 9676: shutter button; 9677: image receiving portion; 9680: external connections port; and 9681: pointing device.

The invention claimed is:

1. A liquid crystal display device comprising a plurality of pixels, each of the plurality of pixels comprising:
a first liquid crystal element;
a second liquid crystal element;
a capacitor element; and
a circuit,
wherein the circuit is configured to electrically connect a first wiring and one of the first liquid crystal element and the second liquid crystal element so that a first voltage is applied to the capacitor element and one of the first liquid crystal element and the second liquid crystal element;
wherein the circuit configured to switch between a first state in which the first liquid crystal element and the capacitor element are electrically connected and the second liquid crystal element and the capacitor element are electrically disconnected, and a second state in which the first liquid crystal element and the capacitor element are electrically disconnected and the second liquid crystal element and the capacitor element are electrically connected; and
wherein the circuit is configured to electrically connect the first liquid crystal element, the second liquid crystal element, the capacitor element, and a second wiring so that a second voltage is applied to the first liquid crystal element, the second liquid crystal element, and the capacitor element.

2. A liquid crystal display device comprising a plurality of pixels, each of the plurality of pixels comprising:
a first liquid crystal element;
a second liquid crystal element;
a capacitor element; and
a circuit,
wherein the circuit is configured to electrically connect the first liquid crystal element, the second liquid crystal element, and a first wiring so that a first voltage is applied to the first liquid crystal element and the second liquid crystal element;
wherein the circuit is configured to switch between a first state in which the first liquid crystal element and the capacitor element are electrically connected and the second liquid crystal element and the capacitor element are electrically disconnected, and a second state in which the first liquid crystal element and the capacitor element are electrically disconnected and the second liquid crystal element and the capacitor element are electrically connected; and
wherein the circuit is configured to electrically connect the first liquid crystal element, the second liquid crystal element, the capacitor element, and a second wiring so that a second voltage is applied to the first liquid crystal element, the second liquid crystal element, and the capacitor element.

3. A liquid crystal display device comprising a plurality of pixels, each of the plurality of pixels comprising:
a first liquid crystal element;
a second liquid crystal element;
a capacitor element; and
a circuit,
wherein the circuit is configured to connect the first liquid crystal element, the second liquid crystal element, the capacitor element and a first wiring so that a first voltage is applied to the first liquid crystal element, the second liquid crystal element, and the capacitor element;
wherein the circuit is configured to switch between a first state in which the first liquid crystal element and the capacitor element are electrically connected and the second liquid crystal element and the capacitor element are electrically disconnected, and a second state in which the first liquid crystal element and the capacitor element are electrically disconnected and the second liquid crystal element and the capacitor element are electrically connected; and
wherein the circuit is configured to electrically connect the capacitor element and a second wiring so that a second voltage is applied to the capacitor element.

4. A liquid crystal display device comprising a plurality of pixels, each of the plurality of pixels comprising:
a first liquid crystal element;
a second liquid crystal element;
a first switch;
a capacitor element;
a second switch;
a third switch; and
a fourth switch,
wherein one terminal of the first switch is configured to be electrically connected to a second wiring;
wherein one terminal of the second switch is configured to be electrically connected to the other terminal of the first switch and the capacitor element, and the other terminal of the second switch is configured to be electrically connected to the first liquid crystal element;
wherein one terminal of the third switch is configured to be electrically connected to the other terminal of the first switch and the capacitor element, and the other terminal of the third switch is configured to be electrically connected to the second liquid crystal element; and
wherein a terminal of the fourth switch is electrically connected to the other terminal of the first switch and the capacitor element, and the other terminal of the fourth switch is electrically connected to a first wiring.

5. A liquid crystal display device comprising:
a plurality of pixels, each of the plurality of pixels comprising:
a first liquid crystal element;
a second liquid crystal element;
a first switch;
a capacitor element;
a second switch;
a third switch; and
a fourth switch,
wherein one terminal of the first switch is configured to be electrically connected to a second wiring;

wherein one terminal of the second switch is configured to be electrically connected to the other terminal of the first switch and the capacitor element, and the other terminal of the second switch is configured to be electrically connected to the first liquid crystal element;

wherein one terminal of the third switch is configured to be electrically connected to the other terminal of the first switch and the capacitor element, and the other terminal of the third switch is configured to be electrically connected to the second liquid crystal element; and wherein one terminal of the fourth switch is configured to be electrically connected to the other terminal of the first switch and the capacitor element, and the other terminal of the fourth switch is configured to be electrically connected to a first wiring;

a first scan line;

a second scan line;

a third scan line; and a fourth scan line, wherein the first scan line is configured to control the first switch by a signal which controls an applying state of voltage for driving the first liquid crystal element and the second liquid crystal element;

wherein the second scan line is configured to control the second switch by a signal which controls an electrical connection between the capacitor element and the first liquid crystal element;

wherein the third scan line is configured to control the third switch by a signal which controls an electrical connection between the capacitor element and the second liquid crystal element; and wherein the fourth scan line is configured to control the fourth switch by a signal which controls an electrical connection between the capacitor element and the first wiring.

6. The liquid crystal display device according to claim 4 or 5, wherein each of the first switch to the fourth switch is formed using a thin film transistor.

7. The liquid crystal display device according to any one of claims 1 to 5, wherein each of the first liquid crystal element and the second liquid crystal element includes a pixel electrode, a common electrode, a liquid crystal which is controlled by the pixel electrode to the common electrode.

8. An electronic device comprising a liquid crystal display device according to any one of claims 1 to 5.

* * * * *

UNITED STATES PATENT AND TRADEMARK OFFICE

CERTIFICATE OF CORRECTION

PATENT NO. : 8,059,218 B2
APPLICATION NO. : 12/323337
DATED : November 15, 2011
INVENTOR(S) : Yasunori Yoshida It is certified that error appears in the above-identified patent and that said Letters Patent is hereby corrected as shown below:

Sheet 1 of 20, in the drawings for FIG. 1E, replace “FIG. D2” with --FIG. 1D2--;

Column 67, line 29, replace “layel” with --layer.--.

Signed and Sealed this
Second Day of October, 2012

David J. Kappos
*Director of the United States Patent and Trademark Office*